(12) United States Patent
Okuno

(10) Patent No.: US 6,558,107 B1
(45) Date of Patent: May 6, 2003

(54) ROBOT ARM MECHANISM

(75) Inventor: Chohei Okuno, Ise (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/431,140

(22) Filed: Nov. 1, 1999

(30) Foreign Application Priority Data

Nov. 13, 1998 (JP) .......................................... 10-323769
Mar. 11, 1999 (JP) .......................................... 11-065676

(51) Int. Cl.$^7$ .............................................. B25J 18/00
(52) U.S. Cl. ...................... 414/744.5; 414/917; 901/15; 74/490.03
(58) Field of Search ........................ 414/744.5; 901/15; 74/490.03

(56) References Cited

U.S. PATENT DOCUMENTS 6,095,011 A * 8/2000 Brogardh ................ 414/917 X
6,301,988 B1 * 10/2001 Brogardh ................ 414/917 X

* cited by examiner

Primary Examiner—Donald W. Underwood
(74) Attorney, Agent, or Firm—Richard L. Aitken; Venable

(57) ABSTRACT

A robot arm mechanism includes a handling member for supporting and handling an object, a robot arm made up of at least four arm links, and a robot arm driving mechanism for driving the robot arm to assume its contracted and extended position. The robot arm comprises first and second arm links and a link retaining mechanism pivotably retaining the first and second arm links. The link retaining mechanism comprises first and second joint cross linkages similar in shape and each having two arms crossed to each other. The first joint cross linkage is integrally connected with one of the first and second arm links of the robot arm. The second joint cross linkage is integrally connected with the other one of the first and second arm links of the robot arm. This leads to the advantage of providing a robot arm mechanism exempt from driven gears, belts and pulleys forming part of a synchronous motion mechanism necessitated by conventional robot arm mechanisms to ensure that no dust is produced and fallen in a vacuum working chamber of highly pure air.

32 Claims, 33 Drawing Sheets

ROBOT ARM MECHANISM

BACKGROUND OF THE INVENTION

1. Field of the Invention

The present invention relates to a robot arm mechanism having arms contracted and extended, and more particularly to a robot arm mechanism incorporating an arm driving mechanism for driving the arms to assume its contracted and extended positions.

2. Description of the Related Art

The robot arm mechanism of this type is used in the process of producing semiconductors in which the robot arm mechanism is operated to have arms contracted and extended to handle works, i.e., objects to be treated. These objects include for example such as wafers and other precision parts that are to be transferred and then unloaded onto a work table by the robot arm mechanism.

A conventional robot arm mechanism of this kind is disclosed in, for example, Japanese patent laying-open publication Tokkaihei 7-227777 and comprises a handling member for holding and releasing objects, and robot arms for operating and moving the hand. The robot arms are constituted by a plurality of parallel links having joint portions on which are provided synchronous gears for maintaining the links in their parallel attitudes. The synchronous gears are rotated to have the hand maintained in its predetermined direction by moving the hand forwardly and rearwardly while the parallel links are operated. Another conventional robot arm mechanism of this kind is disclosed in Japanese patent laying-open publication Tokkaihei 9-272084 and comprises robot arms constituted by a plurality of parallel links to form a parallelogram linkage contractable and extensible, and a synchronous motion mechanism including gears, belts and pulleys operatively mounted on the links. The synchronous motion mechanism is operated to have gears, belts and pulleys driven so that the parallelogram linkage can be contracted and extended.

It is another object of the present invention to provide a robot arm mechanism which is exempt from such driven gears, belts and pulleys of the synchronous motion mechanism necessitated by the conventional robot arm mechanisms to ensure that no dust is produced and fallen in the vacuum working chamber of highly pure air.

SUMMARY OF THE INVENTION

According to the first aspect of the present invention there is provided a robot arm mechanism comprising: a handling member for supporting and handling an object; a robot arm connected to the handling member, the robot arm comprising a first arm link having first and second end portion, a second arm link having first and second end portion, and a link retaining mechanism having a center line, the link retaining mechanism pivotably retaining the first and second arm links respectively at the first end portions of the first and second arm links and keeping parallel a first line and a second line, the first line being a line passing through the first and second end portions of the first arm link and the second line being a line symmetrical with respect to the center line with the line passing through the first and second end portions of the second arm link, the link retaining mechanism comprising a first joint cross linkage including a first short link having first and second end portions, a first long link having first and second end portions and longer than the first short link of the first joint cross linkage of the link retaining mechanism, the first short and long links of the first joint cross linkage of the link retaining mechanism pivotably connected with each other at the second end portion of the first short link of the first joint cross linkage of the link retaining mechanism and the first end portion of the first long link of the first joint cross linkage of the link retaining mechanism, a second short link having first and second end portions and substantially equal in length to the first short link of the first joint cross linkage of the link retaining mechanism, the first long link of the first joint cross linkage of the link retaining mechanism and the second short link of the first joint cross linkage of the link retaining mechanism pivotably connected with each other at the second end portion of the first long link of the first joint cross linkage of the link retaining mechanism and the first end portion of the second short link of the first joint cross linkage of the link retaining mechanism, and a second long link having first and second end portions and substantially equal in length to the first long link of the first joint cross linkage of the link retaining mechanism, the second short and long links of the first joint cross linkage of the link retaining mechanism pivotably connected with each other at the second end portion of the second short link of the first joint cross linkage of the link retaining mechanism and the first end portion of the second long link of the first joint cross linkage of the link retaining mechanism, the second long link of the first joint cross linkage of the link retaining mechanism and the first short link of the first joint cross linkage of the link retaining mechanism pivotably connected with each other at the second end portion of the second long link of the first joint cross linkage of the link retaining mechanism and the first end portion of the first short link of the first joint cross linkage of the link retaining mechanism under the state that the second long link of the first joint cross linkage of the link retaining mechanism is crossed with the first long link of the first joint cross linkage of the link retaining mechanism, and a second joint cross linkage including a first short link having first and second end portions, a first long link having first and second end portions and longer than the first short link of the second joint cross linkage of the link retaining mechanism, the first short and long links of the second joint cross linkage of the link retaining mechanism pivotably connected with each other at the second end portion of the first short link of the second joint cross linkage of the link retaining mechanism and the first end portion of the first long link of the second joint cross linkage of the link retaining mechanism, a second short link having first and second end portions and substantially equal in length to the first short link of the second joint cross linkage of the link retaining mechanism, the first long link of the second joint cross linkage of the link retaining mechanism and the second short link of the second joint cross linkage of the link retaining mechanism pivotably connected with each other at the second end portion of the first long link of the second joint cross linkage of the link retaining mechanism and the first end portion of the second short link of the second joint cross linkage of the link retaining mechanism, and a second long link having first and second end portions and substantially equal in length to the first long link of the second joint cross linkage of the link retaining mechanism, the second short and long links of the second joint cross linkage of the link retaining mechanism pivotably connected with each other at the second end portion of the second short link of the second joint cross linkage of the link retaining mechanism and the first end portion of the second long link of the second joint cross linkage of the link retaining mechanism, the second long link of the second joint cross linkage of the link retaining mechanism and the first short link of the second joint cross linkage of the link retaining mechanism pivotably connected with each other at the second end portion of the second long link of the second joint cross linkage of the link retaining mechanism and the first end portion of the first short link of the second joint cross linkage of the link retaining mechanism under the state that the second long link of the second joint cross linkage of the link retaining mechanism is crossed with the first long link of the second joint cross linkage of the link retaining mechanism, the length ratio of each of the first and second short links of the first joint cross linkage of the link retaining mechanism to each of the first and second long links of the first joint cross linkage of the link retaining mechanism substantially equal to the length ratio of each of the first and second short links of the second joint cross linkage of the link retaining mechanism to each of the first and second long links of the second joint cross linkage of the link retaining mechanism, the first short link of the first joint cross linkage of the link retaining mechanism integrally formed with and in parallel relationship with the first long link of the second joint cross linkage of the link retaining mechanism under the state that the second end portion of the first short link of the first joint cross linkage of the link retaining mechanism is connected with the first end portion of the first long link of the second joint cross linkage of the link retaining mechanism, the first long link of the first joint cross linkage of the link retaining mechanism integrally formed with and in parallel relationship with the first short link of the second joint cross linkage of the link retaining mechanism under the state that the first end portion of the first long link of the first joint cross linkage of the link retaining mechanism is connected with the second end portion of the first short link of the second joint cross linkage of the link retaining mechanism, the first end portion of any one of the first and second arm links integrally formed with the second short link of the first joint cross linkage of the link retaining mechanism, the first end portion of the other one of the first and second arm links integrally formed with the second long link of the second joint cross linkage of the link retaining mechanism; and a robot arm driving mechanism for driving the robot arm.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

Figure 1:
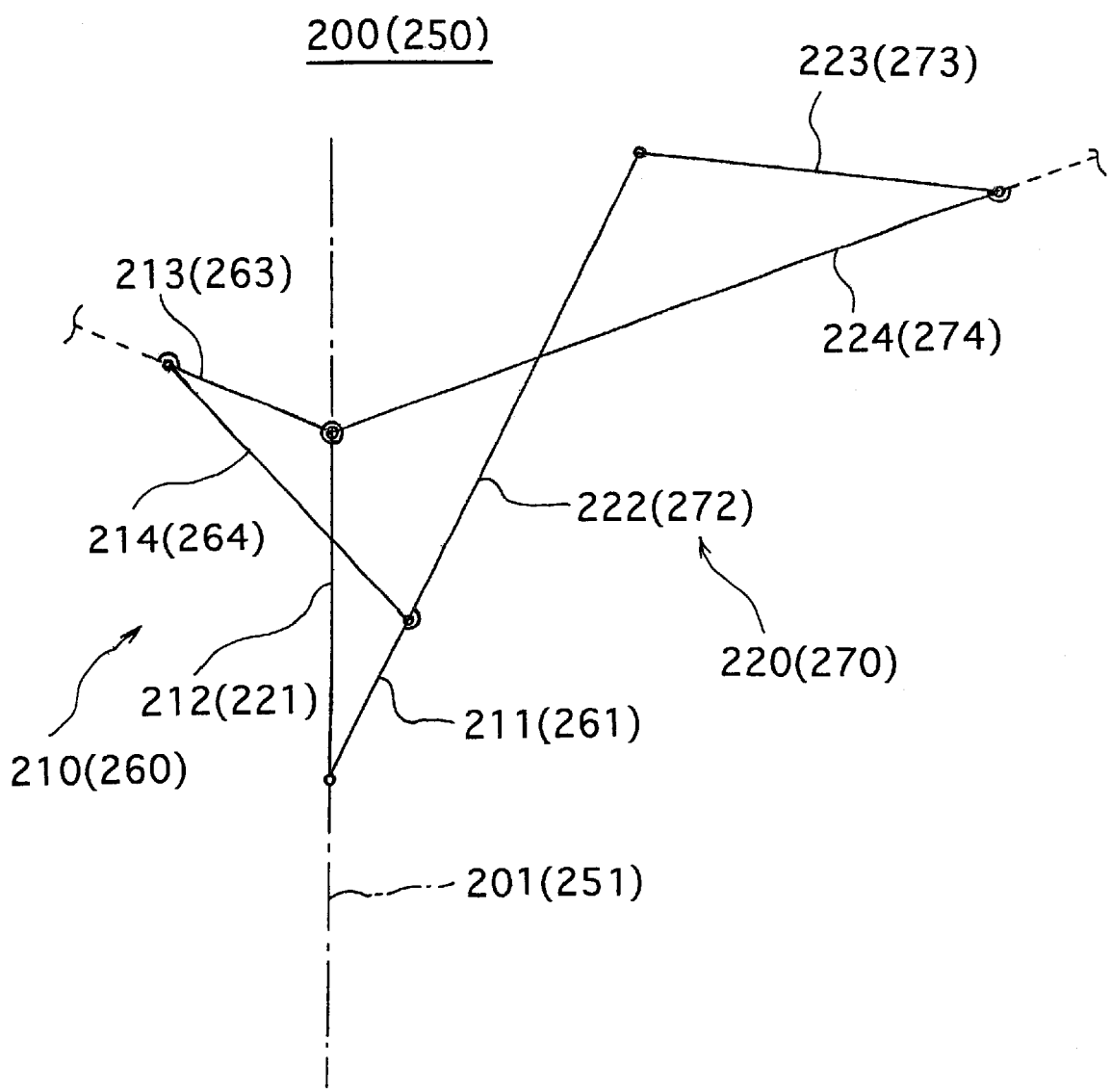
FIG. 1 is an enlarged fragmentary skeleton view of the robot arm mechanism shown in FIG. 2 to be used for explaining the principle of the robot arm mechanism according to the present invention.

Throughout the following detailed description, similar reference characters and numbers refer to similar elements in all figures of the drawings.

Referring to FIGS. 1 to 4 of the drawings, there is shown a first preferred embodiment of the robot arm mechanism according to the present invention. The robot arm mechanism 101 is shown in FIGS. 1 to 4 as comprising a handling member 125 for supporting and handling an object.

The handling member 125 should be configured to be available for handling, i.e., holding and releasing a wafer and other materials to be used for producing semiconductors. In this embodiment particularly shown in FIG. 2, the handling member 125 is formed with a recess 125a which is designed suitably to receive and release such materials. The configuration of the handling member 125 depends upon the sizes and shapes of the materials to be handled by the handling member 125 according to the present invention.

The robot arm mechanism 101 further comprises a robot arm 810 connected to the handling member 125. The robot arm 810 comprises a first arm link 811 having first and second end portion, a second arm link 812 having first and second end portion, and a link retaining mechanism 200 having a center line 201.

Figure 2:
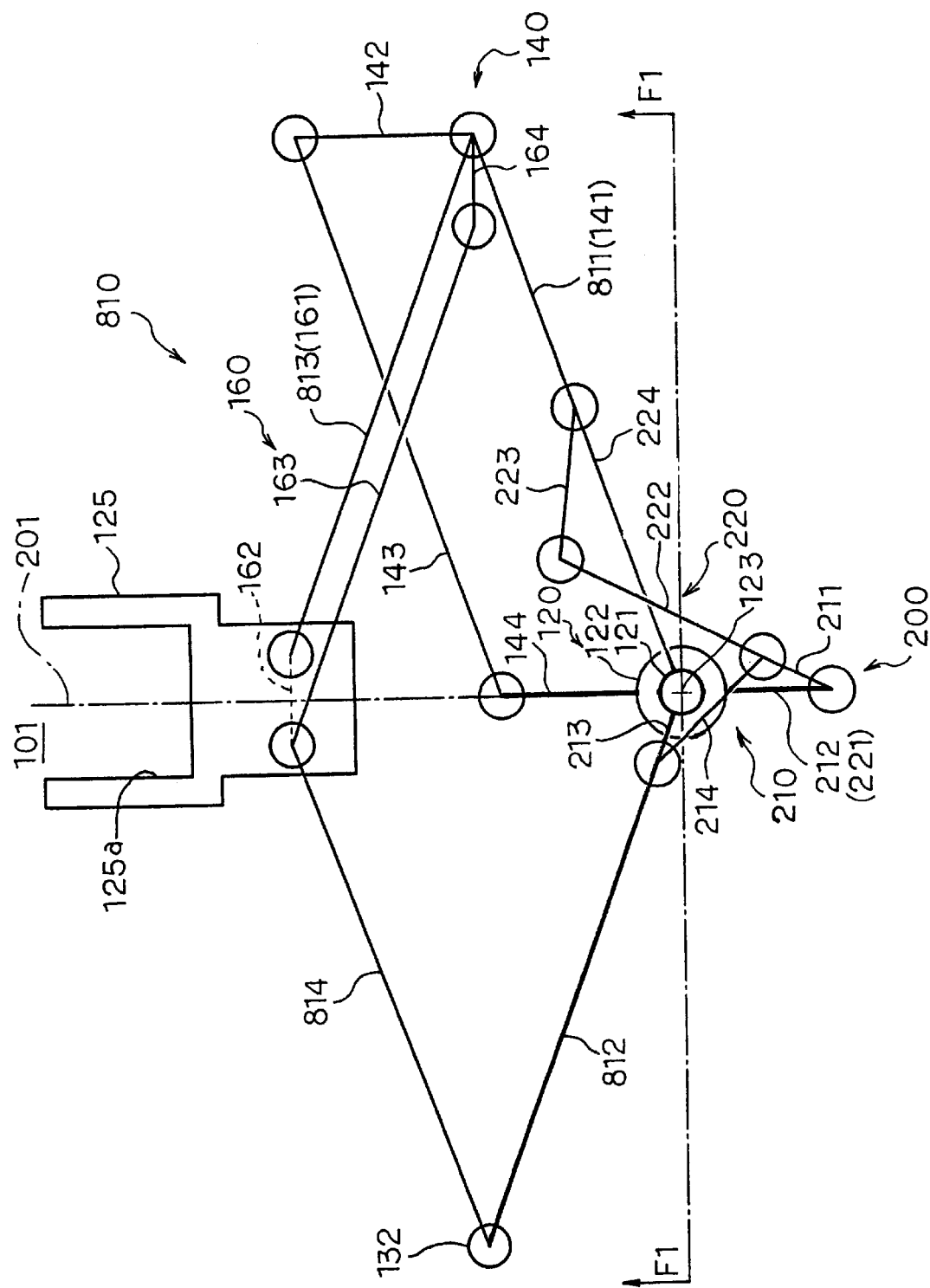
FIG. 2 is a skeleton view of one condition of the first preferred embodiment of the robot arm mechanism according to the present invention.
Figure 2A:
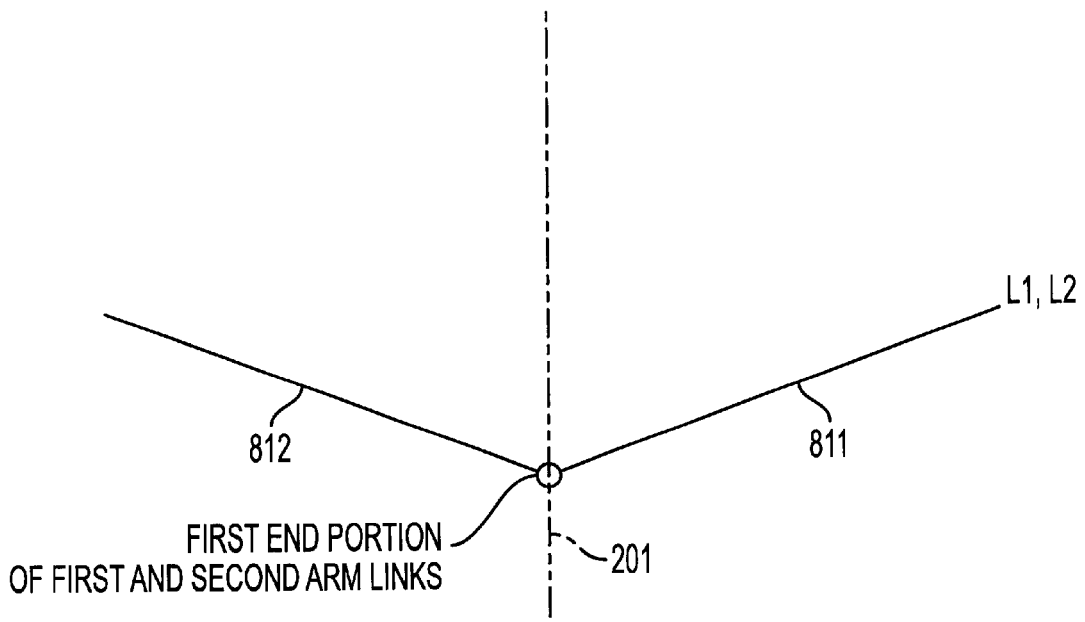
FIG. 2a and FIG. 2b are schematic illustrations used to explain the operation of the robot arm mechanism of FIG. 2.
Figure 2B:
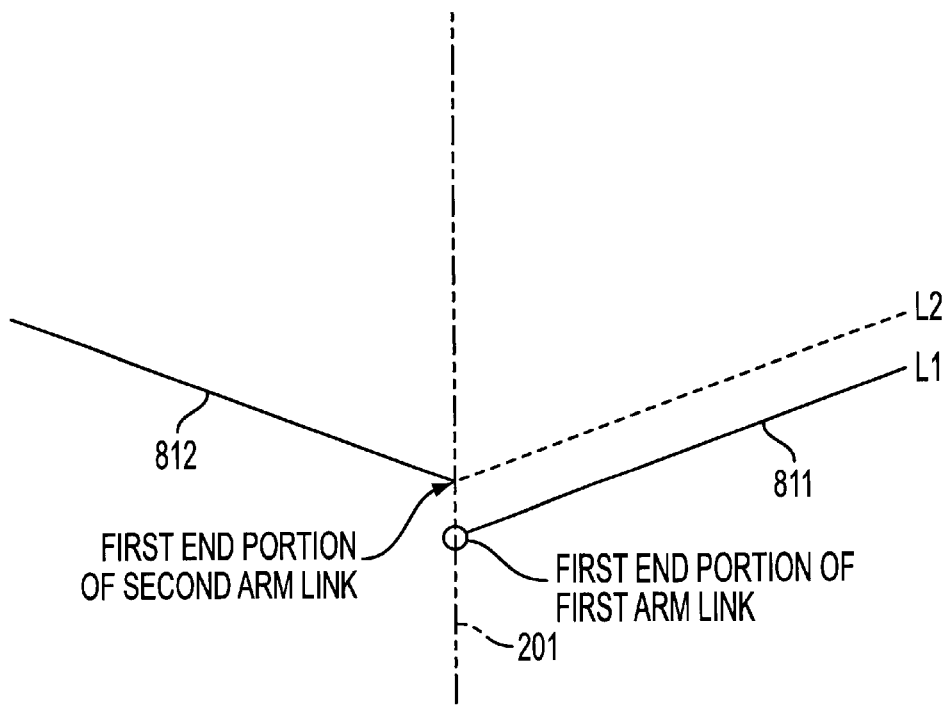
Figure 3:
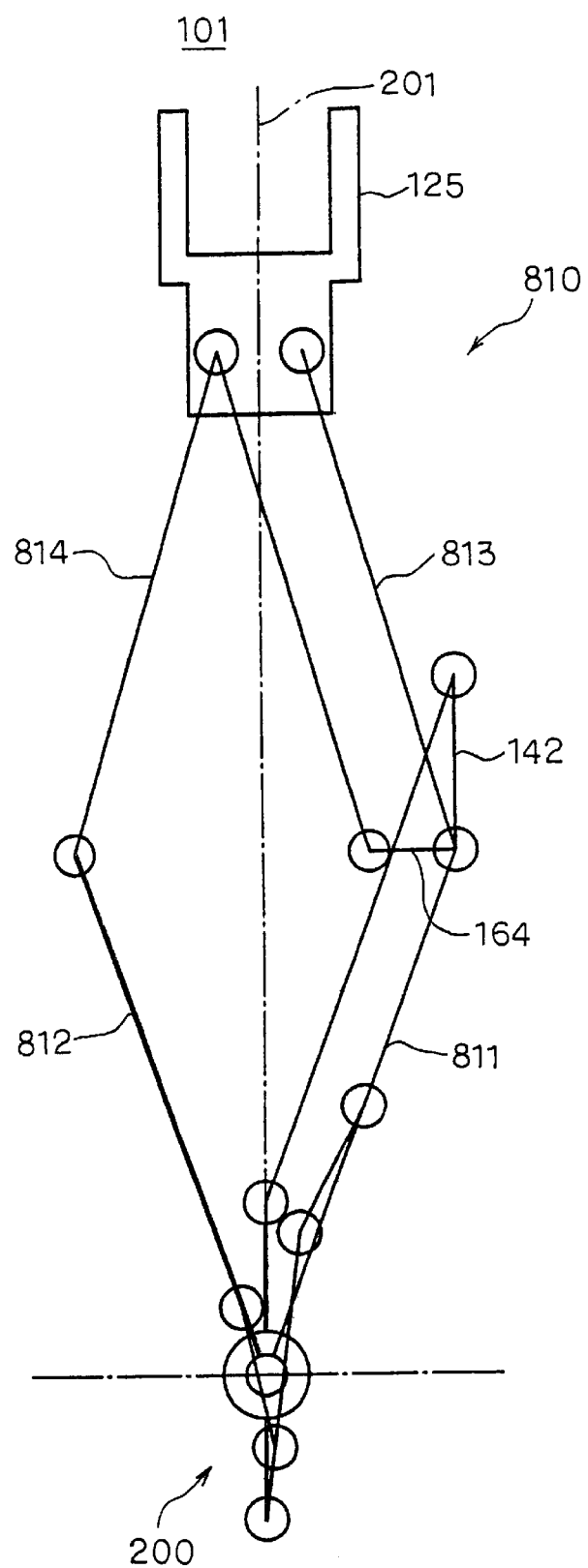
FIG. 3 is a skeleton view of another condition of the first preferred embodiment of the robot arm mechanism according to the present invention.
Figure 4:
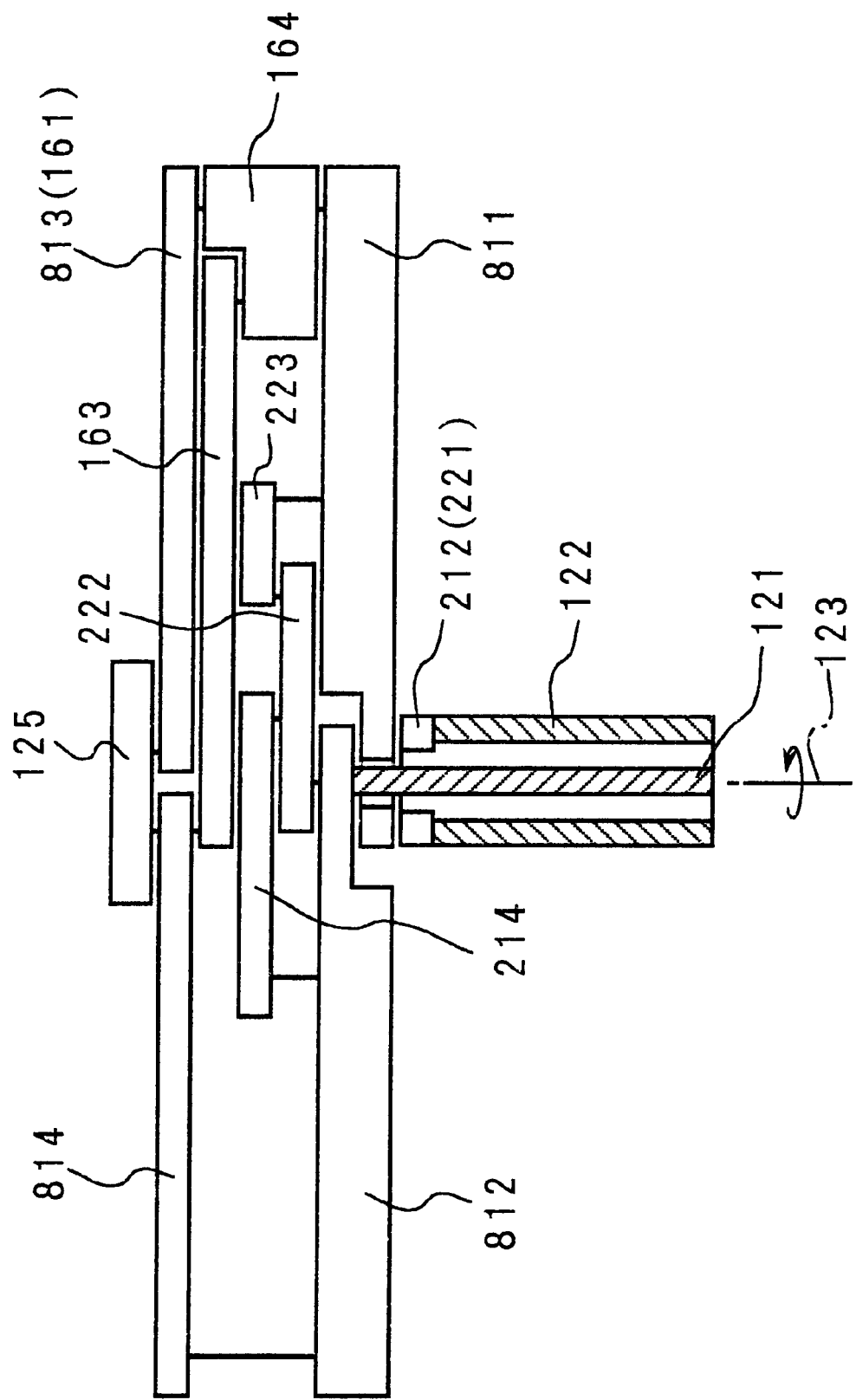
FIG. 4 is a cross-sectional view taken on the lines F1—F1 in FIG. 2.

The link retaining mechanism 200 pivotably retains the first and second arm links 811 and 812 respectively at the first end portions of the first and second arm links 811 and 812 and keeps parallel a first line and a second line, the first line being a line passing through the first and second end portions of the first arm link 811 and the second line being a line symmetrical with respect to the center line 201 with the line passing through the first and second end portions of the second arm link 812. In fact the first and second arm links 811 and 812 are in symmetrical relationship with each other with respect to the center line 201. The above-described parallel relationship is illustrated in FIGS. 2a and 2b. FIG. 2a illustrates the specific relationship shown in FIG. 2 wherein the first line L1 passing through the first and second end portions of the link 811 is maintained colinear with the line L2, which is symmetrical with respect to the center line 201 with the line passing through the first and second end portions of the second arm link 812. FIG. 2b illustrates the parallel relationship wherein the first line L1 passing through the first and second end portions of the link 811 is maintained parallel, but not colinear, with the second line L2 which is symmetrical with respect to the center line 201 with the line passing through the first and second end portions of the second arm link 812.

The link retaining mechanism 200 comprises a first joint cross linkage 210 which includes a first short link 211 having first and second end portions.

The first joint cross linkage 210 further includes a first long link 212 having first and second end portions and longer than the first short link 211. The first short and long links 211 and 212 are pivotably connected with each other at the second end portion of the first short link 211 and the first end portion of the first long link 212.

The first joint cross linkage 210 further includes a second short link 213 having first and second end portions and substantially equal in length to the first short link 211. The first long link 212 and the second short link 213 are pivotably connected with each other at the second end portion of the first long link 212 and the first end portion of the second short link 213.

The first joint cross linkage 210 further includes a second long 214 link having first and second end portions and substantially equal in length to the first long link 212. The second short and long links 213 and 214 are pivotably connected with each other at the second end portion of the second short link 213 and the first end portion of the second long link 214.

The second long link 214 and the first short link 211 are pivotably connected with each other at the second end portion of the second long link 214 and the first end portion of the first short link 211 under the state that the second long link 214 is crossed with the first long link 212.

The robot arm 810 comprises a second joint cross linkage 220 which includes a first short link 221 having first and second end portions. The first long link 212 and the first short link 221 are substantially equal in length to each other.

The second joint cross linkage 220 further includes a first long link 222 having first and second end portions and longer than the first short link 221. The first short and long links 221 and 222 are pivotably connected with each other at the second end portion of the first short link 221 and the first end portion of the first long link 222.

The second joint cross linkage 220 further includes a second short link 223 having first and second end portions and substantially equal in length to the first short link 221. The first long link 222 and the second short link 223 are pivotably connected with each other at the second end portion of the first long link 222 and the first end portion of the second short link 223.

The second joint cross linkage 220 further includes a second long link 224 having first and second end portions and substantially equal in length to the first long link 222. The second short and long links 223 and 224 are pivotably connected with each other at the second end portion of the second short link 223 and the first end portion of the second long link 224.

The second long link 224 and the first short link 221 are pivotably connected with each other at the second end portion of the second long link 224 and the first end portion of the first short link 221 under the state that the second long link 224 is crossed with the first long link 222.

The length ratio of each of the first and second short links 211 and 213 to each of the first and second long links 212 and 214 is substantially equal to the length ratio of each of the first and second short links 221 and 223 to each of the first and second long links 222 and 224.

The first short link 211 is integrally formed with and in coaxial relationship with the first long link 222 under the state that the second end portion of the first short link 211 is connected with the first end portion of the first long link 222. The first long link 212 is integrally formed with and in coaxial relationship with the first short link 221 under the state that the first end portion of the first long link 212 is connected with the second end portion of the first short link 221.

The first end portion of the second arm link 812 is integrally formed with the second short link 213. The first end portion of the first arm link 811 is integrally formed with the second long link 224. The center line 201 passes through the first and second end portions of the first long link 212. The first end portions of the first and second arm links 811 and 812 are positioned on the center line 201.

The robot arm 810 further comprises a third arm link 813 having first and second end portions. The handling member 125 has first and second portions. The third arm link 813 and the handling member 125 are pivotably connected with each other at the second end portion of the third arm link 813 and the first portion of the handling member 125.

The robot arm 810 further comprises a fourth arm link 814 having first and second end portions. The fourth arm link 814 and the handling member 125 are pivotably connected with each other at the second end portion of the fourth arm link 814 and the second portion of the handling member 125. The first and second arm links 811 and 812 are substantially equal in length to each other. The third and fourth arm links 813 and 814 are substantially equal in length to each other.

The robot arm 810 further comprises a first joint mechanism 140 retaining the first and third arm links 811 and 813 respectively at the second end portion of the first arm link 811 and the first end portion of the third arm link 813 under the state that the first arm link 811 is pivotable around the second end portion of the first arm link 811 with respect to the third arm link 813. The second end portion of the first arm link 811 and the first end portion of the third arm link 813 are connected with each other.

The first joint mechanism 140 comprises a first link 141 having first and second end portions and substantially equal in length to the first arm link 811. The first link 141 is integrally formed with and in coaxial relationship with the first arm link 811 under the state that the first end portion of the first link 141 is connected with the first end portion of the first arm link 811.

The first joint mechanism 140 further comprises a second link 142 having first and second end portions. The first and second links 141 and 142 are pivotably connected with each other at the second end portion of the first link 141 and the first end portion of the second link 142. The second link 142 is pivotably connected with the first end portion of the third arm link 813.

The first joint mechanism 140 further comprises a third link 143 having first and second end portions and substantially equal in length to the first link 141. The second and third links 142 and 143 are pivotably connected with each other at the second end portion of the second link 142 and the first end portion of the third link 143.

The first joint mechanism 140 further comprises a fourth link 144 having first and second end portions and substantially equal in length to the second link 142. The third and fourth links 143 and 144 are pivotably connected with each other at the second end portion of the third link 143 and the first end portion of the fourth link 144. The fourth and first links 144 and 141 are pivotably connected with each other at the second end portion of the fourth link 144 and the first end portion of the first link 141 under the state that the first link 141 is in parallel relationship with the third link 143 and that the second link 142 is in parallel relationship with the fourth link 144. The second end portion of the fourth link 144 is integrally connected with the first long link 212.

The robot arm 810 further comprises a second joint mechanism 132 retaining the second and fourth arm links 812 and 814 respectively at the second end portion of the second arm link 812 and the first end portion of the fourth arm link 814 under the state that the second arm link 812 is pivotable around the second end portion of the second arm link 812 with respect to the fourth arm link 814. The second end portion of the second arm link 812 and the first end portion of the fourth arm link 814 are connected with each other.

The robot arm 810 further comprises a stabilizing mechanism 160 which includes a first link 161 having first and second end portions and substantially equal in length to the third arm link 813. The first link 161 is integrally formed with and in coaxial relationship with the third arm link 813 under the state that the first end portion of the first link 161 is connected with the first end portion of the third arm link 813.

The stabilizing mechanism 160 further includes a second link 162 having first and second end portions. The first and second links 161 and 162 are pivotably connected with each other at the second end portion of the first link 161 and the first end portion of the second link 162. The second link 162 is integrally formed with the handling member 125.

The stabilizing mechanism 160 further includes a third link 163 having first and second end portions and substantially equal in length to the first link 161. The second and third links 162 and 163 are pivotably connected with each other at the second end portion of the second link 162 and the first end portion of the third link 163.

The stabilizing mechanism 160 further includes a fourth link 164 having first and second end portions and substantially equal in length to the second link 162. The third and fourth links 163 and 164 are pivotably connected with each other at the second end portion of the third link 163 and the first end portion of the fourth link 164. The fourth and first links 164 and 161 are pivotably connected with each other at the second end portion of the fourth link 164 and the first end portion of the first link 161 under the state that the first link 161 is in parallel relationship with the third link 163 and that the second link 162 is in parallel relationship with the fourth link 164. The second end portion of the fourth link 164 is integrally connected with the second link 142.

The robot arm mechanism 101 further comprises a robot arm driving mechanism 120 for driving the robot arm 810.

The arm driving mechanism 120 comprises a first driving shaft 121 rotatable around a rotation axis 123.

The arm driving mechanism 120 further comprises a second driving shaft 122 in the form of a hollow shape to rotatably receive therein the first driving shaft 121 and rotatable around the rotation axis 123.

The second driving shaft 122 is integrally connected with the first long link 212 and rotates the first long link 212 around the rotation axis 123. The first driving shaft 121 is integrally connected with the first arm link 811 and rotates the first arm link 811 around the first end portion of the first arm link 811.

When the second driving shaft 122 rotates the first long link 212 around the rotation axis 123, the center line 201 is rotated around the rotation axis 123. This results in the rotation of the robot arm mechanism 101 around the rotation axis 123.

When the first arm link 811 is rotated by the first driving shaft 121 with respect to the first long link 212, the fact that the first and second arm links 811 and 812 are respectively and integrally formed with the second long link 224 and the second short link 213 results in the rotation of the second arm link 812 with respect to the first long link 212 and the first arm link 811. This results in the contracted or extended condition of the robot arm mechanism 101.

While there have been described in the above about the fact that the second driving shaft 122 is integrally connected with the first long link 212 and that the first driving shaft 121 is integrally connected with the first arm link 81 , the first driving shaft 121 may be integrally connected with the second arm link 812 instead of the first arm link 811, according to the present invention.

In this case that the first driving shaft 121 is integrally connected with the second arm link 812 instead of the first arm link 811, the operation of the robot arm mechanism 101 is similar to the robot arm mechanism 101 in the case that the first driving shaft 121 is integrally connected with the first arm link 811.

While there have been described in the above about the fact that the second driving shaft 122 is integrally connected with the first long link 212 and that the first driving shaft 121 is integrally connected with the first arm link 811, the second driving shaft 122 may be integrally connected with the second arm link 812 instead of the first long link 212, according to the present invention.

In this case that the first long link 212 is replaced by the second arm link 812, the second long link 224 is rotated around the rotation axis 123 when the first arm link 811 is rotated by the first driving shaft 121, resulting from the fact that the first arm link 811 is integrally formed with the second long link 224. When the second arm link 812 is rotated by the second driving shaft 122, the fact that the second arm link 812 is integrally formed with the second short link 213 results in the rotation of the second short link 213 around the rotation axis 123. The rotation of the second long link 224 and the rotation of the second short link 213 can result in the rotation of the first long link 212 around the rotation axis 123. This results in the rotation of the center line 201. The rotation of the center line 201 around the rotation axis 123 results in the rotation of the robot arm mechanism 101 around the rotation axis 123.

When the first arm link 811 rotated by the first driving shaft 121 rotates with respect to the second arm link 812 rotated by the second driving shaft 122, the robot arm mechanism 101 can be contracted and extended.

According to the present invention, the first and second driving shafts 121 and 122 may be replaced by each other about the connection with the first arm link 811, the second arm link 812, or the first long link 212.

According to the present invention, the fact that the fourth link 144 is integrally connected with the first long link 212 results in the fact that the fourth link 144 is at all times at a same angle to the center line 201. This results in the fact that the second link 142 in parallel relation with the fourth link 144 is at all times at a same angle to the center line 201. This results in the fact that the fourth link 164 integrally connected with the second link 142 is at all times at a same angle to the center line 201. This results in the fact that the second link 162 in parallel relationship with the fourth link 164 is at all times at a same angle to the center line 201. This results in the fact that the handling member 125 integrally formed with the second link 162 is at all times at a same angle to the center line 201.

Figure 5:
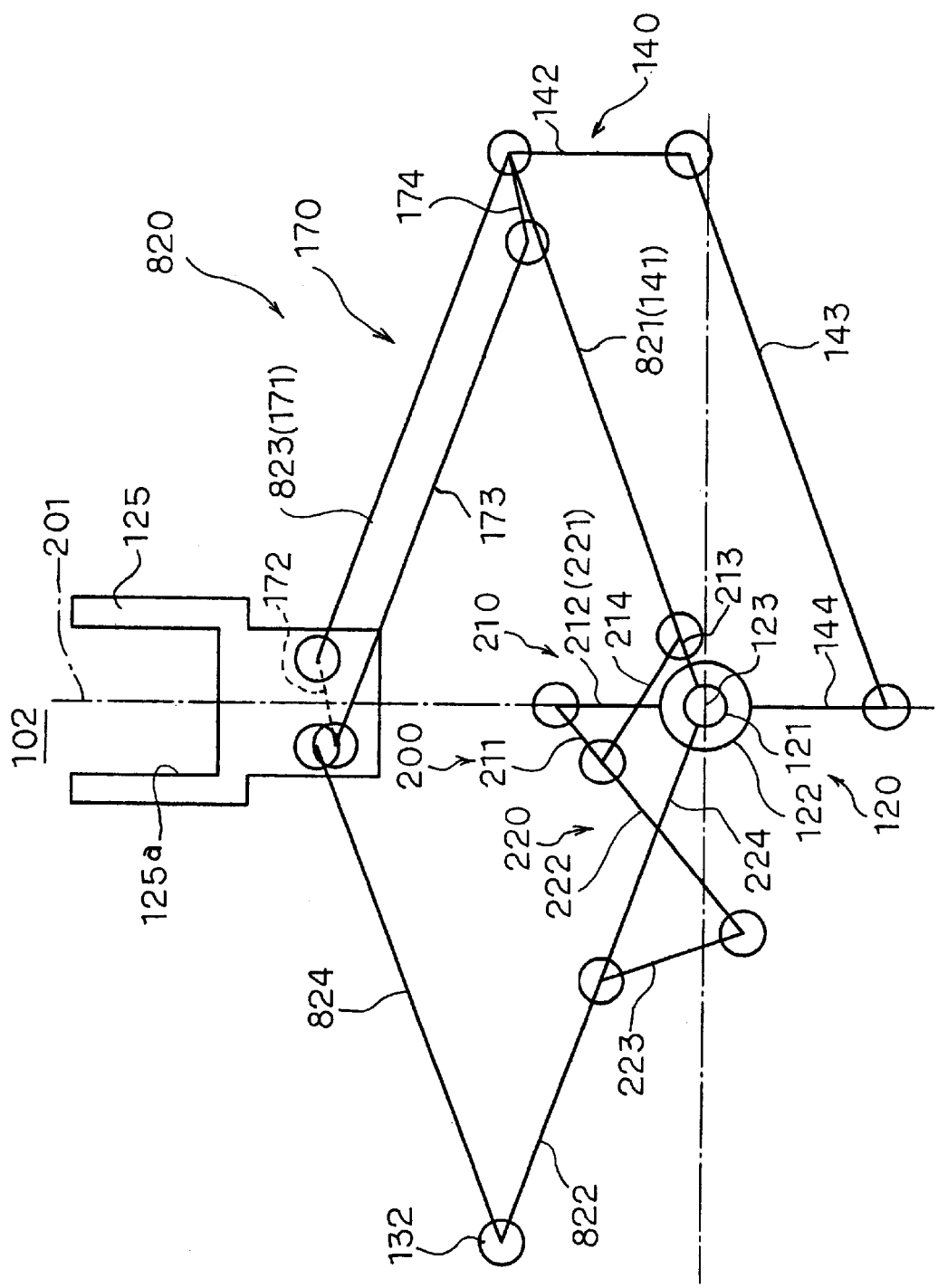
FIG. 5 is a skeleton view of one condition of the second preferred embodiment of the robot arm mechanism according to the present invention.
Figure 6:
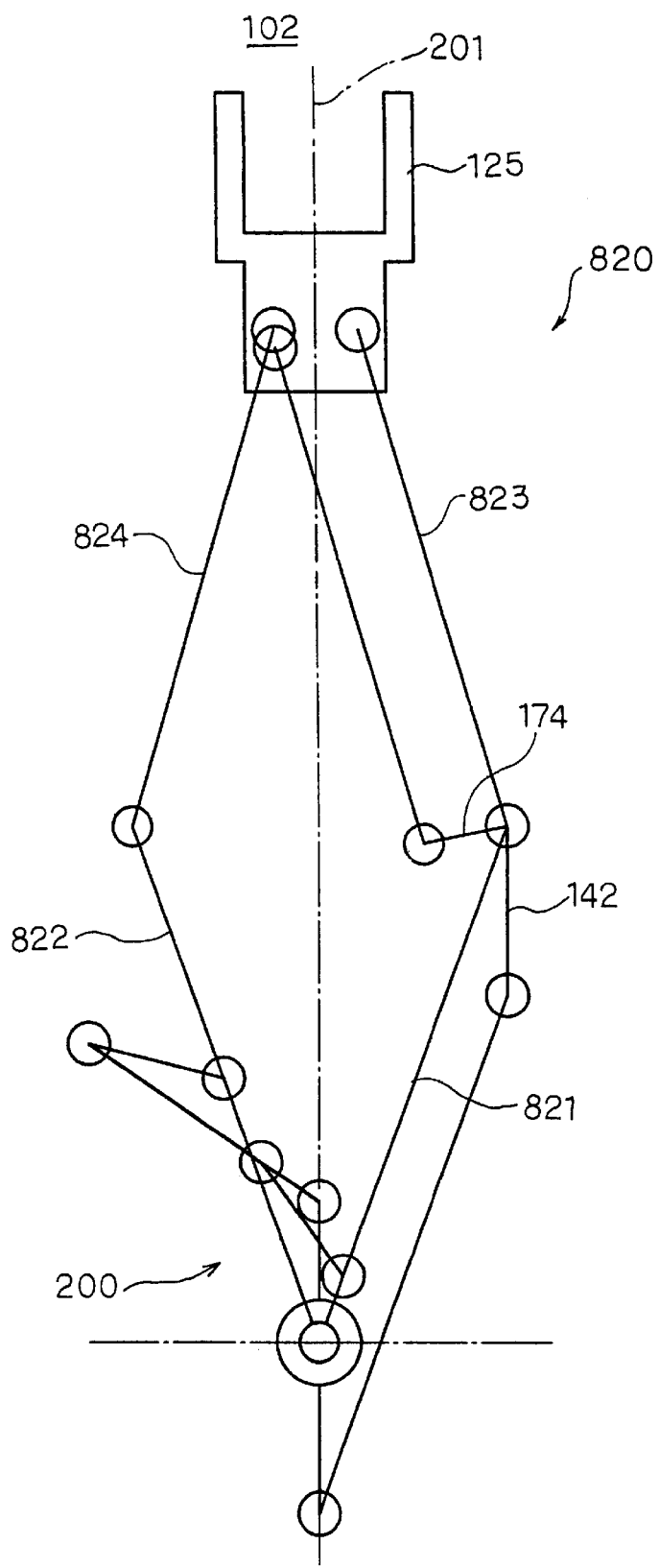
FIG. 6 is a skeleton view of another condition of the second preferred embodiment of the robot arm mechanism according to the present invention.

Referring to FIGS. 5 and 6 of the drawings, there is shown a second preferred embodiment of the robot arm mechanism according to the present invention. The robot arm mechanism 102 is shown in FIGS. 5 and 6 as comprising a handling member 125 for supporting and handling an object.

The robot arm mechanism 102 further comprises a robot arm 820 connected to the handling member 125. The robot arm 820 comprises a first arm link 821 having first and second end portion, a second arm link 822 having first and second end portion, and a link retaining mechanism 200.

The link retaining mechanism 200 pivotably retains the first and second arm links 821 and 822 respectively at the first end portions of the first and second arm links 821 and 822 and keeps parallel a first line and a second line, the first line being a line passing through the first and second end portions of the first arm link 821 and the second line being a line symmetrical with respect to the center line 201 with the line passing through the first and second end portions of the second arm link 822. The first end portion of the first arm link 821 is integrally formed with the second short link 213. The first end portion of the second arm link 822 is integrally formed with the second long link 224. The first end portions of the first and second arm links 821 and 822 are positioned on the center line 201. In fact the first and second arm links 821 and 822 are in symmetrical relationship with each other with respect to the center line 201.

The robot arm 820 further comprises a third arm link 823 having first and second end portions. The third arm link 823 and the handling member 125 are pivotably connected with each other at the second end portion of the third arm link 823 and the first portion of the handling member 125.

The robot arm 820 further comprises a fourth arm link 824 having first and second end portions. The fourth arm link 824 and the handling member 125 are pivotably connected with each other at the second end portion of the fourth arm link 824 and the second portion of the handling member 125. The first and second arm links 821 and 822 are substantially equal in length to each other. The third and fourth arm links 823 and 824 are substantially equal in length to each other.

The robot arm 820 further comprises a first joint mechanism 140 retaining the first and third arm links 821 and 823 respectively at the second end portion of the first arm link 821 and the first end portion of the third arm link 823 under the state that the first arm link 821 is pivotable around the second end portion of the first arm link 821 with respect to the third arm link 823. The second end portion of the first arm link 821 and the first end portion of the third arm link 823 are connected with each other. The first link 141 of the first joint mechanism 140 is substantially equal in length to the first arm link 821. The first link 141 is integrally formed with and in coaxial relationship with the first arm link 821 under the state that the first end portion of the first link 141 is connected with the first end portion of the first arm link 821. The second link 142 of the first joint mechanism 140 is pivotably connected with the first end portion of the third arm link 823. The second end portion of the fourth link 144 of the first joint mechanism 140 is integrally connected with the first long link 212.

The robot arm 820 further comprises a second joint mechanism 132 retaining the second and fourth arm links 822 and 824 respectively at the second end portion of the second arm link 822 and the first end portion of the fourth arm link 824 under the state that the second arm link 822 is pivotable around the second end portion of the second arm link 822 with respect to the fourth arm link 824. The second end portion of the second arm link 822 and the first end portion of the fourth arm link 824 are connected with each other.

The robot arm 820 further comprises a stabilizing mechanism 170 similar to the stabilizing mechanism 160 in the first preferred embodiment of the robot arm mechanism according to the present invention. The stabilizing mechanism 170 includes first, second, third, and fourth links 171, 172, 173, and 174 which are respectively similar to first, second, third, and fourth links 161, 162, 163, and 164 in the first preferred embodiment of the robot arm mechanism according to the present invention. The stabilizing mechanism 170 and the stabilizing mechanism 160 in the first preferred embodiment are different from each other in the fact that the fourth link 174 has a set angle with respect to the second link 142 to prevent the state that the first and third links 171 and 173 are positioned on a straight line while the robot arm driving mechanism 120 drives the robot arm 820.

The first link 171 is substantially equal in length to the third arm link 823. The first link 171 is integrally formed with and in coaxial relationship with the third arm link 823 under the state that the first end portion of the first link 171 is connected with the first end portion of the third arm link 823. The second link 172 is integrally formed with the handling member 125. The second end portion of the fourth link 174 is integrally connected with the second link 142.

The robot arm mechanism 102 further comprises a robot arm driving mechanism 120 for driving the robot arm 820. The second driving shaft 122 of the arm driving mechanism 120 is integrally connected with the first long link 212 and rotates the first long link 212 around the rotation axis 123. The first driving shaft 121 of the arm driving mechanism 120 is integrally connected with the first arm link 821 and rotates the first arm link 821 around the first end portion of the first arm link 821.

While there have been described in the above about the fact that the second driving shaft 122 is integrally connected with the first long link 212 and that the first driving shaft 121 is integrally connected with the first arm link 821, the first driving shaft 121 may be integrally connected with the second arm link 822 instead of the first arm link 821, according to the present invention.

While there have been described in the above about the fact that the second driving shaft 122 is integrally connected with the first long link 212 and that the first driving shaft 121 is integrally connected with the first arm link 821, the second driving shaft 122 may be integrally connected with the second arm link 822 instead of the first long link 212, according to the present invention.

According to the present invention, the first and second driving shafts 121 and 122 may be replaced by each other about the connection with the first arm link 821, the second arm link 822, or the first long link 212.

The operation of the robot arm mechanism 102 in the second preferred embodiment is similar to the operation of the robot arm mechanism 101 in the first preferred embodiment according to the present invention except for the fact that the stabilizing mechanism 170 prevents the state that the first and third links 171 and 173 are positioned on a straight line while the robot arm driving mechanism 120 drives the robot arm 820.

Figure 7:
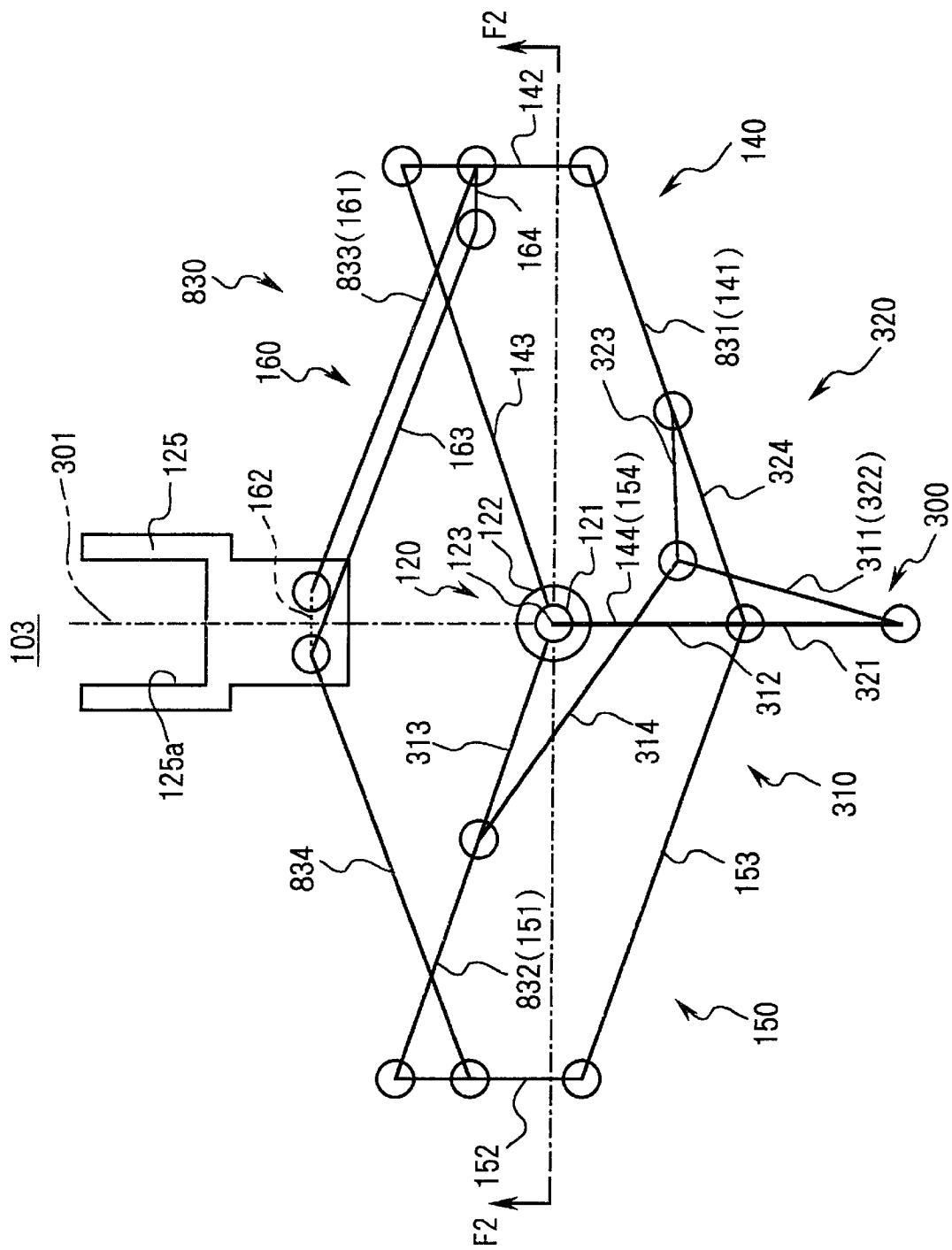
FIG. 7 is a skeleton view of the third preferred embodiment of the robot arm mechanism according to the present invention.
Figure 8:
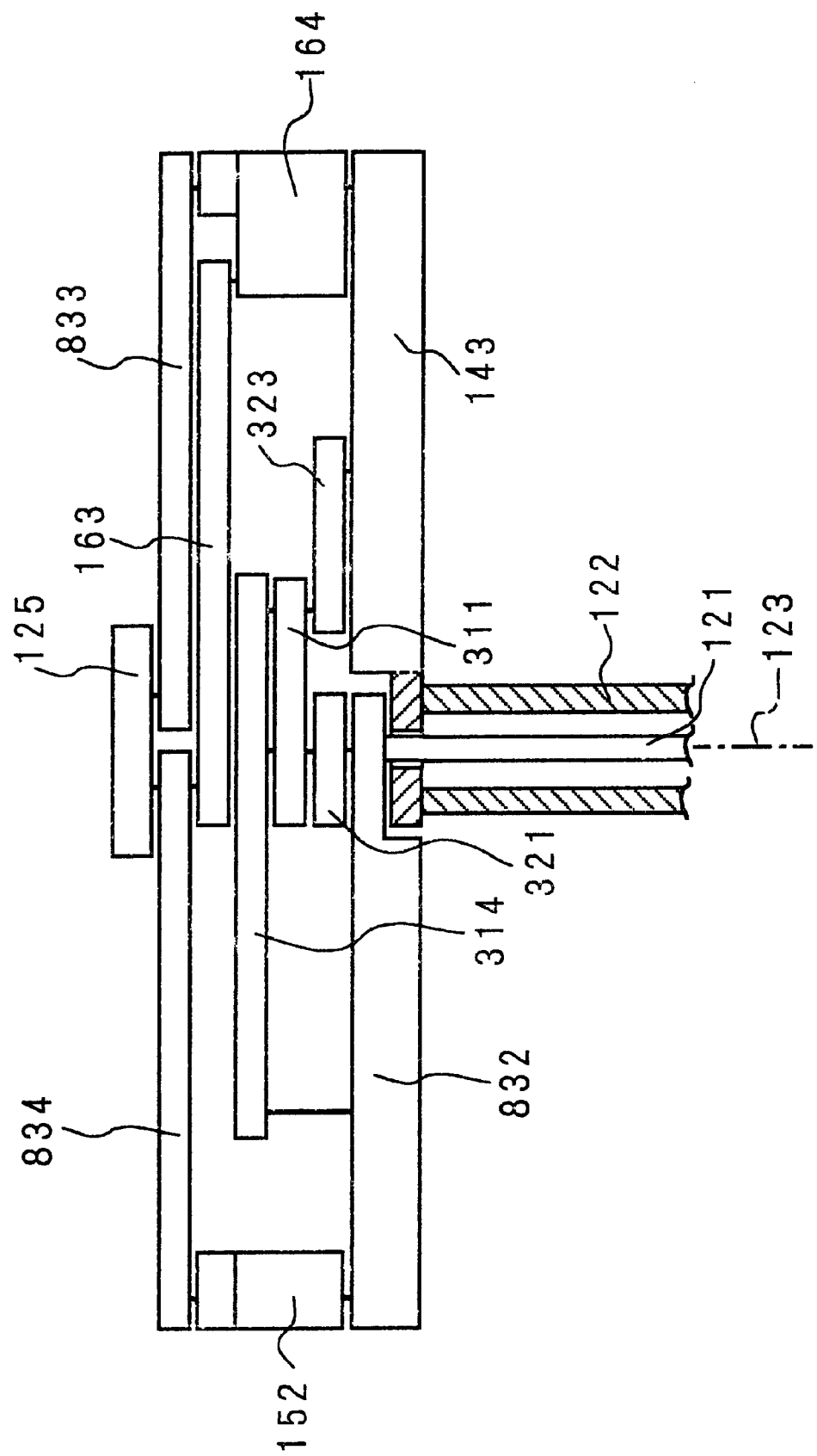
FIG. 8 is a cross-sectional view taken on the lines F2—F2 in FIG. 7.

Referring to FIGS. 7 and 8 of the drawings, there is shown a third preferred embodiment of the robot arm mechanism according to the present invention. The robot arm mechanism 103 is shown in FIGS. 7 and 8 as comprising a handling member 125 for supporting and handling an object.

The robot arm mechanism 103 further comprises a robot arm 830 connected to the handling member 125. The robot arm 830 comprises a first arm link 831 having first and second end portion, a second arm link 832 having first and second end portion, and a link retaining mechanism 300 having a center line 301.

The link retaining mechanism 300 comprises first and second joint cross linkages 310 and 320 are respectively similar to the first and second joint cross linkages 210 and 220 in the first preferred embodiment of the robot arm mechanism according to the present invention. The first joint cross linkage 310 includes first short and long links 311 and 312 and second short and long links 313 and 314 which are respectively similar to first short and long links 211 and 212 and second short and long links 213 and 214 in the first preferred embodiment of the robot arm mechanism according to the present invention. The second joint cross linkage 320 includes first short and long links 321 and 322 and second short and long links 323 and 324 which are respectively similar to first short and long links 221 and 222 and second short and long links 223 and 224 in the first preferred embodiment of the robot arm mechanism according to the present invention.

The link retaining mechanism 300 similar to the link retaining mechanism 200 in the first preferred embodiment of the robot arm mechanism according to the present invention, except for the fact that the first long link 312 and the first short link 321 are differ in length from each other and the first short link 311 and the first long link 322 are substantially equal in length to each other.

The link retaining mechanism 300 pivotably retains the first and second arm links 831 and 832 respectively at the first end portions of the first and second arm links 831 and 832 and keeps parallel a first line and a second line, the first line being a line passing through the first and second end portions of the first arm link 831 and the second line a line symmetrical with respect to the center line 301 with the line passing through the first and second end portions of the second arm link 832.

The first end portion of the second arm link 832 is integrally formed with the second short link 313. The first end portion of the first arm link 831 is integrally formed with the second long link 324. The center line 301 passes through the first and second end portions of the first long link 312. The first end portions of the first and second arm links 831 and 832 are positioned on the center line 301.

The robot arm 830 further comprises a third arm link 833 having first and second end portions. The third arm link 833 and the handling member 125 are pivotably connected with each other at the second end portion of the third arm link 833 and the first portion of the handling member 125.

The robot arm 830 further comprises a fourth arm link 834 having first and second end portions. The fourth arm link 834 and the handling member 125 are pivotably connected with each other at the second end portion of the fourth arm link 834 and the second portion of the handling member 125. The first and second arm links 831 and 832 are substantially equal in length to each other. The third and fourth arm links 833 and 834 are substantially equal in length to each other.

The robot arm 830 further comprises a first joint mechanism 140 retaining the first and third arm links 831 and 833 respectively at the second end portion of the first arm link 831 and the first end portion of the third arm link 833 under the state that the first arm link 831 is pivotable around the second end portion of the first arm link 831 with respect to the third arm link 833. The first link 141 of the first joint mechanism 140 is substantially equal in length to the first arm link 831. The first link 141 is integrally formed with and in coaxial relationship with the first arm link 831 under the state that the first end portion of the first link 141 is connected with the first end portion of the first arm link 831. The second link 142 of the first joint mechanism 140 is pivotably connected with the first end portion of the third arm link 833. The second end portion of the fourth link 144 of the first joint mechanism 140 is integrally connected with the first long link 212.

The robot arm 830 further comprises a second joint mechanism 150 similar to the first joint mechanism 140 and retaining the second and fourth arm links 832 and 834 respectively at the second end portion of the second arm link 832 and the first end portion of the fourth arm link 834 under the state that the second arm link 832 is pivotable around the second end portion of the second arm link 832 with respect to the fourth arm link 834. The second joint mechanism 150 comprises the first, second, third, and fourth links 151, 152, 153, and 154 which are respectively similar to the first, second, third, and fourth links 141, 142, 143, and 144. The first link 151 of the second joint mechanism 150 is substantially equal in length to the second arm link 832. The first link 151 is integrally formed with and in coaxial relationship with the second arm link 832 under the state that the first end portion of the first link 151 is connected with the first end portion of the second arm link 832. The second link 152 of the second joint mechanism 150 is pivotably connected with the first end portion of the fourth link 834. The second end portion of the fourth link 154 of the second joint mechanism 150 is integrally connected with the first long link 212.

The fourth links 144 and 154 are substantially equal in length to each other. The fourth links 144 and 154 are integrally formed with and in coaxial relationship with each other under the state that the first end portion of the fourth link 144 is connected with the first end portion of the fourth link 154.

The robot arm 830 further comprises a stabilizing mechanism 160. The first link 161 of the stabilizing mechanism 160 is substantially equal in length to the third arm link 833. The first link 161 is integrally formed with and in coaxial relationship with the third arm link 833 under the state that the first end portion of the first link 161 is connected with the first end portion of the third arm link 833. The second link 162 of the stabilizing mechanism 160 is integrally formed with the handling member 125. The second end portion of the fourth link 164 of the stabilizing mechanism 160 is integrally connected with the second link 142.

The robot arm mechanism 103 further comprises a robot arm driving mechanism 120 for driving the robot arm 830.

The second driving shaft 122 of the robot arm driving mechanism 120 is integrally connected with the first long link 312 and rotates the first long link 312 around the rotation axis 123. The first driving shaft 121 of the robot arm driving mechanism 120 is integrally connected with the third link 143 of the first joint mechanism 140 and rotates the first arm link 831 around the first end portion of the first arm link 831 through the first joint mechanism 140.

While there have been described in the above about the fact that the second driving shaft 122 is integrally connected with the first long link 312 and that the first driving shaft 121 is integrally connected with the third link 143, the first driving shaft 121 may be integrally connected with the second arm link 832 instead of the third link 143, according to the present invention.

While there have been described in the above about the fact that the second driving shaft 122 is integrally connected with the first long link 312 and that the first driving shaft 121 is integrally connected with the third link 143, the second driving shaft 122 may be integrally connected with the second arm link 832 instead of the first long link 312, according to the present invention.

According to the present invention, the first and second driving shafts 121 and 122 may be replaced by each other about the connection with the third link 143, the second arm link 832, or the first long link 312.

The operation of the robot arm mechanism 103 in the third preferred embodiment is similar to the operation of the robot arm mechanism 101 in the first preferred embodiment except for the fact that the first and second joint mechanisms 140 and 150 firmly retains the first and second arm links 831 and 832 respectively, according to the present invention.

Figure 9:
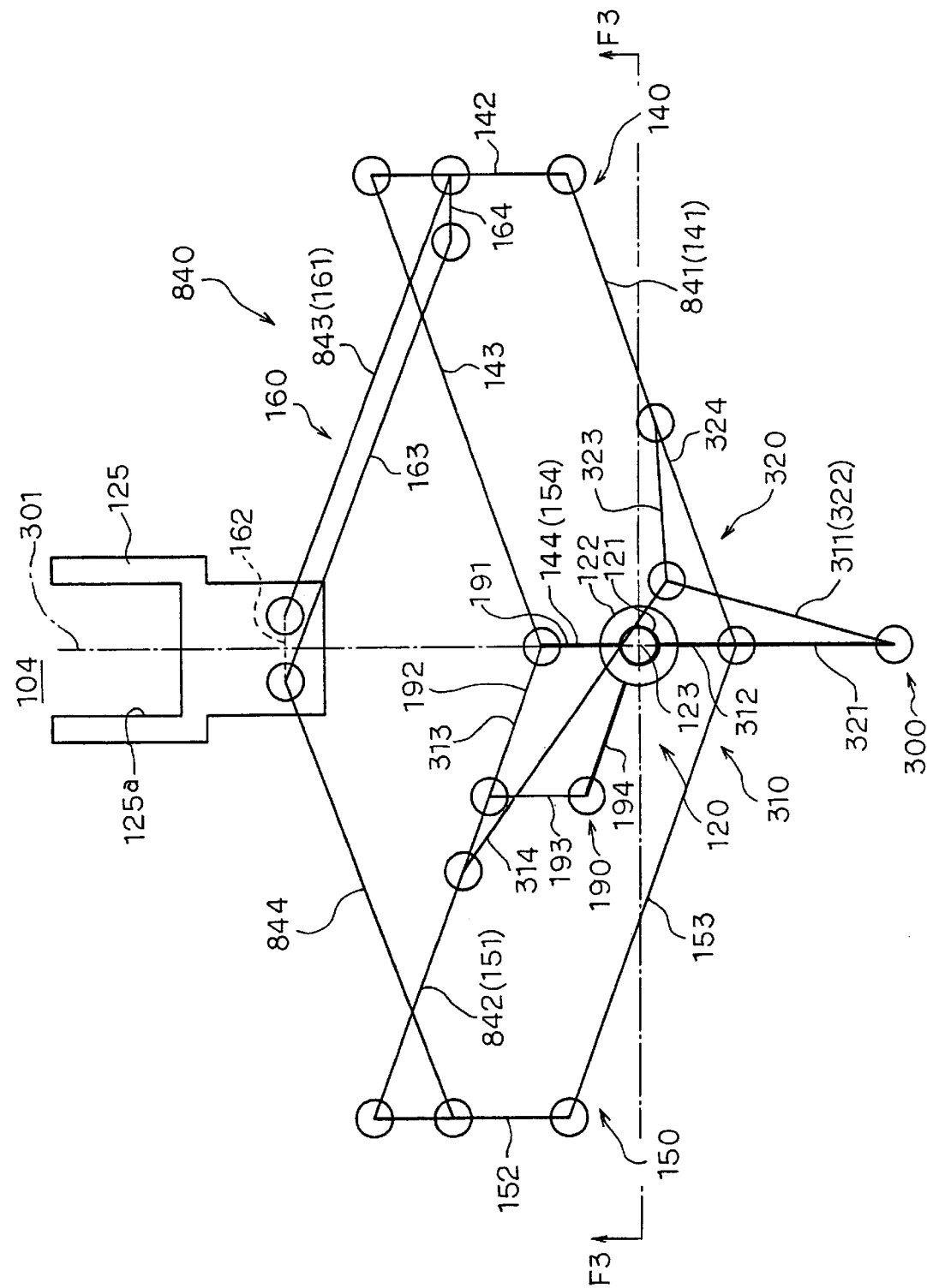
FIG. 9 is a skeleton view of one condition of the fourth preferred embodiment of the robot arm mechanism according to the present invention.
Figure 10:
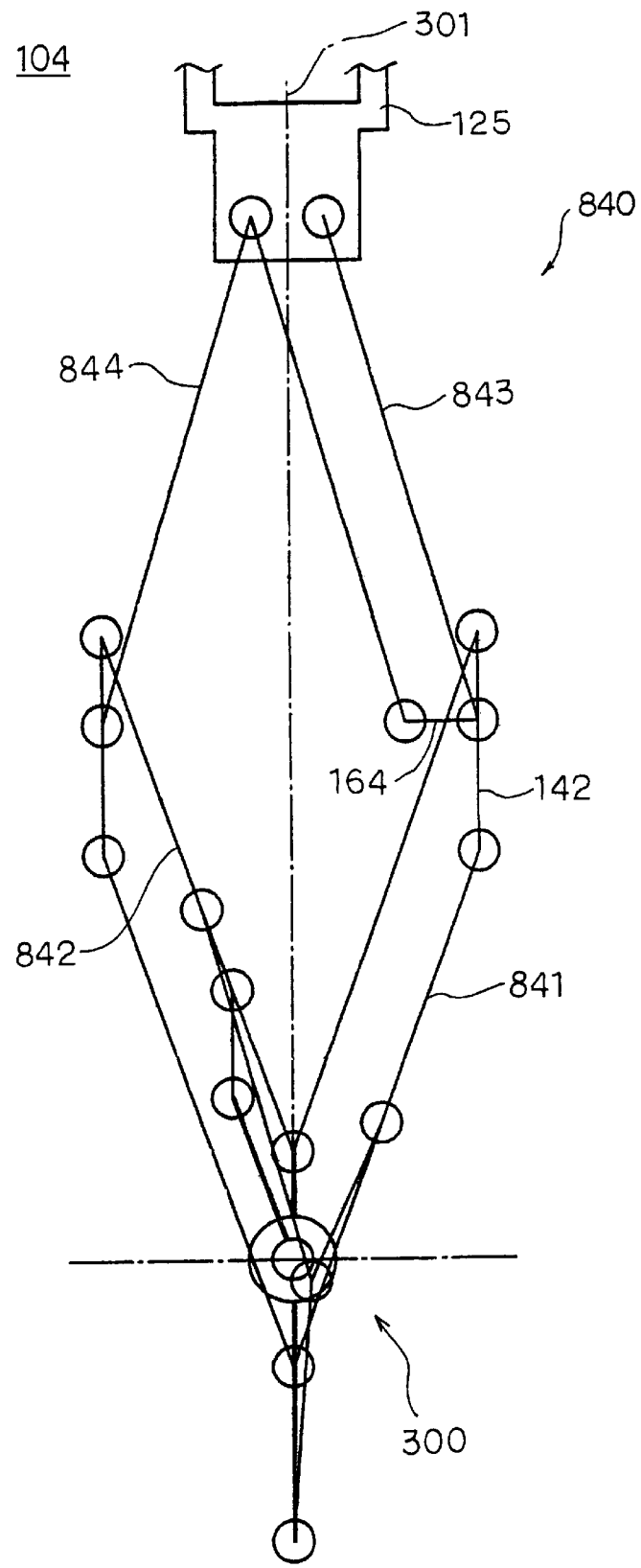
FIG. 10 is a skeleton view of another condition of the fourth preferred embodiment of the robot arm mechanism according to the present invention.
Figure 11:
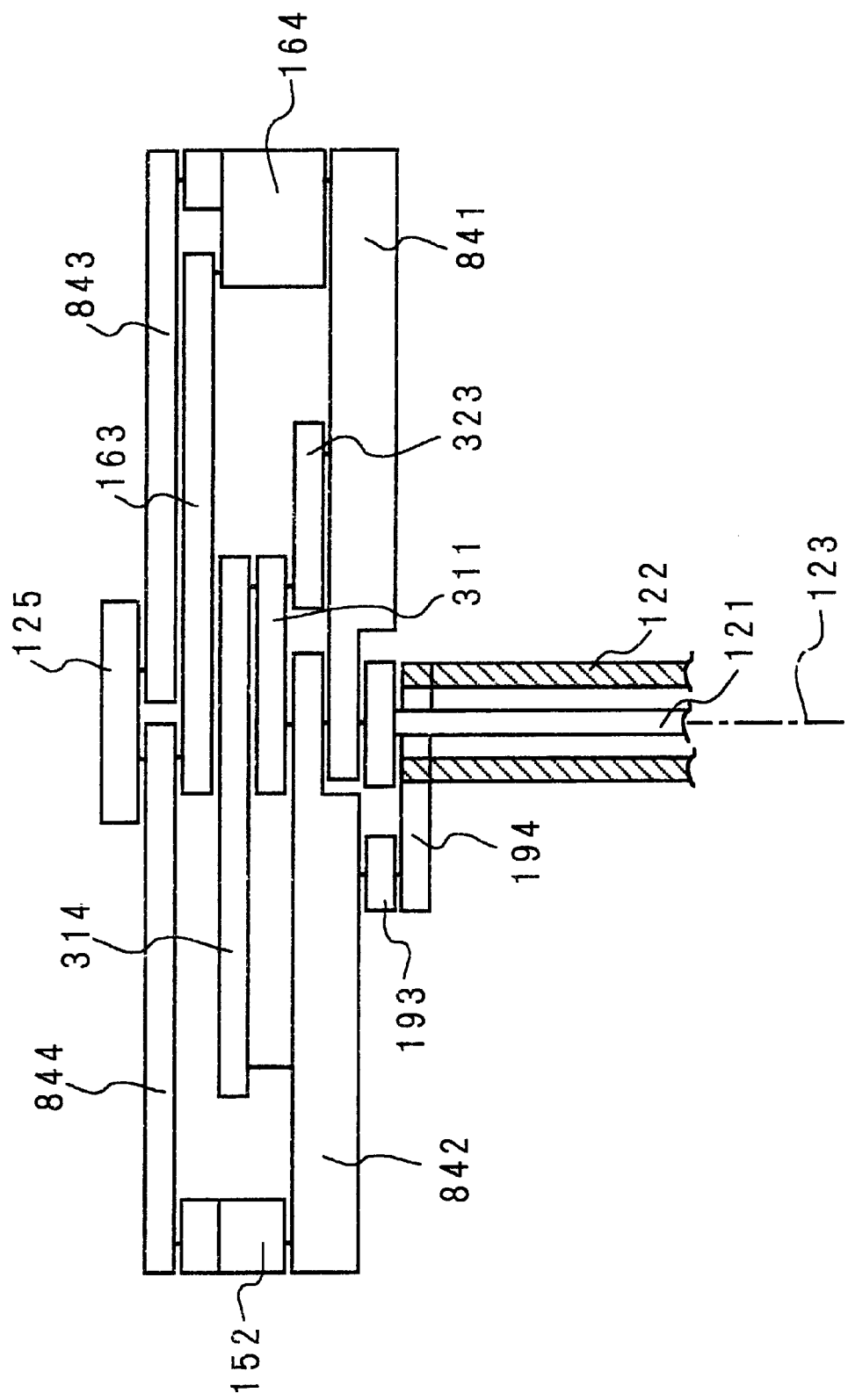
FIG. 11 is a cross-sectional view taken on the lines F3—F3 in FIG. 9.

Referring to FIGS. 9 to 11 of the drawings, there is shown a fourth preferred embodiment of the robot arm mechanism according to the present invention. The robot arm mechanism 104 is shown in FIGS. 9 to 11 as comprising a handling member 125 for supporting and handling an object, a robot arm 840, and a robot arm driving mechanism 120 for driving the robot arm 840. The robot arm 840 comprises a driving assist parallelogram linkage 190.

The robot arm 840 further comprises first, second, third, and fourth arm links 841, 842, 843, and 844 which are similar to the first, second, third, and fourth arm links 831, 832, 833, and 834 in the third preferred embodiment of the robot arm mechanism according to the present invention.

The robot arm mechanism 104 is substantially similar to the robot arm mechanism 103 in the third preferred embodiment of the robot arm mechanism according to the present invention, except for the driving assist parallelogram linkage 190 of the robot arm 840 and the position of the robot arm driving mechanism 120.

The driving assist parallelogram linkage 190 includes a first link 191 having first and second end portions and substantially equal in length to the distance between the rotation axis 123 and the second end portion of the second arm link 842. The first link 191 is integrally formed with and in parallel relationship with the first long link 312.

The driving assist parallelogram linkage 190 further includes a second link 192 having first and second end portions. The first and second links 191 and 192 are pivotably connected with each other at the second end portion of the first link 191 and the first end portion of the second link 192. The second link 192 is integrally formed with and in parallel relationship with the second arm link 842.

The driving assist parallelogram linkage 190 further includes a third link 193 having first and second end portions and substantially equal in length to the first link 191. The second and third links 192 and 193 are pivotably connected with each other at the second end portion of the second link 192 and the first end portion of the third link 193.

The driving assist parallelogram linkage 190 further includes a fourth link 194 having first and second end portions and substantially equal in length to the second link 192. The third and fourth links 193 and 194 are pivotably connected with each other at the second end portion of the third link 193 and the first end portion of the fourth link 194. The fourth and first links 194 and 191 are pivotably connected with each other at the second end portion of the fourth link 194 and the first end portion of the first link 191 under the state that the first link 191 is in parallel relationship with the third link 193 and that the second link 192 is in parallel relationship with the fourth link 194.

The second driving shaft 122 is integrally connected with the fourth link 194 at the second end portion of the fourth link 194 and rotates the second arm link 842 around the first end portion of the second arm link 842 through the driving assist parallelogram linkage 190. The first driving shaft 121 is integrally connected with the first long link 312 and rotates the first long link 312 around the rotation axis 123.

According to the present invention, the first and second driving shafts 121 and 122 may be replaced by each other about the connection with the first long link 312 or the fourth link 194.

The operation of the robot arm mechanism 104 in the fourth preferred embodiment is similar to the operation of the robot arm mechanism 103 in the third preferred embodiment except for the fact that the position of the arm driving mechanism 120 in the fourth preferred embodiment is different from the position of the arm driving mechanism 120 in the third preferred embodiment, according to the present invention.

Figure 12:
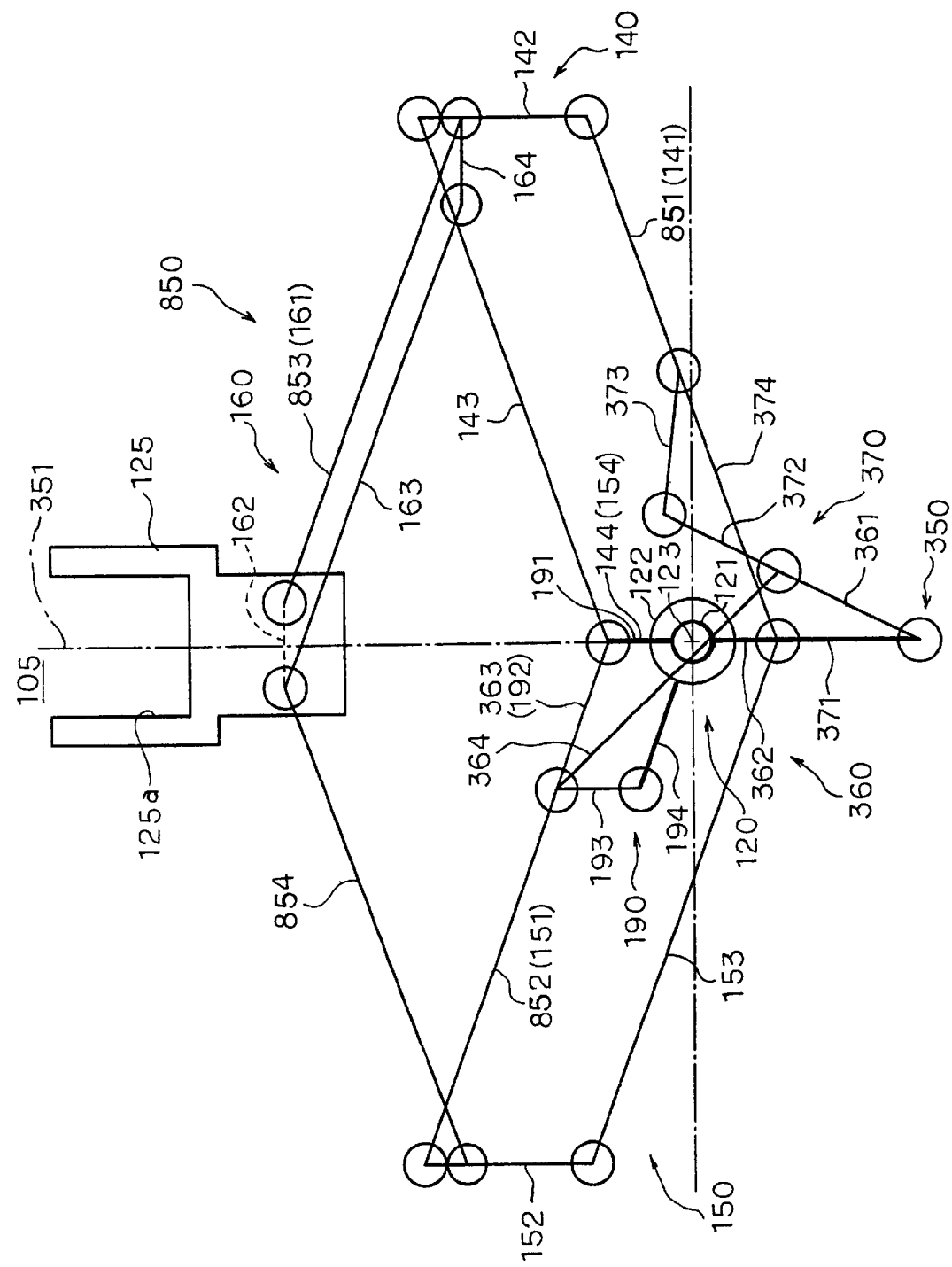
FIG. 12 is a skeleton view of one condition of the fifth preferred embodiment of the robot arm mechanism according to the present invention.
Figure 13:
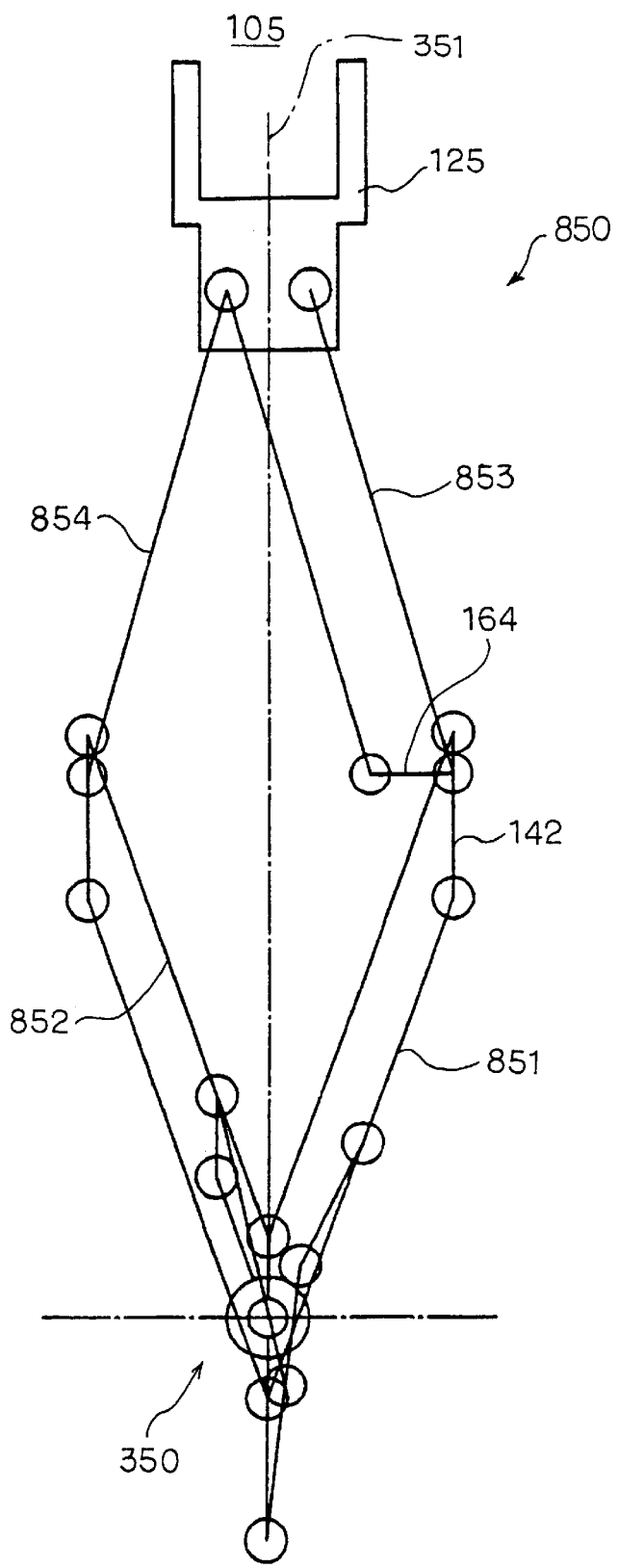
FIG. 13 is a skeleton view of another condition of the fifth preferred embodiment of the robot arm mechanism according to the present invention.

Referring to FIGS. 12 and 13 of the drawings, there is shown a fifth preferred embodiment of the robot arm mechanism according to the present invention. The robot arm mechanism 105 is shown in FIGS. 12 and 13 as comprising a handling member 125 for supporting and handling an object, a robot arm 850, and a robot arm driving mechanism 120 for driving the robot arm 850. The robot arm 850 comprises a link retaining mechanism 350.

The robot arm 850 further comprises first, second, third, and fourth arm links 851, 852, 853, and 854 which are similar to the first, second, third, and fourth arm links 841, 842, 843, and 844 in the fourth preferred embodiment of the robot arm mechanism according to the present invention.

The robot arm mechanism 105 is substantially similar to the robot arm mechanism 104 in the fourth preferred embodiment of the robot arm mechanism according to the present invention.

The link retaining mechanism 350 comprises first and second joint cross linkages 360 and 370 which are respectively similar to the first and second joint cross linkages 310 and 320 in the fourth preferred embodiment of the robot arm mechanism according to the present invention. The first joint cross linkage 360 includes first short and long links 361 and 362 and second short and long links 363 and 364 which are respectively similar to first short and long links 311 and 312 and second short and long links 313 and 314 in the fourth preferred embodiment of the robot arm mechanism according to the present invention. The second joint cross linkage 370 includes first short and long links 371 and 372 and second short and long links 373 and 374 which are respectively similar to first short and long links 321 and 322 and second short and long links 323 and 324 in the fourth preferred embodiment of the robot arm mechanism according to the present invention.

The link retaining mechanism 350 similar to the link retaining mechanism 300 in the fourth preferred embodiment of the robot arm mechanism according to the present invention, except for the fact that the first short link 361 and the first long link 372 are not substantially equal in length to each other.

The retaining mechanism 300 pivotably retains the first and second arm links 831 and 832 respectively at the first end portions of the first and second arm links 831 and 832 and keeps parallel a first line and second line, the first line begin a line passing through the first and second end portions of the first arm link 831 and the second line a line symmetrical with respect to the center line 301 with the line passing through the first and second end portions of the second arm link 832.

The first end portion of the first arm link 851 is integrally formed with the second short link 363. The first end portion of the second arm link 852 is integrally formed with the second long link 374. The center line 351 passes through the first and second end portions of the first long link 362. The first end portions of the first and second arm links 851 and 852 are positioned on the center line 351.

The second driving shaft 122 is integrally connected with the fourth link 194 at the second end portion of the fourth link 194 and rotates the second arm link 852 around the first end portion of the second arm link 852 through the driving assist parallelogram linkage 190. The first driving shaft 121 is integrally connected with the first long link 362 and rotates the first long link 362 around the rotation axis 123.

According to the present invention, the fourth link 194 and the first long link 362 may be replaced by each other about the connection with the first or second driving shafts 121 or 122.

The operation of the robot arm mechanism 105 in the fifth preferred embodiment is similar to the operation of the robot arm mechanism 104 in the fourth preferred embodiment, according to the present invention.

Figure 14:
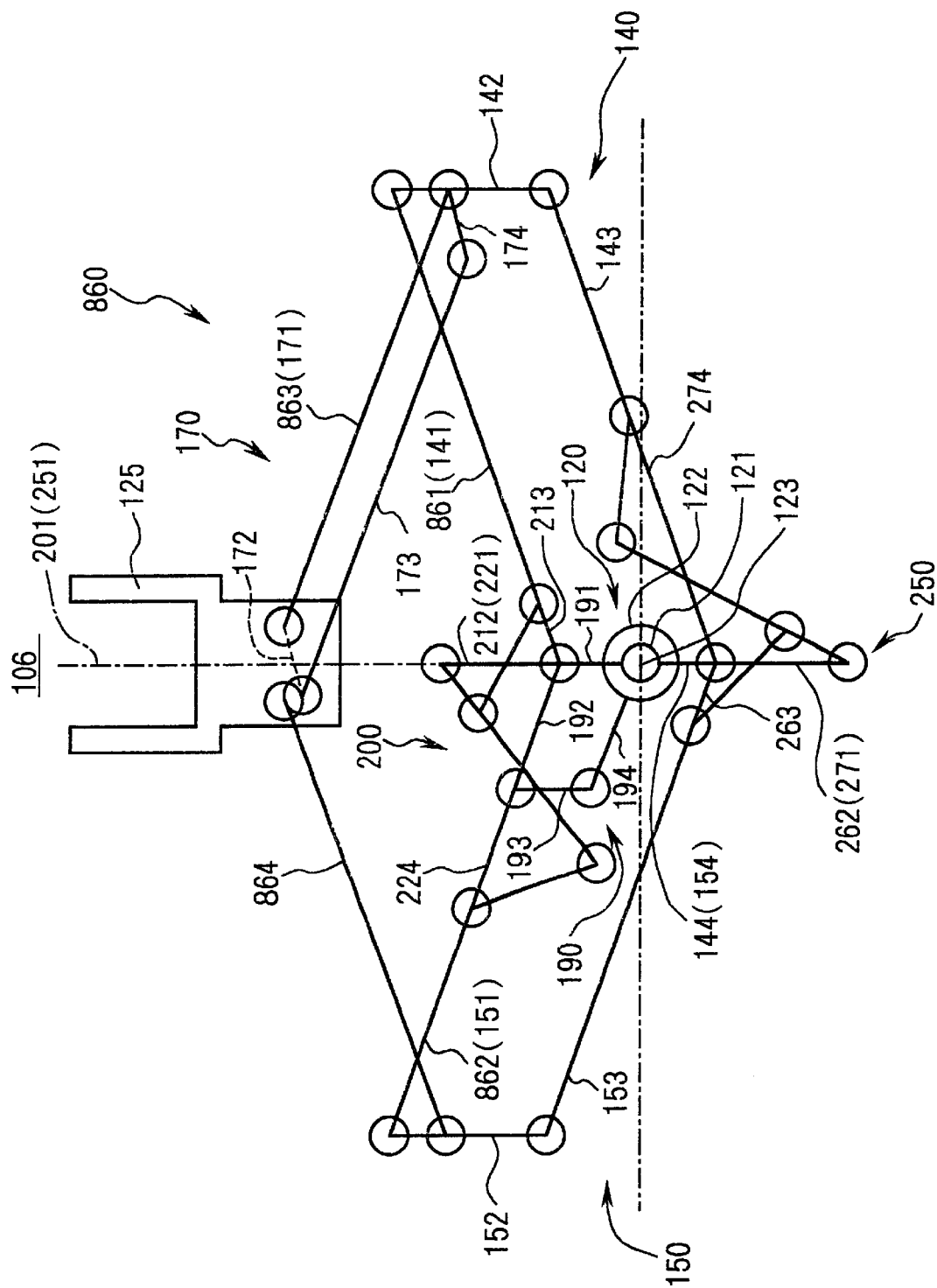
FIG. 14 is a skeleton view of one condition of the sixth preferred embodiment of the robot arm mechanism according to the present invention.
Figure 15:
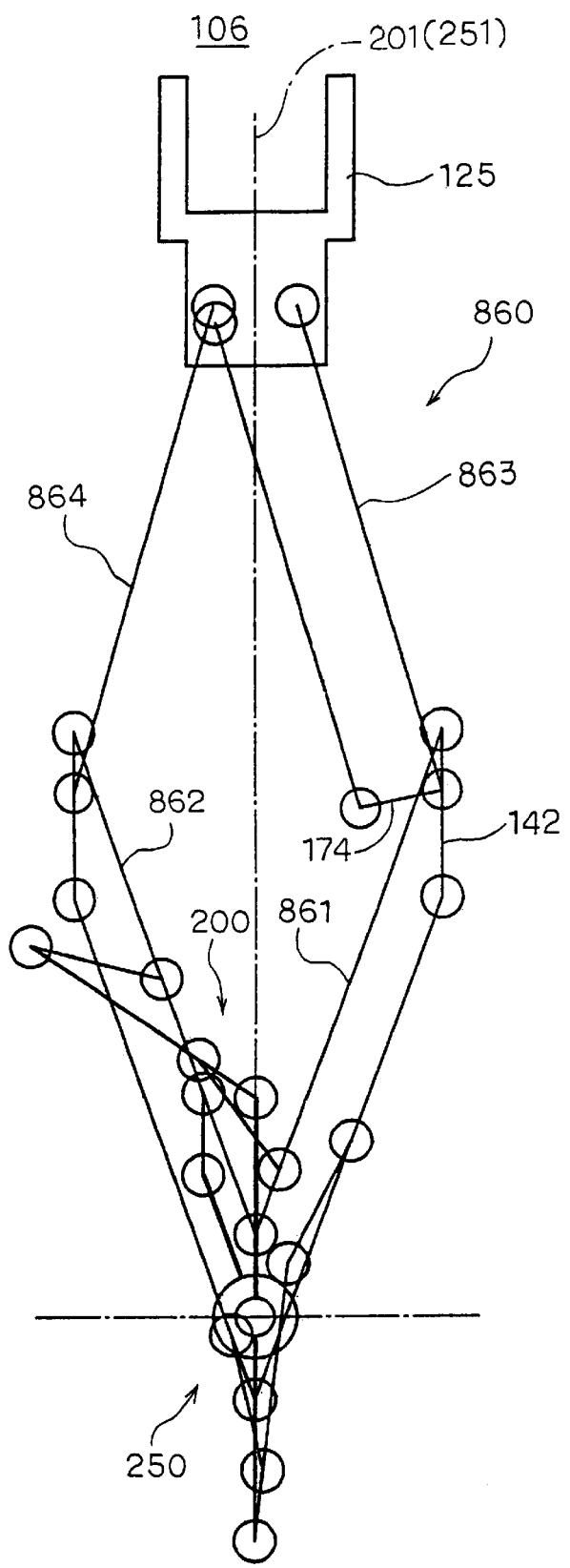
FIG. 15 is a skeleton view of another condition of the sixth preferred embodiment of the robot arm mechanism according to the present invention.

Referring to FIGS. 14 and 15 of the drawings, there is shown a sixth preferred embodiment of the robot arm mechanism according to the present invention. The robot arm mechanism 106 is shown in FIGS. 14 and 15 as comprising a handling member 125 for supporting and handling an object, a robot arm 860, and a robot arm driving mechanism 120 for driving the robot arm 860. The robot arm mechanism 106 is substantially similar to the robot arm mechanism 105 in the fifth preferred embodiment of the robot arm mechanism according to the present invention. The robot arm 860 comprises first, second, third, and fourth arm links 861, 862, 863, and 864.

The stabilizing mechanism 160 in the fifth preferred embodiment of the robot arm mechanism according to the present invention is replaced by the stabilizing mechanism 170 in the present preferred embodiment.

The link retaining mechanism 350 in the fifth preferred embodiment of the robot arm mechanism according to the present invention is replaced by the link retaining mechanism 200 and an additional link retaining mechanism 250 in the present preferred embodiment.

The additional link retaining mechanism 250 comprises first and second joint cross linkages 260 and 270 are respectively similar to the first and second joint cross linkages 210 and 220. The first joint cross linkage 260 includes first short and long links 261 and 262 and second short and long links 263 and 264 which are respectively similar to first short and long links 211 and, 212 and second short and long links 213 and 214. The second joint cross linkage 270 includes first short and long links 271 and 272 and second short and long links 273 and 274 which are respectively similar to first short and long links 221 and 222 and second short and long links 223 and 224.

The second driving shaft 122 is integrally connected with the fourth link 194 at the second end portion of the fourth link 194 and rotates the second arm link 862 around the first end portion of the second arm link 862 through the driving assist parallelogram linkage 190. The first driving shaft 121 is integrally connected with the first link 191 and rotates the first long link 212 around the rotation axis 123 through the first link 191.

According to the present invention, the fourth link 194 and the first link 191 may be replaced by each other about the connection with the first or second driving shafts 121 or 122.

The operation of the robot arm mechanism 106 in the sixth preferred embodiment is similar to the operation of the robot arm mechanism in the above-mentioned preferred embodiment, according to the present invention.

Figure 16:
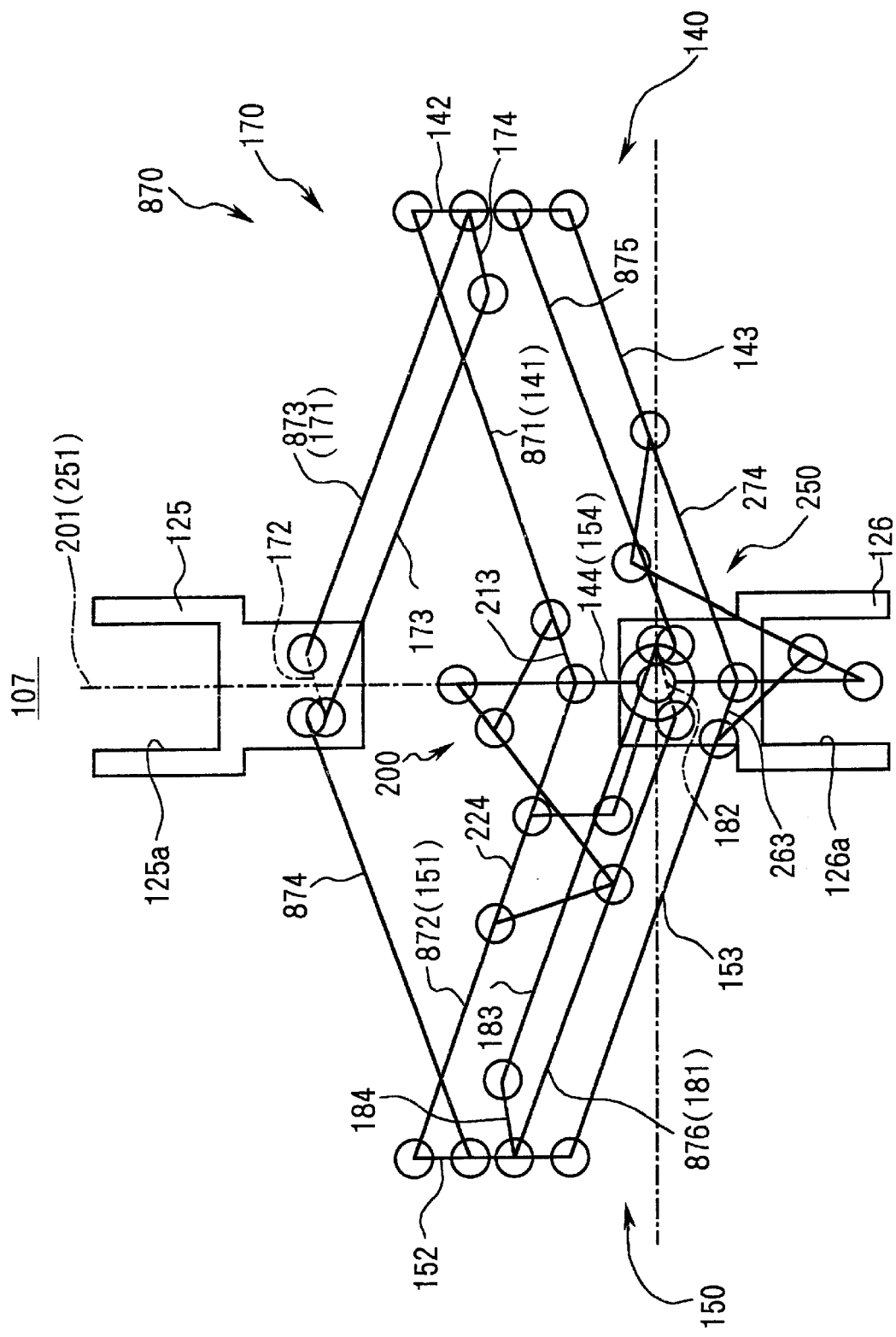
FIG. 16 is a skeleton view of the seventh preferred embodiment of the robot arm mechanism according to the present invention.

Referring to FIG. 16 of the drawings, there is shown a seventh preferred embodiment of the robot arm mechanism according to the present invention. The robot arm mechanism 107 is shown in FIG. 16 as comprising a handling member 125 for supporting and handling an object, a robot arm 870, and a robot arm driving mechanism 120 for driving the robot arm 870. The robot arm mechanism 107 further comprises an additional handling member 126 for supporting and handling an object.

The robot arm 870 comprises first, second, third, and fourth arm links 871, 872, 873, and 874 which are similar to the first, second, third, and fourth arm links 861, 862, 863, and 864 in the sixth preferred embodiment of the robot arm mechanism according to the present invention.

The robot arm 870 further comprises a fifth arm link 875 having first and second end portions. The additional handling member 126 has first and second portions. The fifth arm link 875 and the additional handling member 126 are pivotably connected with each other at the second end portion of the fifth arm link 875 and the first portion of the additional handling member 126. The fifth arm link 875 is pivotably retained by the first joint mechanism 140 at the first end portion of the fifth arm link 875.

The robot arm 870 further comprises a sixth arm link 876 having first and second end portions. The sixth arm link 876 and the additional handling member 126 are pivotably connected with each other at the second end portion of the sixth arm link 876 and the second portion of the additional handling member 126. The fifth and sixth arm links 875 and 876 are substantially equal in length to each other. The sixth arm link 876 is pivotably retained by the second joint mechanism 150 at the first end portion of the sixth arm link 876.

The robot arm 870 further comprises an additional stabilizing mechanism 180 similar to the stabilizing mechanism 170.

The robot arm mechanism 107 is similar to the robot arm mechanism 106 in the sixth preferred embodiment of the robot arm mechanism according to the present invention, except for the additional the additional handling member 126, fifth arm link 875, sixth arm link 876, and the additional stabilizing mechanism 180.

The second driving shaft 122 is integrally connected with the fourth link 194 at the second end portion of the fourth link 194 and rotates the second arm link 872 around the first end portion of the second arm link 872 through the driving assist parallelogram linkage 190 (See FIG. 14).

The first driving shaft 121 is integrally connected with the first link 191 and rotates the first long link 212 around the rotation axis 123 through the first link 191 (See FIG. 14).

According to the present invention, the fourth link 194 and the first link 191 may be replaced by each other about the connection with the first or second driving shafts 121 or 122.

The operation of the robot arm mechanism 107 in the seventh preferred embodiment is similar to the operation of the robot arm mechanism 106 in the sixth preferred embodiment except for the following operation of the robot arm mechanism 107 in the seventh preferred embodiment.

The another handling member 126 approaches the rotation axis 123 when the handling member 125 leave from the rotation axis 123, resulting from the fact that the robot arm mechanism 107 comprises the handling member 125 and the additional handling member 126. By the same reason, the handling member 125 approaches the rotation axis 123 when the another handling member 126 leave from the rotation axis 123.

Figure 17:
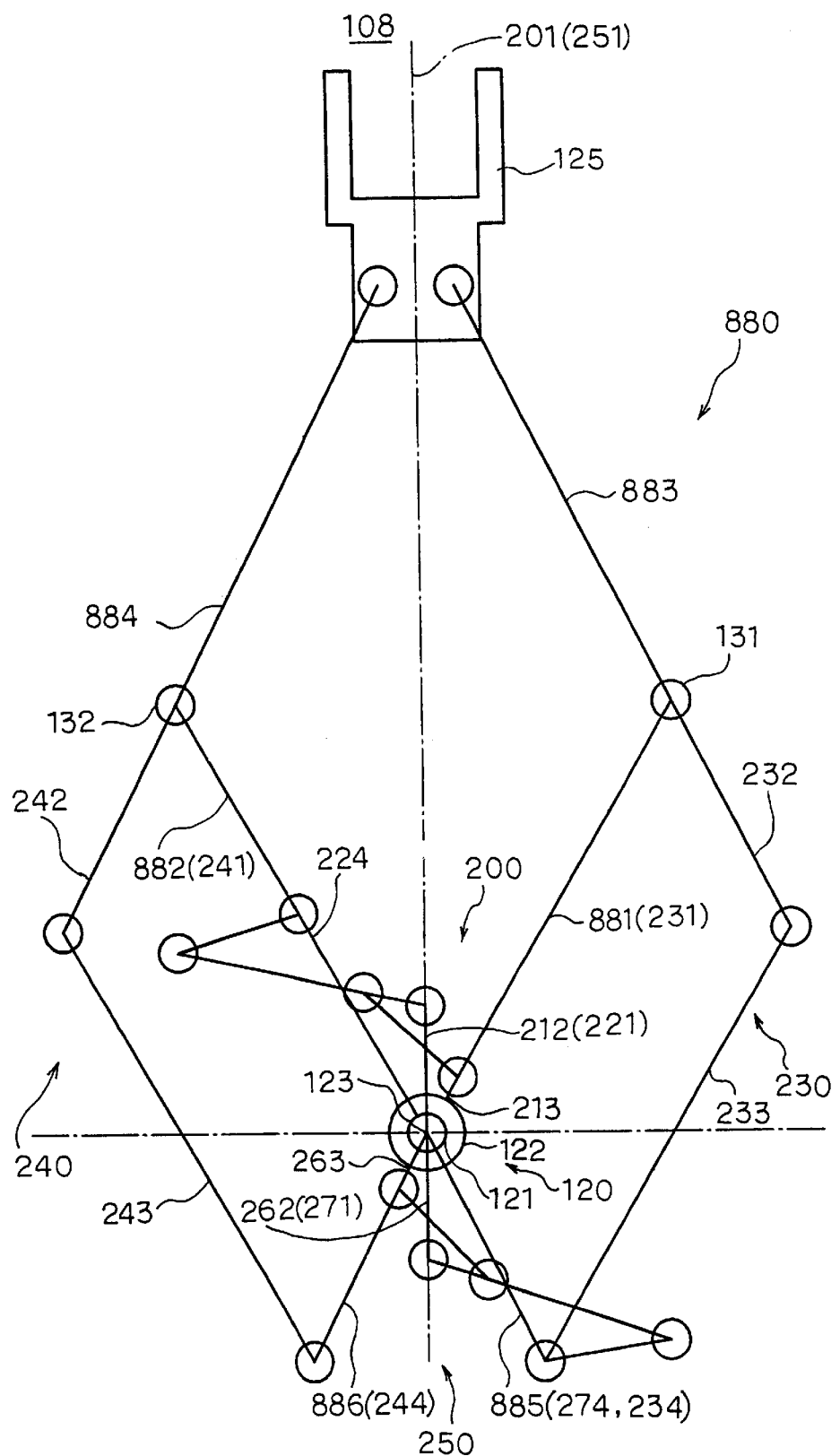
FIG. 17 is a skeleton view of the eighth preferred embodiment of the robot arm mechanism according to the present invention.

Referring to FIG. 17 of the drawings, there is shown a eighth preferred embodiment of the robot arm mechanism according to the present invention. The robot arm mechanism 108 is shown in FIG. 17 as comprising a handling member 125 for supporting and handling an object, a robot arm 880, and a robot arm driving mechanism 120 for driving the robot arm 880.

The robot arm 880 comprises first, second, third, and fourth arm links 881, 882, 883, and 884 which are similar to the first, second, third, and fourth arm links 821, 822, 823, and 824 in the second preferred embodiment of the robot arm mechanism according to the present invention.

The robot arm 880 further comprises the second joint mechanism 132. The robot arm 880 further comprises the first joint mechanism 131 which is similar to the second joint mechanism 132 and retains the first and third arm links 881 and 883.

The robot arm 880 further comprises a fifth arm link 885 having first and second end portion, a sixth arm link 886 having first and second end portion, and an additional link retaining mechanism 250 having an additional center line 251. The additional link retaining mechanism 250 pivotably retains the fifth and sixth arm links 885 and 886 respectively at the first end portions of the fifth and sixth arm links 885 and 886 and keeps parallel a first line and a second line, the first line being a line passing through the first and second end portions of the fifth arm link 885 and the second line being a line symmetrical with respect to the additional center line 251 with the line passing through the first and second end portions of the sixth arm link 886. In fact the fifth and sixth arm links 885 and 886 are in symmetrical relationship with each other with respect to the center line 251.

The first end portion of the sixth arm link 886 is integrally connected with the second short link 263. The first end portion of the fifth arm link 885 is integrally connected with the second long link 274.

The additional center line 251 passes through the first and second end portions of the first long link 262. The first end portions of the fifth and sixth arm links 885 and 886 are positioned on the additional center line 251.

The second end portion of the first arm link 881 and the first end portion of the third arm link 883 are connected with each other.

The second end portion of the second arm link 882 and the first end portion of the foruth arm link 884 are connected with each other.

The first long link 212 is integrally formed with and in parallel relationship with the first long link 262 under the state that the first end portion of the first long link 212 is connected with the first end portion of the first long link 262.

The robot arm 880 further comprises a first stabilizing parallelogram linkage 230 comprising a first link 231 having first and second end portions and substantially equal in length to the first arm link 881. The first link 231 is integrally formed with and in coaxial relationship with the first arm link 881 under the state that the first end portion of the first link 231 is connected with the first end portion of the first arm link 881.

The first stabilizing parallelogram linkage 230 further comprises a second link 232 having first and second end portions and substantially equal in length to the fifth arm link 885. The first and second links 231 and 232 are pivotably connected with each other at the second end portion of the first link 231 and the first end portion of the second link 232. The second link 232 is integrally formed with and in parallel relationship with the third arm link 883 under the state that the first end portion of the second link 232 is connected with the first end portion of the third arm link 883.

The first stabilizing parallelogram linkage 230 further comprises a third link 233 having first and second end portions and substantially equal in length to the first link 231. The second and third links 232 and 233 are pivotably connected with each other at the second end portion of the second link 232 and the first end portion of the third link 233.

The first stabilizing parallelogram linkage 230 further comprises a fourth link 234 having first and second end portions and substantially equal in length to the second link 232. The third and fourth links 233 and 234 are pivotably connected with each other at the second end portion of the third link 233 and the first end portion of the fourth link 234. The fourth and first links 234 and 231 are pivotably connected with each other at the second end portion of the fourth link 234 and the first end portion of the first link 231 under the state that the first link 231 is in parallel relationship with the third link 233 and that the second link 232 is in parallel relationship with the fourth link 234. The fourth link 234 is integrally formed with and in coaxial relationship with the fifth arm link 885 under the state that the second end portion of the fourth link 234 is connected with the first end portion of the fifth arm link 885.

The robot arm 880 further comprises a second stabilizing parallelogram linkage 240 which is similar to the first stabilizing parallelogram linkage 230.

The second stabilizing parallelogram linkage 240 comprises first, second, third, and fourth links 241, 242, 243, and 244 which are respectively similar to the first, second, third, and fourth links 231, 232, 233, and 234.

The first link 241 is substantially equal in length to the second arm link 882. The first link 241 is integrally formed with and in coaxial relationship with the second arm link 882 under the state that the first end portion of the first link 241 is connected with the first end portion of the second arm link 882.

The second stabilizing parallelogram linkage 240 further comprises a second link 242 having first and second end portions and substantially equal in length to the sixth arm link 886. The second link 242 is integrally formed with and in parallel relationship with the fourth arm link 884 under the state that the first end portion of the second link 242 is connected with the first end portion of the fourth arm link 884.

The third link 243 is substantially equal in length to the first link 241. The fourth link 244 is substantially equal in length to the second link 242. The fourth link 244 is integrally formed with and in coaxial relationship with the sixth arm link 886 under the state that the second end portion of the fourth link 244 is connected with the first end portion of the sixth arm link 886.

The second driving shaft 122 is integrally connected with the first arm link 881 at the first end portion of the first arm link 881 and rotates the first arm link 881 around the rotation axis 123. The first driving shaft 121 is integrally connected with the second arm link 882 at the first end portion of the second arm link 882 and rotates the second arm link 882 around the rotation axis 123.

According to the present invention, the first and second arm links 881 and 882 may be replaced by each other about the connection with the first or second driving shafts 121 or 122.

The operation of the robot arm mechanism 108 in the eighth preferred embodiment is similar to the operation of the robot arm mechanism 101 in the first preferred embodiment except for the following operation of the robot arm mechanism 108, according to the present invention.

According to the present invention, the fact that the fifth and sixth arm links 885 and 886 are retained by the additional link retaining member 250 results in the fact that the fifth and sixth arm links 885 and 886 are in symmetrical relationship with each other with respect to the center line 201. The first stabilizing parallelogram linkage 230 makes the third and fifth arm links 883 and 885 in parallel relationship with each other. The second stabilizing parallelogram linkage 240 makes the fourth and sixth arm links 884 and 886 in parallel relationship with each other. The third and fourth arm links 883 and 884 are in symmetrical relationship with each other with respect to the center line 201, resulting from the fact that the third and fourth arm links 883 and 884 are respectively in parallel relationship with the fifth and sixth arm links 885 and 886. The handling member 125 moves parallel to the center line 201, by the reason that the third and fourth arm links 883 and 884 are in symmetrical relationship with each other with respect to the center line 201.

Figure 18:
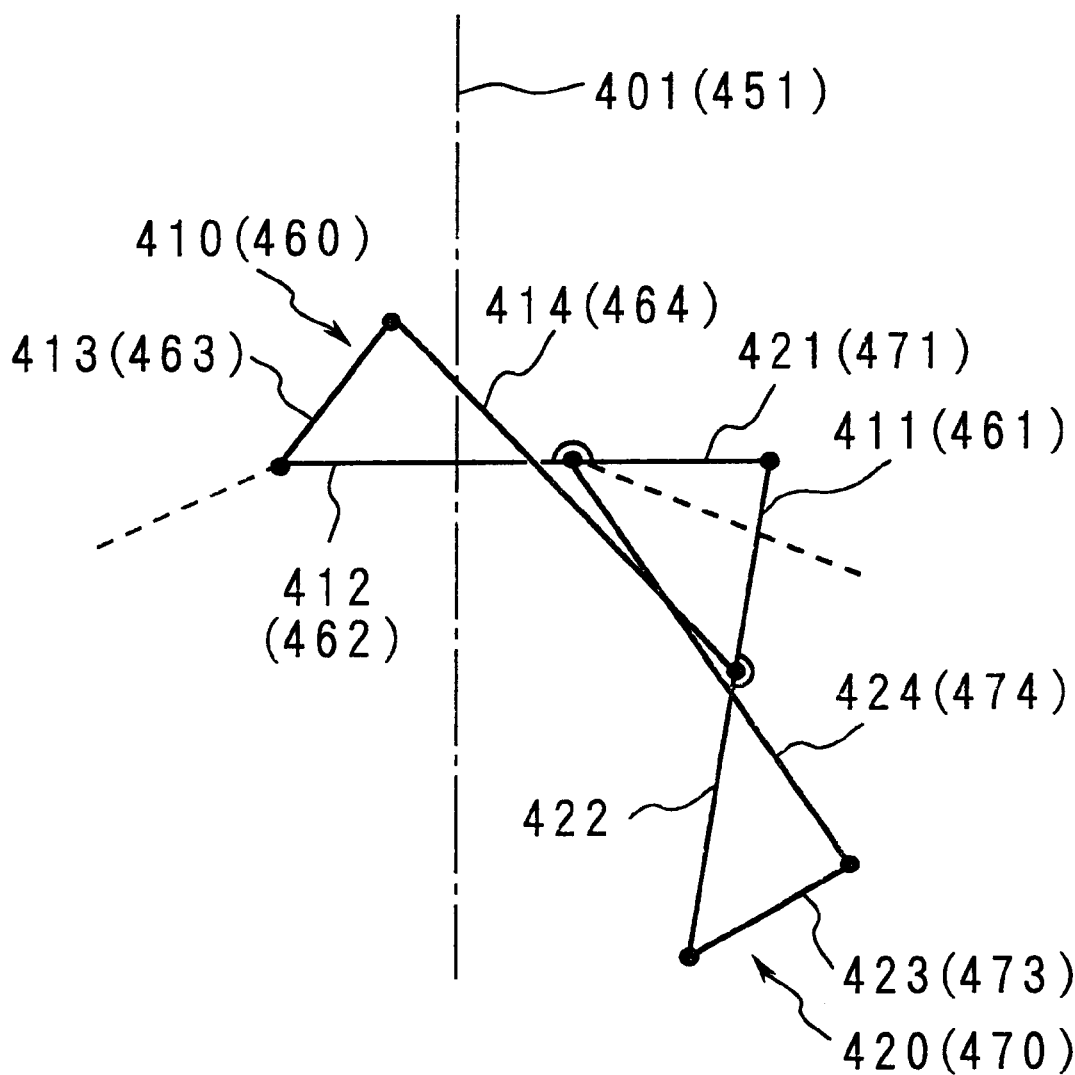
FIG. 18 is an enlarged fragmentary skeleton view of the robot arm mechanism shown in FIGS. 19, 24, and 25 to be used for explaining the principle of the robot arm mechanism according to the present invention.
Figure 19:
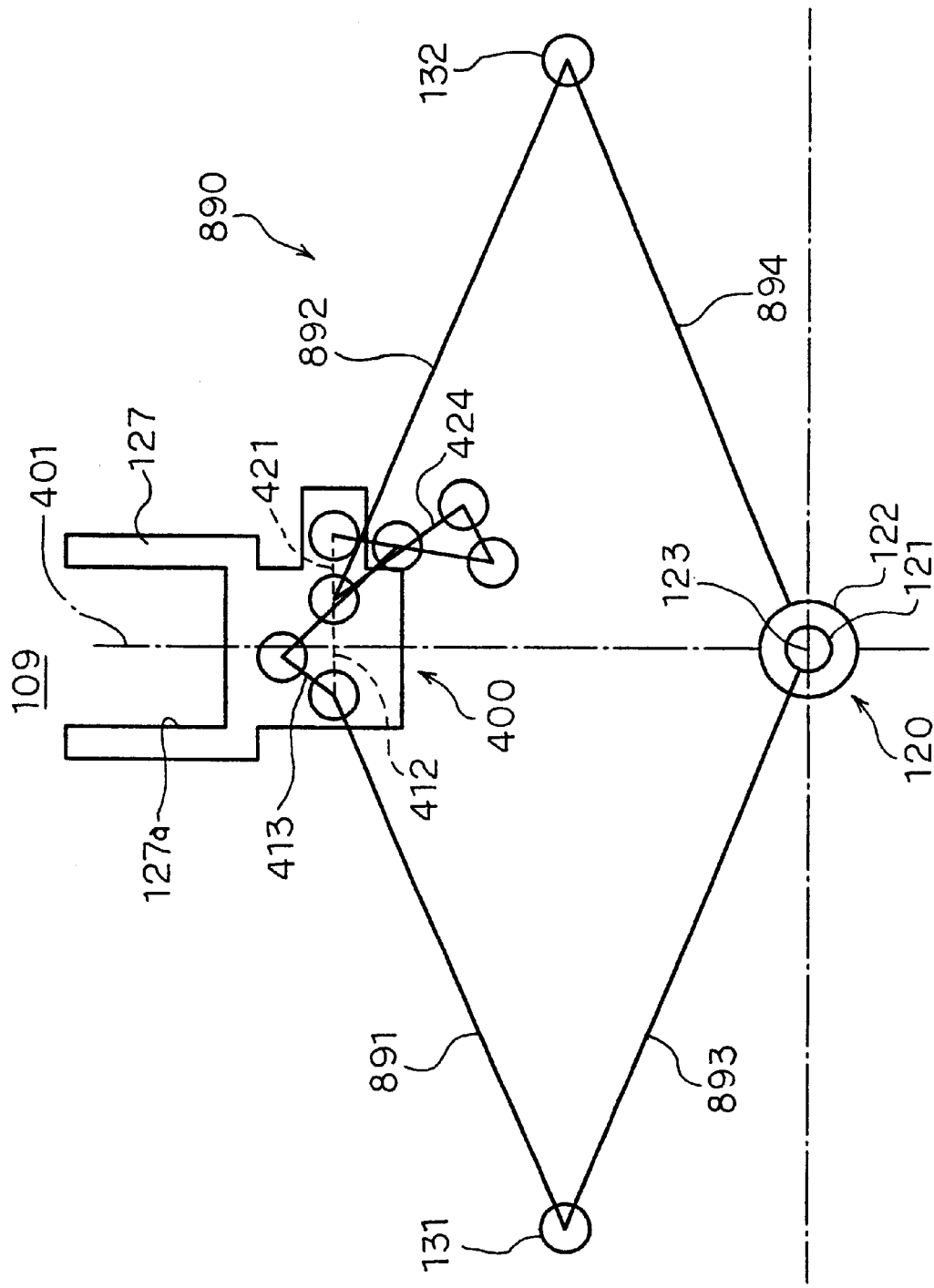
FIG. 19 is a skeleton view of the ninth preferred embodiment of the robot arm mechanism according to the present invention.

Referring to FIGS. 18 and 19 of the drawings, there is shown a ninth preferred embodiment of the robot arm mechanism according to the present invention. The robot arm mechanism 109 is shown in FIGS. 18 and 19 as comprising a handling member 127 for supporting and handling an object.

The robot arm mechanism 109 further comprises a robot arm 890 connected to the handling member 127. The robot arm 890 comprises a first arm link 891 having first and second end portion, a second arm link 892 having first and second end portion, and a link retaining mechanism 400 having a center line 401.

The link retaining mechanism 400 pivotably retains the first and second arm links 891 and 892 respectively at the first end portions of the first and second arm links 891 and 892 and keeps parallel a first line and a second line, the first line being a line passing through the first and second end portions of the first arm link 891 and the second line being a line symmetrical with respect to the center line 401 with the line passing through the first and second end portions of the second arm link 892. In fact the first and second arm links 891 and 892 are in symmetrical relationship with each other with respect to the center line 401.

The link retaining mechanism 400 comprises a first joint cross linkage 410 which includes a first short link 411 having first and second end portions.

The first joint cross linkage 410 further includes a first long link 412 having first and second end portions and longer than the first short link 411. The first short and long links 411 and 412 are pivotably connected with each other at the second end portion of the first short link 411 and the first end portion of the first long link 412.

The first joint cross linkage 410 further includes a second short link 413 having first and second end portions and substantially equal in length to the first short link 411. The first long link 412 and the second short link 413 are pivotably connected with each other at the second end portion of the first long link 412 and the first end portion of the second short link 413.

The first joint cross linkage 410 further includes a second long 414 link having first and second end portions and substantially equal in length to the first long link 412. The second short and long links 413 and 414 are pivotably connected with each other at the second end portion of the second short link 413 and the first end portion of the second long link 414.

The second long link 414 and the first short link 411 are pivotably connected with each other at the second end portion of the second long link 414 and the first end portion of the first short link 411 under the state that the second long link 414 is crossed with the first long link 412.

The link retaining mechanism 400 comprises a second joint cross linkage 420 which includes a first short link 421 having first and second end portions.

The second joint cross linkage 420 further includes a first long link 422 having first and second end portions and longer than the first short link 421. The first short and long links 421 and 422 are pivotably connected with each other at the second end portion of the first short link 421 and the first end portion of the first long link 422.

The second joint cross linkage 420 further includes a second short link 423 having first and second end portions and substantially equal in length to the first short link 421. The first long link 422 and the second short link 423 are pivotably connected with each other at the second end portion of the first long link 422 and the first end portion of the second short link 423.

The second joint cross linkage 420 further includes a second long link 424 having first and second end portions and substantially equal in length to the first long link 422. The second short and long links 423 and 424 are pivotably connected with each other at the second end portion of the second short link 423 and the first end portion of the second long link 424.

The second long link 424 and the first short link 421 are pivotably connected with each other at the second end portion of the second long link 424 and the first end portion of the first short link 421 under the state that the second long link 424 is crossed with the first long link 422.

The length ratio of each of the first and second short links 411 and 413 to each of the first and second long links 412 and 414 is substantially equal to the length ratio of each of the first and second short links 421 and 423 to each of the first and second long links 422 and 424.

The first short link 411 is integrally formed with and in coaxial relationship with the first long link 422 under the state that the second end portion of the first short link 411 is connected with the first end portion of the first long link 422. The first long link 412 is integrally formed with and in coaxial relationship with the first short link 421 under the state that the first end portion of the first long link 412 is connected with the second end portion of the first short link 421.

The first end portion of the first arm link 891 is integrally formed with the second short link 413. The first end portion of the second arm link 892 is integrally formed with the second long link 424.

The center line 401 is substantially equally spaced apart from the second end portion of the first long link 412 and the first end portion of the first short link 421 and in perpendicular relationship with the first long link 412. The first end portions of the first and second arm links 891 and 892 are positioned on the line passing through the first and second end portions of the first long link 412.

The robot arm 890 further comprises a third arm link 893 having first and second end portions.

The robot arm 890 further comprises a fourth arm link 894 having first and second end portions. The first and second arm links 891 and 892 are substantially equal in length to each other. The third and fourth arm links 893 and 894 are substantially equal in length to each other.

The robot arm 890 further comprises a first joint mechanism 131 retaining the first and third arm links 891 and 893 respectively at the second end portion of the first arm link 891 and the first end portion of the third arm link 893 under the state that the first arm link 891 is pivotable around the second end portion of the first arm link 891 with respect to the third arm link 893. The first and third arm links 811 and 813 are pivotably connected with each other at the second end portion of the first arm link 811 and the first end portion of the third arm link 813.

The robot arm 890 further comprises a second joint mechanism 132 retaining the second and fourth arm links 892 and 894 respectively at the second end portion of the second arm link 892 and the first end portion of the fourth arm link 894 under the state that the second arm link 892 is pivotable around the second end portion of the second arm link 892 with respect to the fourth arm link 894. The second and fourth arm links 812 and 814 are pivotably connected with each other at the second end portion of the second arm link 812 and the first end portion of the fourth arm link 814.

The handling member 127 is integrally connected with the first long link 412.

The robot arm mechanism 109 further comprises a robot arm driving mechanism 120 for driving the robot arm 890.

The arm driving mechanism 120 comprises a first driving shaft 121 rotatable around a rotation axis 123, and a second driving shaft 122 in the form of a hollow shape to rotatably receive therein the first driving shaft 121 and rotatable around the rotation axis 123. The first driving shaft 121 is integrally connected with the second end portion of the third arm link 893 and rotating the third arm link 893 around the rotation axis 123. The second driving shaft 122 is integrally connected with the second end portion of the fourth arm link 894 and rotating the fourth arm link 894 around the rotation axis 123.

According to the present invention, the center line 401 passes through the rotation axis 123 at all times, by the reason that the link retaining mechanism 400 retains the first and second arm links 891 and 892 under the state that the first and second arm links 891 and 892 are in symmetrical relationship with each other with respect to the center line 401, that the first and second arm links 891 and 892 are equal in length to each other, and that the third and fourth arm links 893 and 894 are equal in length to each other. By the reason that the center line 401 passes through the rotation axis 123 at all times, The handling member 127 approaches and leaves from the rotation axis 123 with keeping a direction with respect to the rotation axis 123 fixed.

According to the present invention, the rotation of the third arm link 893 and the rotation of the fourth arm link 894 can result in the rotation of the center line 401 around the rotation axis 123. The robot arm mechanism 109 is rotated around the rotation axis 123 by the reason that the center line 401 is rotated around the rotation axis 123.

According to the present invention, the third and fourth arm links 893 and 894 may be replaced by each other about the connection with the first or second driving shafts 121 or 122.

Figure 20:
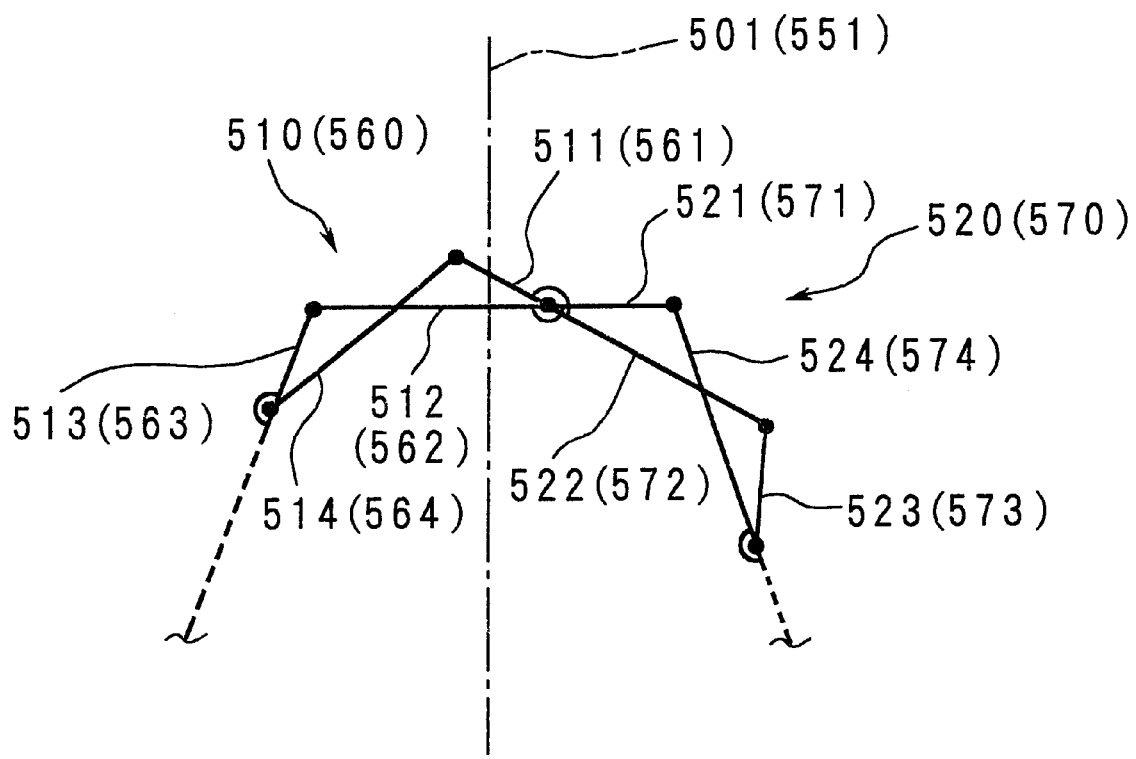
FIG. 20 is an enlarged fragmentary skeleton view of the robot arm mechanism shown in FIGS. 21, 22, and 23 to be used for explaining the principle of the robot arm mechanism according to the present invention.
Figure 21:
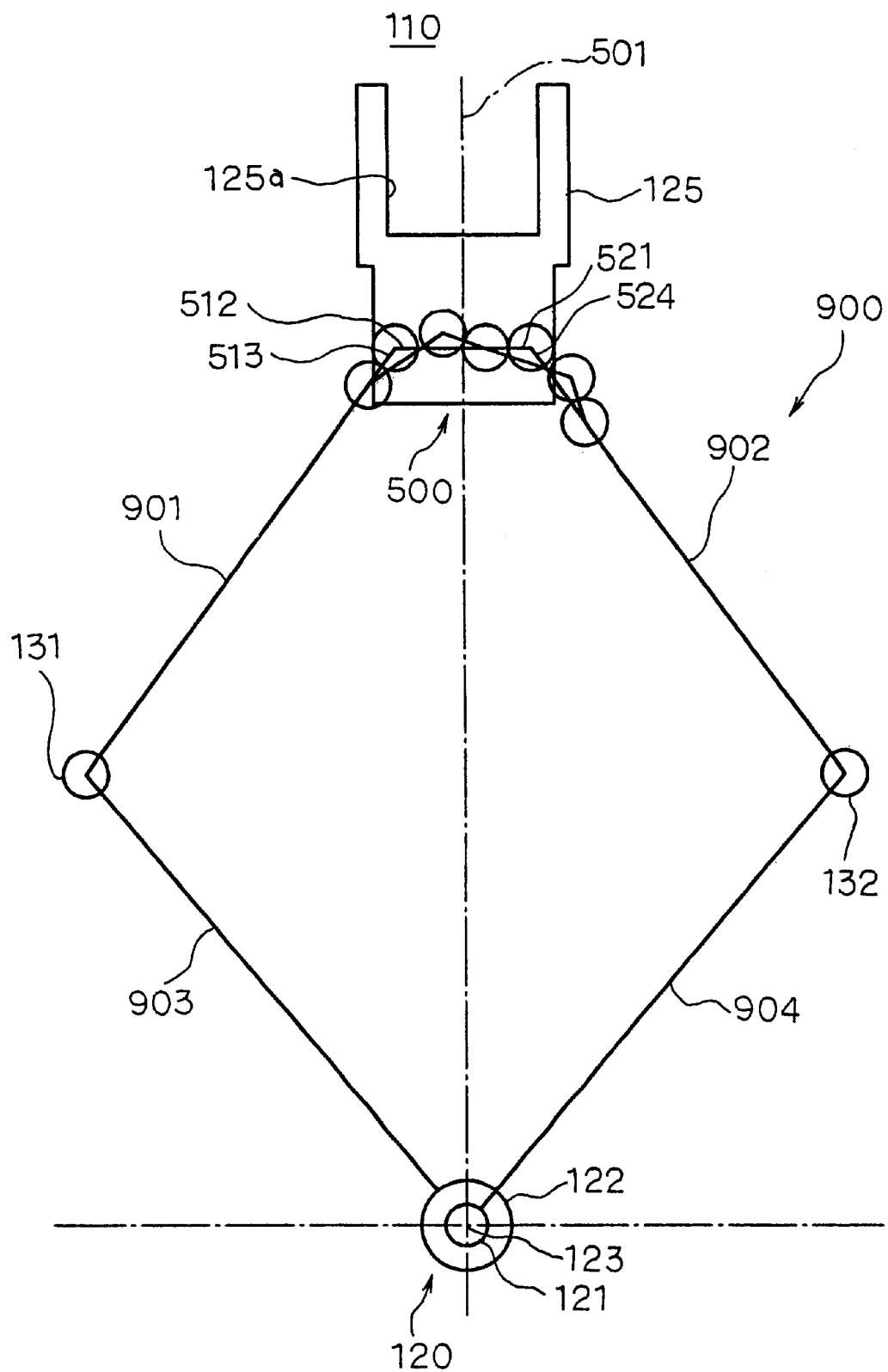
FIG. 21 is a skeleton view of the tenth preferred embodiment of the robot arm mechanism according to the present invention.

Referring to FIGS. 20 to 21 of the drawings, there is shown a tenth preferred embodiment of the robot arm mechanism according to the present invention. The robot arm mechanism 110 is shown in FIGS. 20 to 21 as comprising a handling member 125 for supporting and handling an object.

The construction of the robot arm mechanism 110 in the present preferred embodiment is similar to the construction of the robot arm mechanism 109 in the ninth preferred embodiment except for the following construction of the robot arm mechanism 110 in the present preferred embodiment.

The robot arm mechanism 110 further comprises a robot arm 900 connected to the handling member 125. The robot arm 900 comprises a first arm link 901 having first and second end portion, a second arm link 902 having first and second end portion, and a link retaining mechanism 500 having a center line 501.

The link retaining mechanism 500 pivotably retains the first and second arm links 901 and 902 respectively at the first end portions of the first and second arm links 901 and 902 and keeps parallel a first line and a second line, the first line being a line passing through the first and second end portions of the first arm link 901 and the second line being a line symmetrical with respect to the center line 501 with the line passing through the first and second end portions of the second arm link 902. In fact the first and second arm links 901 and 902 are in symmetrical relationship with each other with respect to the center line 501.

The link retaining mechanism 500 comprises a first joint cross linkage 510 which includes a first short link 511 having first and second end portions.

The first joint cross linkage 510 further includes a first long link 512 having first and second end portions and longer than the first short link 511. The first short and long links 511 and 512 are pivotably connected with each other at the second end portion of the first short link 511 and the first end portion of the first long link 512.

The first joint cross linkage 510 further includes a second short link 513 having first and second end portions and substantially equal in length to the first short link 511. The first long link 512 and the second short link 513 are pivotably connected with each other at the second end portion of the first long link 512 and the first end portion of the second short link 513.

The first joint cross linkage 510 further includes a second long 514 link having first and second end portions and substantially equal in length to the first long link 512. The second short and long links 513 and 514 are pivotably connected with each other at the second end portion of the second short link 513 and the first end portion of the second long link 514.

The second long link 514 and the first short link 511 are pivotably connected with each other at the second end portion of the second long link 514 and the first end portion of the first short link 511 under the state that the second long link 514 is crossed with the first long link 512.

The link retaining mechanism 500 comprises a second joint cross linkage 520 which includes a first short link 521 having first and second end portions.

The second joint cross linkage 520 further includes a first long link 522 having first and second end portions and longer than the first short link 521. The first short and long links 521 and 522 are pivotably connected with each other at the second end portion of the first short link 521 and the first end portion of the first long link 522.

The second joint cross linkage 520 further includes a second short link 523 having first and second end portions and substantially equal in length to the first short link 521. The first long link 522 and the second short link 523 are pivotably connected with each other at the second end portion of the first long link 522 and the first end portion of the second short link 523.

The second joint cross linkage 520 further includes a second long link 524 having first and second end portions and substantially equal in length to the first long link 522. The second short and long links 523 and 524 are pivotably connected with each other at the second end portion of the second short link 523 and the first end portion of the second long link 524.

The second long link 524 and the first short link 521 are pivotably connected with each other at the second end portion of the second long link 524 and the first end portion of the first short link 521 under the state that the second long link 524 is crossed with the first long link 522.

The length ratio of each of the first and second short links 511 and 513 to each of the first and second long links 512 and 514 is substantially equal to the length ratio of each of the first and second short links 521 and 523 to each of the first and second long links 522 and 524.

The first short link 511 is integrally formed with and in axial alignment with the first long link 522 under the state that the second end portion of the first short link 511 is connected with the first end portion of the first long link 522. The first long link 512 is integrally formed with and in axial alignment with the first short link 521 under the state that the first end portion of the first long link 512 is connected with the second end portion of the first short link 521.

The first end portion of the first arm link 901 is integrally formed with the second short link 513. The first end portion of the second arm link 902 is integrally formed with the second long link 524. The center line 501 is substantially equally spaced apart from the second end portion of the first long link 512 and the first end portion of the first short link 521 and in perpendicular relationship with the first long link 512. The first end portions of the first and second arm links 901 and 902 are positioned on the line passing through the first and second end portions of the first long link 512. In prevent preferred embodiment the first and second arm links 901 and 902 are respectively integrally formed with and in coaxial relationship with the second short link 513 and the second long link 524.

The robot arm further comprises third and fourth arm links 903 and 904 which are similar to the third and fourth arm links 893 and 894 in the ninth preferred embodiment of the robot arm mechanism according to the present invention.

The first driving shaft 121 is integrally connected with the second end portion of the fourth arm link 904 and rotating the fourth arm link 904 around the rotation axis 123. The second driving shaft 122 is integrally connected with the second end portion of the third arm link 903 and rotating the third arm link 903 around the rotation axis 123.

According to the present invention, the third and fourth arm links 903 and 904 may be replaced by each other about the connection with the first or second driving shafts 121 or 122.

According to the present invention, the operation of the robot arm mechanism 110 in the tenth preferred embodiment is substantially similar to the operation of the robot arm mechanism 109 in the ninth preferred embodiment.

Figure 22:
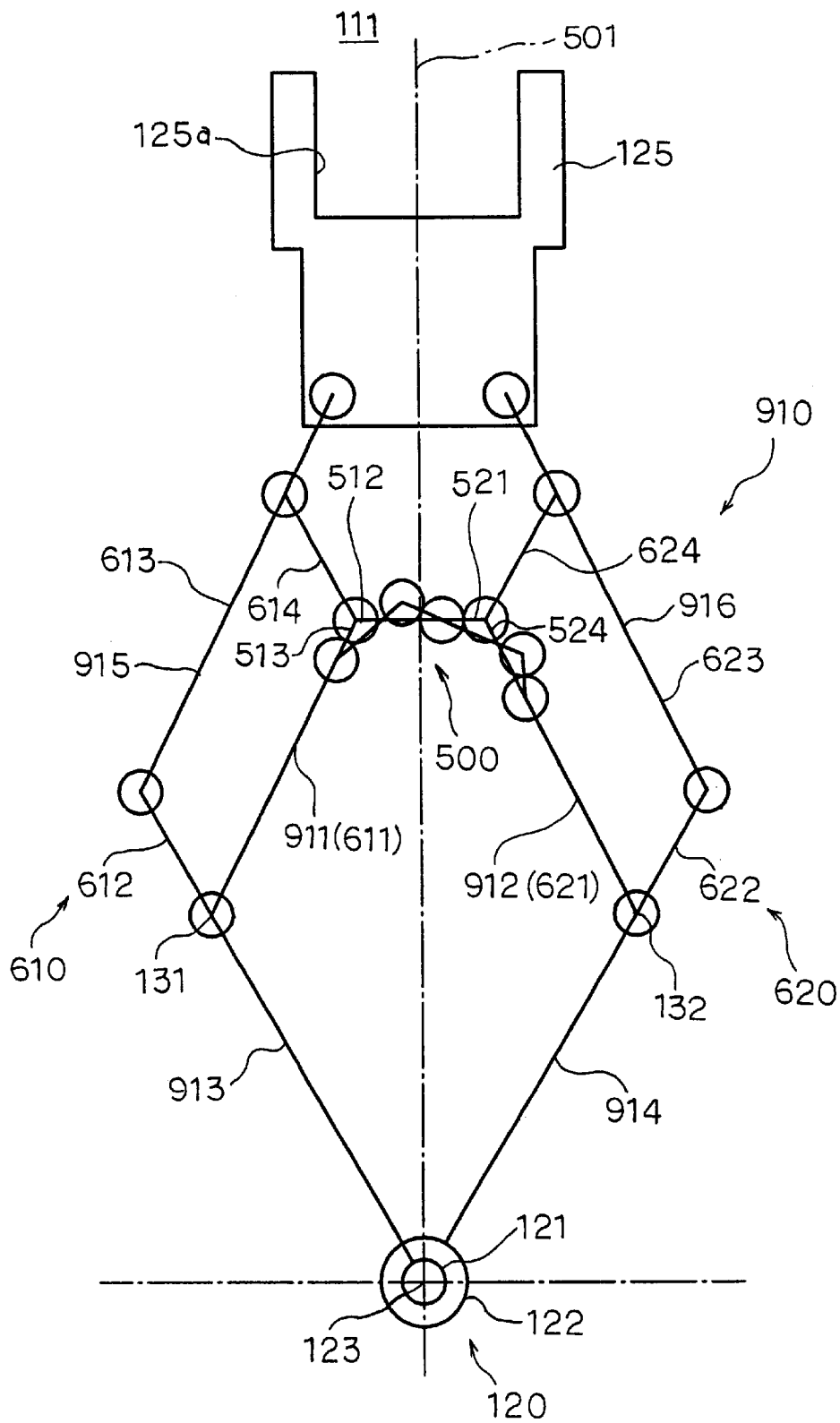
FIG. 22 is a skeleton view of the eleventh preferred embodiment of the robot arm mechanism according to the present invention.

Referring to FIGS. 20 and 22 of the drawings, there is shown a eleventh preferred embodiment of the robot arm mechanism according to the present invention. The robot arm mechanism 111 is shown in FIGS. 20 and 22 as comprising a handling member 125 for supporting and handling an object and a robot arm 910.

The robot arm 910 comprises first, second, third, and fourth arm link 911, 912, 913, and 914 which are similar to the first, second, third, and fourth arm link 901, 902, 903, and 904 in the tenth preferred embodiment of the robot arm mechanism according to the present invention.

The robot arm 910 further comprises a fifth arm link 915 having first and second end portions. The robot arm 910 further comprises a sixth arm link 916 having first and second end portions. The fifth and sixth arm link 915 and 916 substantially equal in length to each other.

The robot arm 910 further comprises a first stabilizing mechanism 610 including a first link 611 having first and second end portions. The first link 611 is integrally formed with and in coaxial relationship with the first arm link 911 under the state that the second end portion of the first link 611 is connected with the second end portion of the first arm link 911.

The first stabilizing mechanism 610 includes a second link 612 having first and second end portions. The first and second links 611 and 612 are pivotably connected with each other at the second end portion of the first link 611 and the first end portion of the second link 612. The second link 612 is integrally formed with and in axial alignment with the third arm link 913 under the state that the first end portion of the second link 612 is connected with the second end portion of the third arm link 913.

The first stabilizing mechanism 610 includes a third link 613 having first and second end portions and substantially equal in length to the first link 611. The second and third links 612 and 613 are pivotably connected with each other at the second end portion of the second link 612 and the first end portion of the third link 613. The third link 613 is integrally formed with and in parallel relationship with the fifth arm link 915 under the state that the first end portion of the third link 613 is connected with the second end portion of the fifth arm link 915.

The first stabilizing mechanism 610 includes a fourth link 614 having first and second end portions and substantially equal in length to the second link 612. The third and fourth links 613 and 614 are pivotably connected with each other at the second end portion of the third link 613 and the first end portion of the fourth link 614. The fourth and first links 614 and 611 are pivotably connected with each other at the second end portion of the fourth link 614 and the first end portion of the first link 611 under the state that the first link 611 is in parallel relationship with the third link 613 and that the second link 612 is in parallel relationship with the fourth link 614.

The robot arm 910 further comprises a second stabilizing mechanism 620 which is similar to the first stabilizing mechanism 610. The first link 621 is integrally formed with and in coaxial relationship with the second arm link 912 under the state that the second end portion of the first link 621 is connected with the second end portion of the second arm link 912. The second link 622 is integrally formed with and in axial alignment with the fourth arm link 914 under the state that the first end portion of the second link 622 is connected with the second end portion of the fourth arm link 914. The third link 623 is integrally formed with and in parallel relationship with the sixth arm link 916 under the state that the first end portion of the third link 623 is connected with the second end portion of the sixth arm link 916.

The handling member 125 has first and second portions. The fifth arm link 915 and the handling member 125 are pivotably connected with each other at the first end portion of the fifth arm link 915 and the first portion of the handling member 125. The sixth arm link 916 and the handling member 125 are pivotably connected with each other at the first end portion of the sixth arm link 916 and the second portion of the handling member 125.

The first driving shaft 121 is integrally connected with the second end portion of the third arm link 913 and rotating the third arm link 913 around the rotation axis 123. The second driving shaft 122 is integrally connected with the second end portion of the fourth arm link 914 and rotating the fourth arm link 914 around the rotation axis 123.

According to the present invention, the third and fourth arm links 913 and 914 may be replaced by each other about the connection with the first or second driving shafts 121 or 122.

According to the present invention, the operation of the robot arm mechanism 111 in the eleventh preferred embodiment is similar to the operation of the robot arm mechanism 110 in the tenth preferred embodiment.

Figure 23:
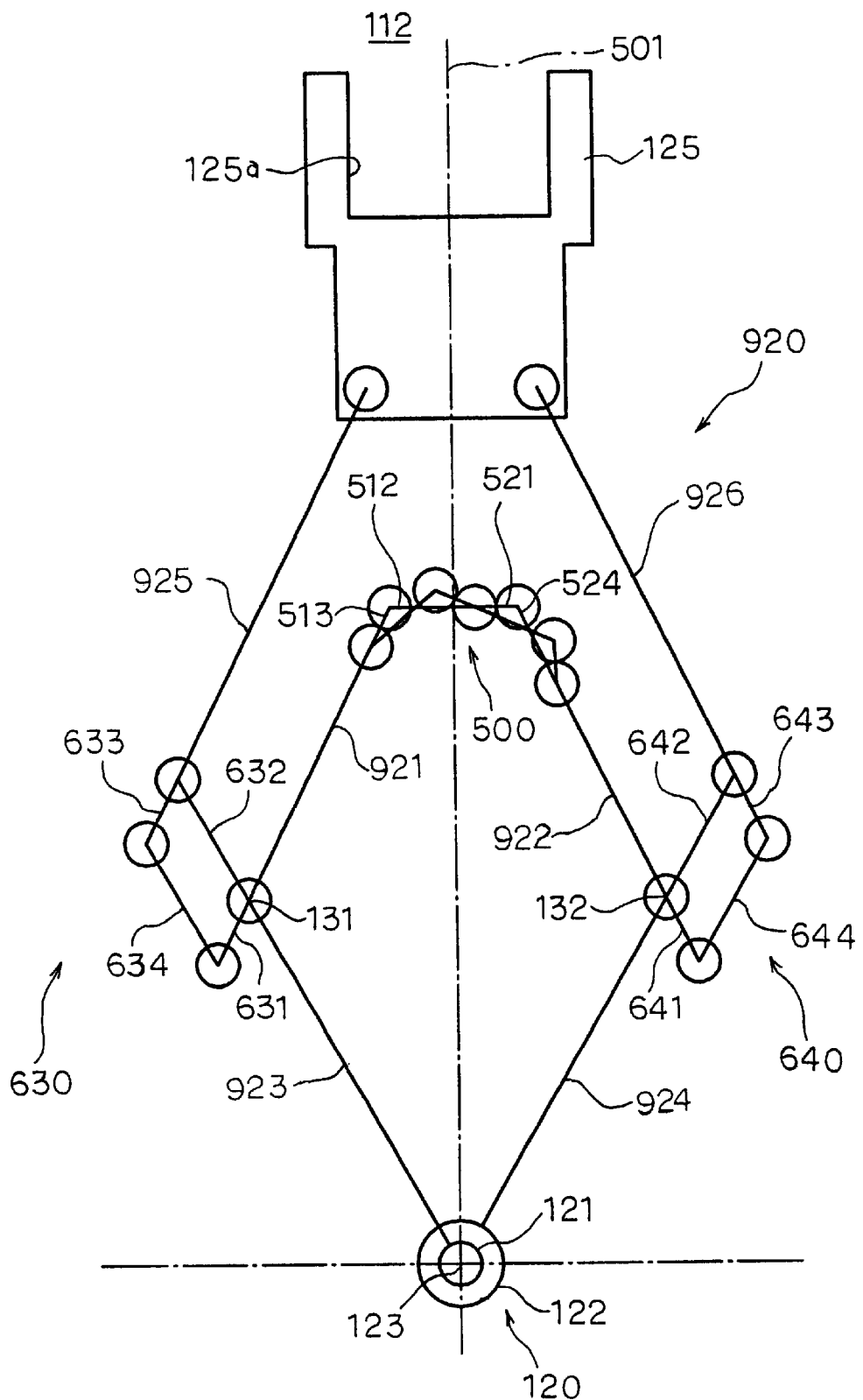
FIG. 23 is a skeleton view of the twelfth preferred embodiment of the robot arm mechanism according to the present invention.

Referring to FIGS. 20 and 23 of the drawings, there is shown a twelfth preferred embodiment of the robot arm mechanism according to the present invention. The robot arm mechanism 111 is shown in FIGS. 20 and 23 as comprising a handling member 125 for supporting and handling an object and a robot arm 920.

The robot arm 920 comprises first, second, third, and fourth arm link 921, 922, 923, and 924 which are similar to the first, second, third, and fourth arm link 901, 902, 903, and 904 in the tenth preferred embodiment of the robot arm mechanism according to the present invention.

The robot arm 920 further comprises a fifth arm link 925 having first and second end portions. The robot arm 920 further comprises a sixth arm link 926 having first and second end portions. The fifth and sixth arm link 925 and 926 substantially equal in length to each other.

The robot arm 920 further comprises a first stabilizing mechanism 630 including a first link 631 having first and second end portions. The first link 631 is integrally formed with and in axial alignment with the first arm link 921 under the state that the second end portion of the first link 631 is connected with the second end portion of the first arm link 921.

The first stabilizing mechanism 630 includes a second link 632 having first and second end portions. The first and second links 631 and 632 are pivotably connected with each other at the second end portion of the first link 631 and the first end portion of the second link 632. The second link 632 is integrally formed with and in axial alignment with the third arm link 923 under the state that the first end portion of the second link 632 is connected with the second end portion of the third arm link 923.

The first stabilizing mechanism 630 includes a third link 633 having first and second end portions and substantially equal in length to the first link 631. The second and third links 632 and 633 are pivotably connected with each other at the second end portion of the second link 632 and the first end portion of the third link 633. The third link 633 is integrally formed with and in parallel relationship with the fifth arm link 925 under the state that the first end portion of the third link 633 is connected with the second end portion of the fifth arm link 925.

The first stabilizing mechanism 630 includes a fourth link 634 having first and second end portions and substantially equal in length to the second link 632. The third and fourth links 633 and 634 are pivotably connected with each other at the second end portion of the third link 633 and the first end portion of the fourth link 634. The fourth and first links 634 and 631 are pivotably connected with each other at the second end portion of the fourth link 634 and the first end portion of the first link 631 under the state that the first link 631 is in parallel relationship with the third link 633 and that the second link 632 is in parallel relationship with the fourth link 634.

The robot arm 920 further comprises a second stabilizing mechanism 640 which is similar to the first stabilizing mechanism 630. The first link 641 is integrally formed with and in axial alignment with the second arm link 922 under the state that the second end portion of the first link 641 is connected with the second end portion of the second arm link 922. The second link 642 is integrally formed with and in axial alignment with the fourth arm link 924 under the state that the first end portion of the second link 642 is connected with the second end portion of the fourth arm link 924. The third link 643 is integrally formed with and in parallel relationship with the sixth arm link 926 under the state that the first end portion of the third link 643 is connected with the second end portion of the sixth arm link 926.

The handling member 125 has first and second portions. The fifth arm link 925 and the handling member 125 are pivotably connected with each other at the first end portion of the fifth arm link 925 and the first portion of the handling member 125. The sixth arm link 926 and the handling member 125 are pivotably connected with each other at the first end portion of the sixth arm link 926 and the second portion of the handling member 125.

The first driving shaft 121 is integrally connected with the second end portion of the third arm link 923 and rotating the third arm link 923 around the rotation axis 123. The second driving shaft 122 is integrally connected with the second end portion of the fourth arm link 924 and rotating the fourth arm link 924 around the rotation axis 123.

According to the present invention, the third and fourth arm links 923 and 924 may be replaced by each other about the connection with the first or second driving shafts 121 or 122.

According to the present invention, the operation of the robot arm mechanism 112 in the twelfth preferred embodiment is similar to the operation of the robot arm mechanism 110 in the tenth preferred embodiment.

Figure 24:
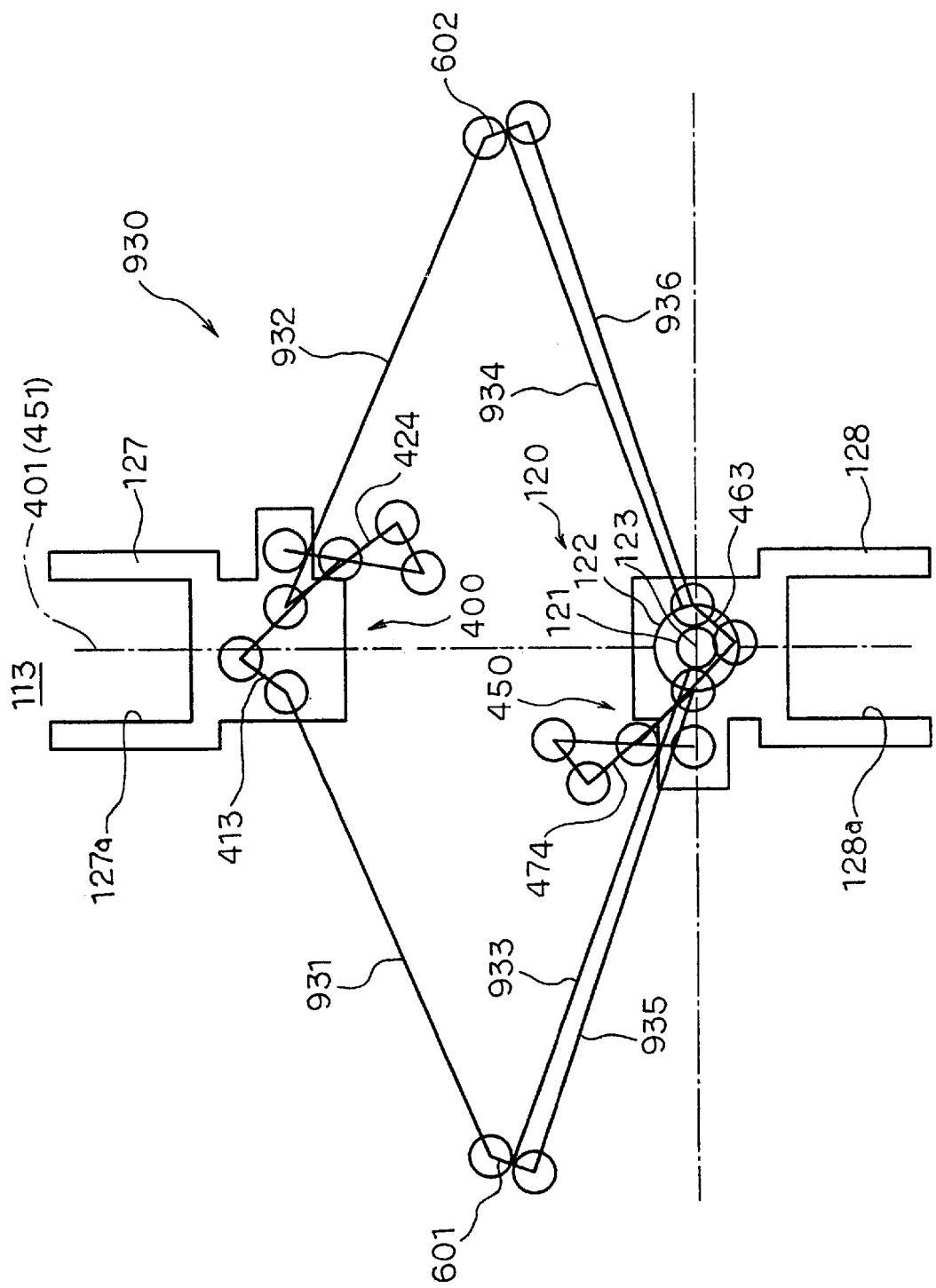
FIG. 24 is a skeleton view of the thirteenth preferred embodiment of the robot arm mechanism according to the present invention.

Referring to FIGS. 18 and 24 of the drawings, there is shown a thirteenth preferred embodiment of the robot arm mechanism according to the present invention. The robot arm mechanism 113 is shown in FIGS. 18 and 24 as comprising a handling member 127 and a robot arm 930.

The construction of the robot arm mechanism 113 in the present preferred embodiment is similar to the construction of the robot arm mechanism 109 in the ninth preferred embodiment except for the following construction of the robot arm mechanism 113 in the present preferred embodiment.

The robot arm 930 comprises first, second, third, and fourth arm links 931, 932, 933, and 934 which are similar to the first, second, third, and fourth arm links 891, 892, 893, and 894 in the ninth preferred embodiment of the robot arm mechanism according to the present invention (See FIG. 19).

The robot arm mechanism 113 further comprises an additional handling member 128. The robot arm 930 further comprises a fifth arm link 935 having first and second end portion and a sixth arm link 936 having first and second end portion. The fifth and sixth arm links 935 and 936 are substantially equal in length to each other.

The robot arm 930 further comprises an additional link retaining mechanism 450 having an additional center line 451. The additional link retaining mechanism 450 pivotably retainins the fifth and sixth arm links 935 and 936 respectively at the first end portions of the fifth and sixth arm links 935 and 936 and keeps parallel a first line and a second line, the first line being a line passing through the first and second end portions of the fifth arm link 935 and the second line being a line symmetrical with respect to the additional center line 451 with the line passing through the first and second end portions of the sixth arm link 936. In fact the fifth and sixth arm links 935 and 936 are in symmetrical relationship with each other with respect to the additional center line 451.

The first end portion of the sixth arm link 936 is integrally connected with the second short link 463. The first end portion of the fifth arm link 935 is integrally connected with the second long link 474.

The first end portions of the fifth and sixth arm links 935 and 936 are positioned on the line passing through the first and second end portions of the first long link 462.

The distance between the second end portion of the first long link 412 and the first end portion of the first short link 421 is substantially equal to the distance between the second end portion of the first long link 462 and the first end portion of the first short link 471.

The first joint mechanism 601 retains the third arm link 933 at the first end portion of the third arm link 933. The first joint mechanism 601 retains the first and fifth arm links 931 and 935 respectively at the second end portions of the first and fifth arm links 931 and 935 under the state that the first and fifth arm links 931 and 935 are pivotable respectively around the second end portions of the first and fifth arm links 931 and 935 with respect to the third arm link 933.

The second joint mechanism 602 retains the fourth arm link 934 at the first end portion of the fourth arm link 934. The second joint mechanism 602 retains the second and sixth arm links 932 and 936 respectively at the second end portions of the second and sixth arm links 932 and 936 under the state that the second and sixth arm links 932 and 936 are pivotable respectively around the second end portions of the second and sixth arm links 932 and 936 with respect to the fourth arm link 934.

The additional handling member 128 is integrally connected with the first long link 462.

The first joint mechanism 601 is formed by a link and has first and second end portions. The third arm link 933 is integrally connected with the first joint mechanism 601 at the portion substantially equally spaced apart from the first and second end portions of the first joint mechanism 601 under the state that first joint mechanism 601 and the third arm link 933 are in perpendicular relationship with each other. The first arm link 931 and the first joint mechanism 601 is pivotably connected with each other at the second end portion of the first arm link 931 and the first end portion of the first joint mechanism 601. The fifth arm link 935 and the first joint mechanism 601 is pivotably connected with each other at the second end portion of the fifth arm link 935 and the second end portion of the first joint mechanism 601. The second joint mechanism 602 is formed by a link and has first and second end portions. The fourth arm link 934 is integrally connected with the second joint mechanism 602 at the portion substantially equally spaced apart from the first and second end portions of the second joint mechanism 602 under the state that second joint mechanism 602 and the fourth arm link 934 are in perpendicular relationship with each other. The second arm link 932 and the second joint mechanism 602 is pivotably connected with each other at the second end portion of the second arm link 932 and the first end portion of the second joint mechanism 602. The sixth arm link 936 and the second joint mechanism 602 are pivotably connected with each other at the second end portion of the sixth arm link 936 and the second end portion of the second joint mechanism 602.

The first driving shaft 121 is integrally connected with the second end portion of the third arm link 933 and rotating the third arm link 933 around the rotation axis 123. The second driving shaft 122 is integrally connected with the second end portion of the fourth arm link 934 and rotating the fourth arm link 934 around the rotation axis 123.

According to the present invention, the third and fourth arm links 933 and 934 may be replaced by each other about the connection with the first or second driving shafts 121 or 122.

According to the present invention, the operation of the robot arm mechanism 113 in the thirteenth preferred embodiment is similar to the operation of the robot arm mechanism 109 in the ninth preferred embodiment except for the following operation of the robot arm mechanism 113 in the thirteenth preferred embodiment.

By the reason that the robot arm mechanism 113 comprises the handling member 127 and the additional handling member 128, the handling member 127 leaves from the rotation axis 123 when the additional handling member 128 approaches the rotation axis 123. Similarly, the additional handling member 128 leaves from the rotation axis 123 when the handling member 127 approaches the rotation axis 123.

Figure 25:
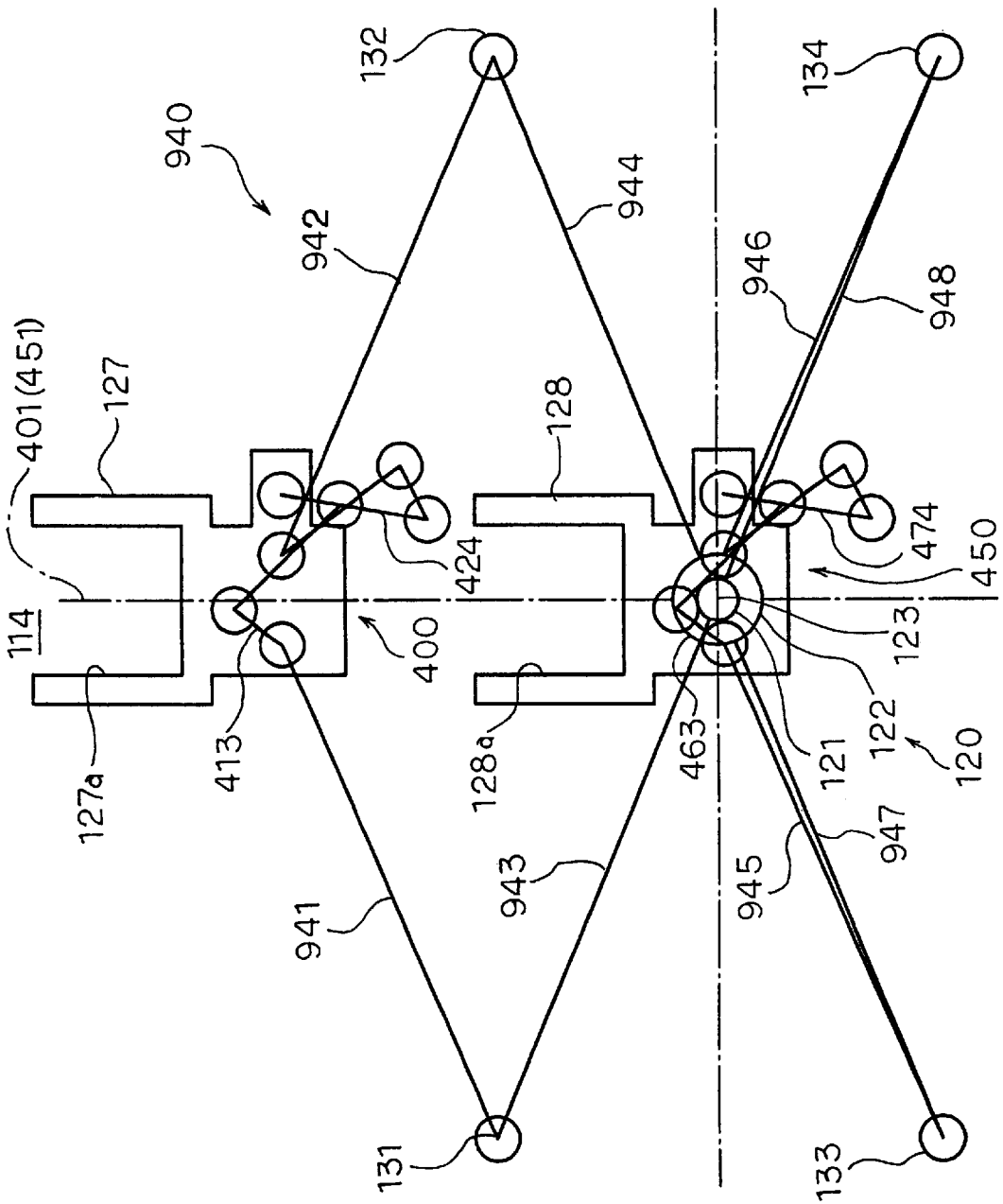
FIG. 25 is a skeleton view of the fourteenth preferred embodiment of the robot arm mechanism according to the present invention.

Referring to FIGS. 18 and 25 of the drawings, there is shown a fourteenth preferred embodiment of the robot arm mechanism according to the present invention. The robot arm mechanism 114 is shown in FIGS. 18 and 25 as comprising a handling member 127 and a robot arm 940.

The construction of the robot arm mechanism 114 in the present preferred embodiment is similar to the construction of the robot arm mechanism 109 in the ninth preferred embodiment except for the following construction of the robot arm mechanism 114 in the present preferred embodiment.

The robot arm 940 comprises first, second, third, and fourth arm links 941, 942, 943, and 944 which are similar to first, second, third, and fourth arm links 891, 892, 893, and 894 in the ninth preferred embodiment of the robot arm mechanism according to the present invention (See FIG. 19).

The robot arm mechanism 114 further comprises an additional handling member 128. The robot arm 940 further comprises a fifth arm link 945 having first and second end portion, a sixth arm link 946 having first and second end portion, a seventh arm link 947 having first and second end portion, and a eighth arm link 948 having first and second end portion. The fifth and sixth arm links 945 and 946 are substantially equal in length to each other. The seventh and eighth arm links 947 and 948 are substantially equal in length to each other.

The robot arm 940 further comprises a third joint mechanism 133 retaining the fifth and seventh arm links 945 and 947 respectively at the second end portion of the fifth arm link 945 and the first end portion of the seventh arm link 947 under the state that the fifth arm link 945 is pivotable around the second end portion of the fifth arm link 945 with respect to the seventh arm link 947. The robot arm 940 further comprises a fourth joint mechanism 134 retaining the sixth and eighth arm links 946 and 948 respectively at the second end portion of the sixth arm link 946 and the first end portion of the eighth arm link 948 under the state that the sixth arm link 946 is pivotable around the second end portion of the sixth arm link 946 with respect to the eighth arm link 948.

The robot arm 940 further comprises an additional link retaining mechanism 450 having an additional center line 451. The additional link retaining mechanism 450 pivotably retains the fifth and sixth arm links 945 and 946 respectively at the first end portions of the fifth and sixth arm links 945 and 946 and keeps parallel a first line and a second line, the first line being a line passing through the first and second end portions of the fifth arm link 945 and the second line being a line symmetrical with respect to the additional center line 451 with the line passing through the first and second end portions of the sixth arm link 946. In fact the fifth and sixth arm links 945 and 946 are in symmetrical relationship with each other with respect to the additional center line 451.

The additional link retaining mechanism 450 are similar to the link retaining mechanism 400.

The first end portion of the fifth arm link 945 is integrally connected with the second short link 463 (See FIG. 18). The first end portion of the sixth arm link 946 is integrally connected with the second long link 474 (See FIG. 18). The first end portions of the fifth and sixth arm links 945 and 946 are positioned on the line passing through the first and second end portions of the first long link 462.

The distance between the second end portion of the first long link 412 and the first end portion of the first short link 421 is substantially equal to the distance between the second end portion of the first long link 462 and the first end portion of the first short link 471.

The first driving shaft 121 is integrally connected with the second end portion of the third arm link 943 and rotating the third arm link 943 around the rotation axis 123. The second driving shaft 122 is integrally connected with the second end portion of the fourth arm link 944 and rotating the fourth arm link 944 around the rotation axis 123.

The first driving shaft 121 rotates the eighth arm link 948 around the second end portion of the eighth arm link 948. The second driving shaft 122 rotates the seventh arm link 947 around the second end portion of the seventh arm link 947. The second end portions of the eighth and seventh arm links 948 and 947 are positioned on the rotation axis 943.

In prevent preferred embodiment the third and fourth arm links 943 and 944 are respectively in axial alignment with the eighth and seventh arm links 948 and 947.

The additional handling member 128 is integrally connected with the first long link 462.

According to the present invention, the third and fourth arm links 943 and 944 may be replaced by each other about the connection with the first or second driving shafts 121 or 122. Similarly, the seventh and eighth arm links 947 and 948 may be replaced by each other about the connection with the first or second driving shafts 121 or 122.

According to the present invention, the operation of the robot arm mechanism 114 in the fourteenth preferred embodiment is similar to the operation of the robot arm mechanism 109 in the ninth preferred embodiment except for the following operation of the robot arm mechanism 114.

By the reason that the robot arm mechanism 114 comprises the handling member 127 and the additional handling member 128, the handling member 127 leaves from the rotation axis 123 when the additional handling member 128 approaches the rotation axis 123. Similarly, the additional handling member 128 leaves from the rotation axis 123 when the handling member 127 approaches the rotation axis 123.

Figure 26:
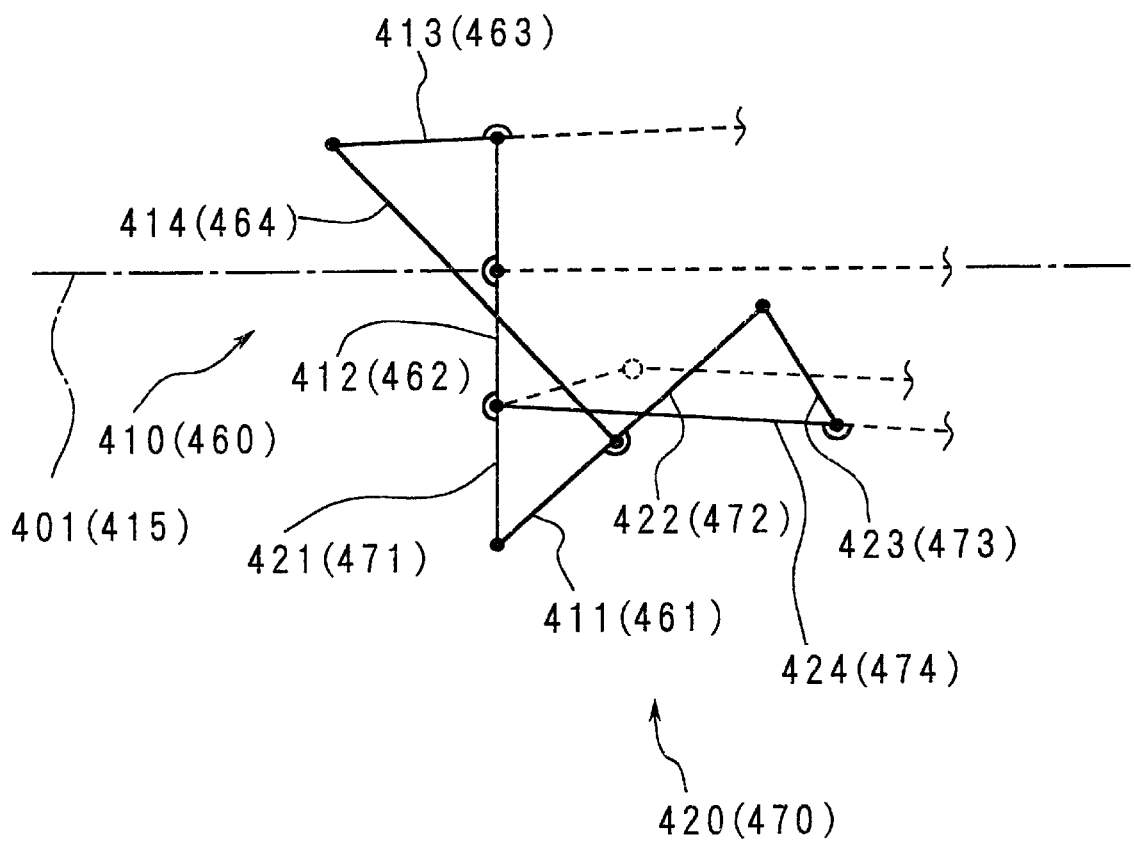
FIG. 26 is an enlarged fragmentary skeleton view of the robot arm mechanism shown in FIG. 27 to be used for explaining the principle of the robot arm mechanism according to the present invention.
Figure 27:
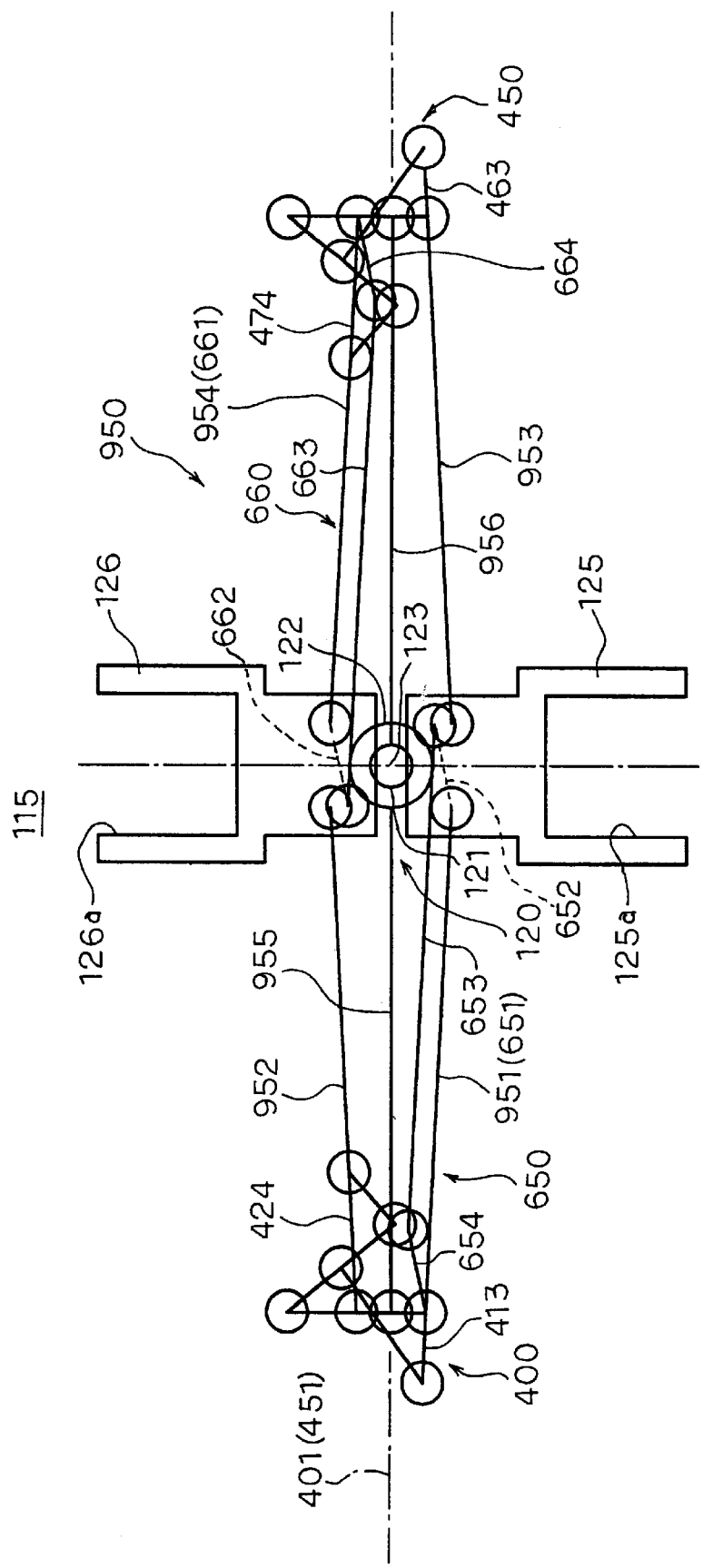
FIG. 27 is a skeleton view of the fifteenth preferred embodiment of the robot arm mechanism according to the present invention.

Referring to FIGS. 26 and 27 of the drawings, there is shown a fifteenth preferred embodiment of the robot arm mechanism according to the present invention. The robot arm mechanism 115 is shown in FIGS. 26 and 27 as comprising a handling member 125 and a robot arm 950.

The robot arm 950 comprises first, second, third, and fourth arm links 951, 952, 953, and 954 which are similar to first, second, third, and fourth arm links 901, 902, 903, and 904 in the tenth preferred embodiment of the robot arm mechanism according to the present invention.

The robot arm mechanism 115 further comprises an additional handling member 126. The robot arm 950 further comprises a third arm link 950 having first and second end portion and a fourth arm link 954 having first and second end portion. The first, second, third, and fourth arm links 951, 952, 953, and 954 are substantially equal in length to each other.

The robot arm 950 further comprises a link retaining mechanism 400 having a center line 400.

The robot arm 950 further comprises a fifth arm link 955 having first and second end portion and a sixth arm link 956 having first and second end portion. The robot arm 950 further comprises an additional link retaining mechanism 450 having an additional center line 451. The additional link retaining mechanism 450 pivotably retains the third and fourth arm links 953 and 954 respectively at the first end portions of the third and fourth arm links 953 and 954 and keeps parallel a first line and a second line, the first line being a line passing through the first and second end portions of the third arm link 953 and the second line being a line symmetrical with respect to the additional center line 451 with the line passing through the first and second end portions of the fourth arm link 954. In fact the third and fourth arm links 953 and 954 are in symmetrical relationship with each other with respect to the additional link retaining mechanism 450.

The first end portion of the first arm link 951 is integrally connected with the second short link 413. The first end portion of the second arm link 952 is integrally connected with the second long link 424. The first end portion of the third arm link 953 is integrally connected with the second short link 463. The first end portion of the fourth arm link 954 is integrally connected with the second long link 474.

The distance between the second end portion of the first long link 412 and the first end portion of the first short link 421 is substantially equal to the distance between the second end portion of the first long link 462 and the first end portion of the first short link 471.

The handling member 125 has a first and second portions. The additional handling member 126 has a first and second portions. The first arm link 951 and the handling member 125 are pivotably connected with each other at the second end portion of the first arm link 951 and the first portion of the handling member 125. The third arm link 953 and the handling member 125 are pivotably connected with each other at the second end portion of the third arm link 953 and the second portion of the handling member 125. The fourth arm link 954 and the additional handling member 126 are pivotably connected with each other at the second end portion of the fourth arm link 954 and the first portion of the additional handling member 126. The second arm link 952 and the additional handling member 126 are pivotably connected with each other at the second end portion of the second arm link 952 and the second portion of the additional handling member 126. The arm driving mechanism 120 comprises a first driving shaft 121 rotatable around a rotation axis 123, and a second driving shaft 122 in the form of a hollow shape to rotatably receive therein the first driving shaft 121 and rotatable around the rotation axis 123. The first driving shaft 121 rotates the fifth arm link 955 around the second end portion of the fifth arm link 955. The second driving shaft 122 rotates the sixth arm link 956 around the second end portion of the sixth arm link 956. The second end portions of the fifth and sixth arm links 955 and 956 are positioned on the rotation axis 123. The fifth arm link 955 is pivotable around the second end portion of the fifth arm link 955. The sixth arm link 956 is pivotable around the second end portion of the sixth arm link 956. The first end portion of the fifth arm link 955 is pivotably connected with the first long link 412 under the state that the first end portion of the fifth arm link 955 is substantially equally spaced apart from the second end portion of the first long link 412 and the first end portion of the first short link 421. The first end portion of the sixth arm link 956 is pivotably connected with the first long link 462 under the state that the first end portion of the sixth arm link 956 is substantially equally spaced apart from the second end portion of the first long link 462 and the first end portion of the first short link 471.

The robot arm 950 further comprises a stabilizing mechanism 650 which includes a first link 651 having first and second end portions and substantially equal in length to the first arm link 951. The first link 651 is integrally formed with and in coaxial relationship with the first arm link 951 under the state that the first end portion of the first link 651 is connected with the first end portion of the first arm link 951.

The stabilizing mechanism 650 further includes a second link 652 having first and second end portions. The first and second links 651 and 652 are pivotably connected with each other at the second end portion of the first link 651 and the first end portion of the second link 652. The second link 652 is integrally connected with the handling member 125.

The stabilizing mechanism 650 further includes a third link 653 having first and second end portions and substantially equal in length to the first link 651. The second and third links 652 and 653 are pivotably connected with each other at the second end portion of the second link 652 and the first end portion of the third link 653.

The stabilizing mechanism 650 further includes a fourth link 654 having first and second end portions and substantially equal in length to the second link 652. The third and fourth links 653 and 654 are pivotably connected with each other at the second end portion of the third link 653 and the first end portion of the fourth link 654. The fourth and first links 654 and 651 are pivotably connected with each other at the second end portion of the fourth link 654 and the first end portion of the first link 651 under the state that the first link 651 is in parallel relationship with the third link 653 and that the second link 652 is in parallel relationship with the fourth link 654. The second end portion of the fourth link 654 integrally formed with the first long link 412 or the first short link 421.

The robot arm 950 further comprises an additional stabilizing mechanism 660. The additional stabilizing mechanism 660 is similar to the stabilizing mechanism 650 and includes a first link 661 having first and second end portions and substantially equal in length to the fourth arm link 954. The first link 661 is integrally formed with and in coaxial relationship with the fourth arm link 954 under the state that the first end portion of the first link 661 is connected with the first end portion of the fourth arm link 954.

The additional stabilizing mechanism 660 further includes a second link 662 having first and second end portions. The first and second links 661 and 662 are pivotably connected with each other at the second end portion of the first link 661 and the first end portion of the second link 662. The second link 662 is integrally connected with the additional handling member 126.

The additional stabilizing mechanism 660 further includes a third link 663 having first and second end portions and substantially equal in length to the first link 661. The second and third links 662 and 663 are pivotably connected with each other at the second end portion of the second link 662 and the first end portion of the third link 663.

The additional stabilizing mechanism 660 further includes a fourth link 664 having first and second end portions and substantially equal in length to the second link 662. The third and fourth links 663 and 664 are pivotably connected with each other at the second end portion of the third link 663 and the first end portion of the fourth link 664. The fourth and first links 664 and 661 are pivotably connected with each other at the second end portion of the fourth link 664 and the first end portion of the first link 661 under the state that the first link 661 is in parallel relationship with the third link 663 and that the second link 662 is in parallel relationship with the fourth link 664. The second end portion of the fourth link 664 integrally formed with the first long link 462 or the first short link 471.

The first driving shaft 121 is integrally connected with the second end portion of the sixth arm link 956 and rotating the sixth arm link 956 around the rotation axis 123. The second driving shaft 122 is integrally connected with the second end portion of the fifth arm link 955 and rotating the fifth arm link 955 around the rotation axis 123.

According to the present invention, the fifth and sixth arm links 955 and 956 may be replaced by each other about the connection with the first or second driving shafts 121 or 122.

According to the present invention, the link retaining mechanism 400 retains the first and second arm links 951 and 952 under the state that the first and second arm links 951 and 952 are in symmetrical relationship with each other with respect to the center line 401. The additional link retaining mechanism 450 retains the third and fourth arm links 953 and 954 under the state that the third and fourth arm links 953 and 954 are in symmetrical relationship with each other with respect to the center line 451. By the reason that the first and third arm links 951 and 953 are respectively in symmetrical relationship with the second and fourth arm links 952 and 954, the handling member 125 leaves from the rotation axis 123 when the additional handling member 126 approaches the rotation axis 123. By the same reason, the additional handling member 126 leaves from the rotation axis 123 when the handling member 125 approaches the rotation axis 123.

According to the present invention, the robot arm mechanism 115 can be rotated around the rotation axis 123 by the rotation of the fifth or sixth arm links 955 or 956 around the rotation axis 123.

Figure 28:
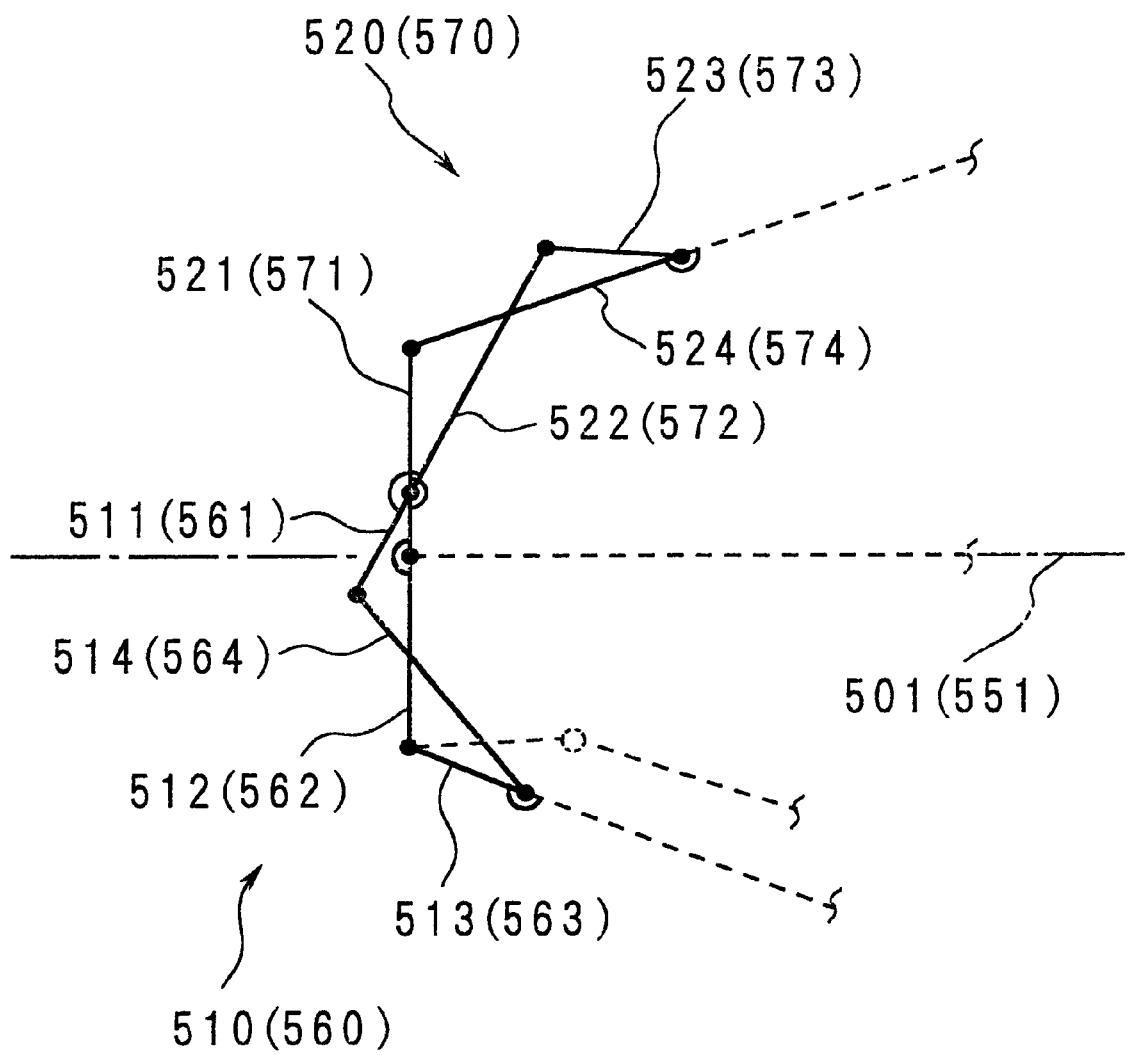
FIG. 28 is an enlarged fragmentary skeleton view of the robot arm mechanism shown in FIG. 29 to be used for explaining the principle of the robot arm mechanism according to the present invention.
Figure 29:
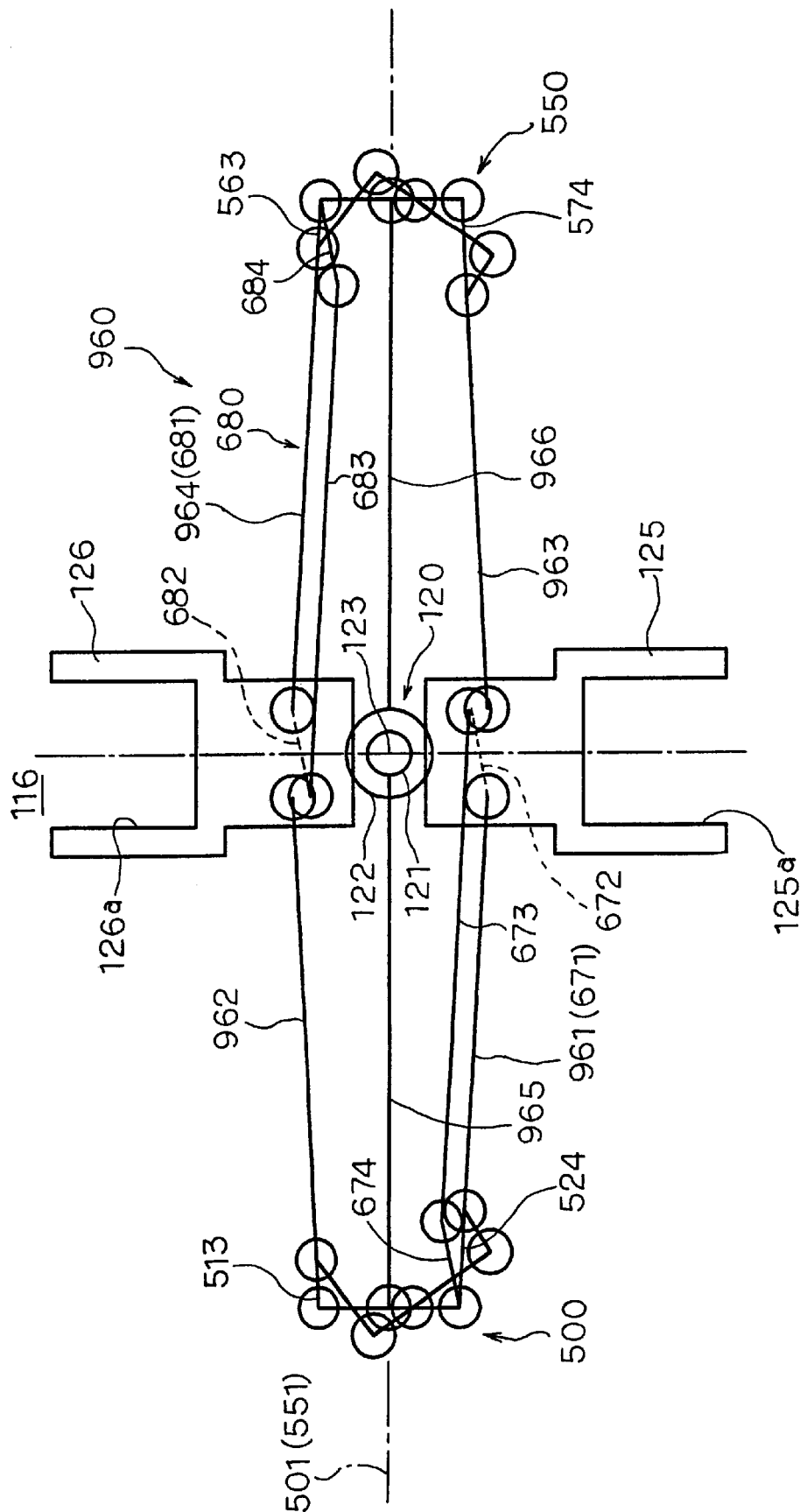
FIG. 29 is a skeleton view of the sixteenth preferred embodiment of the robot arm mechanism according to the present invention.

Referring to FIGS. 28 and 29 of the drawings, there is shown a sixteenth preferred embodiment of the robot arm mechanism according to the present invention. The robot arm mechanism 116 is shown in FIGS. 28 and 29 as comprising a robot arm 960.

The construction of the robot arm mechanism 116 in the present preferred embodiment is similar to the construction of the robot arm mechanism 115 in the fifteenth preferred embodiment except for the link retaining mechanism 500 and the additional link retaining mechanism 550.

The robot arm 960 comprises first, second, third, and fourth arm links 961, 962, 963, and 964 which are similar to first, second, third, and fourth arm links 951, 952, 953, and 954 in the fifth preferred embodiment of the robot arm mechanism according to the present invention.

The first driving shaft 121 is integrally connected with the second end portion of the fifth arm link 965 and rotating the fifth arm link 965 around the rotation axis 123. The second driving shaft 122 is integrally connected with the second end portion of the sixth arm link 966 and rotating the sixth arm link 966 around the rotation axis 123.

According to the present invention, the fifth and sixth arm links 965 and 966 may be replaced by each other about the connection with the first or second driving shafts 121 or 122.

According to the present invention, the operation of the robot arm mechanism 116 in the sixteenth preferred embodiment is similar to the operation of the robot arm mechanism 115 in the fifteenth preferred embodiment.

Figure 30:
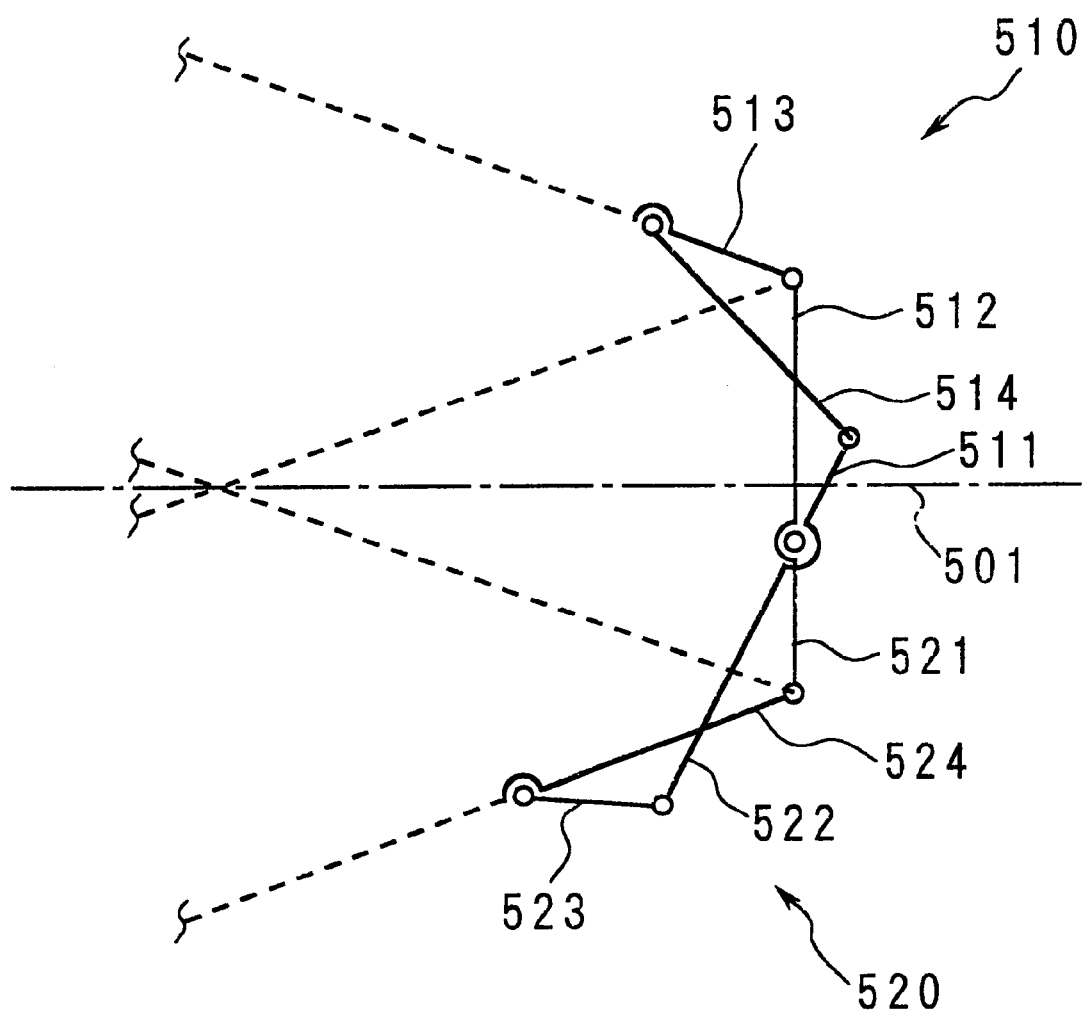
FIG. 30 is an enlarged fragmentary skeleton view of the robot arm mechanism shown in FIG. 31 to be used for explaining the principle of the robot arm mechanism according to the present invention.
Figure 31:
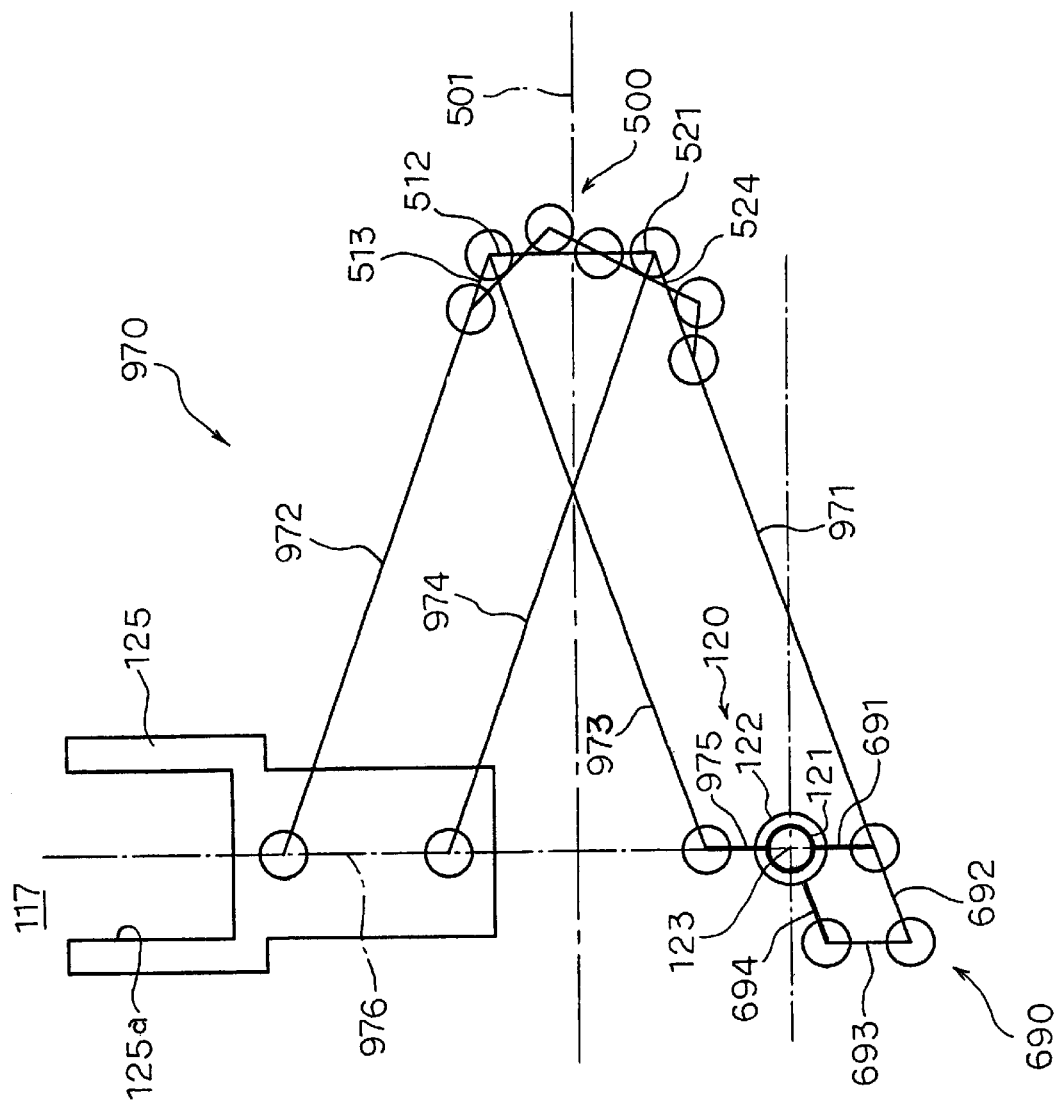
FIG. 31 is a skeleton view of one condition of the seventeenth preferred embodiment of the robot arm mechanism according to the present invention.
Figure 32:
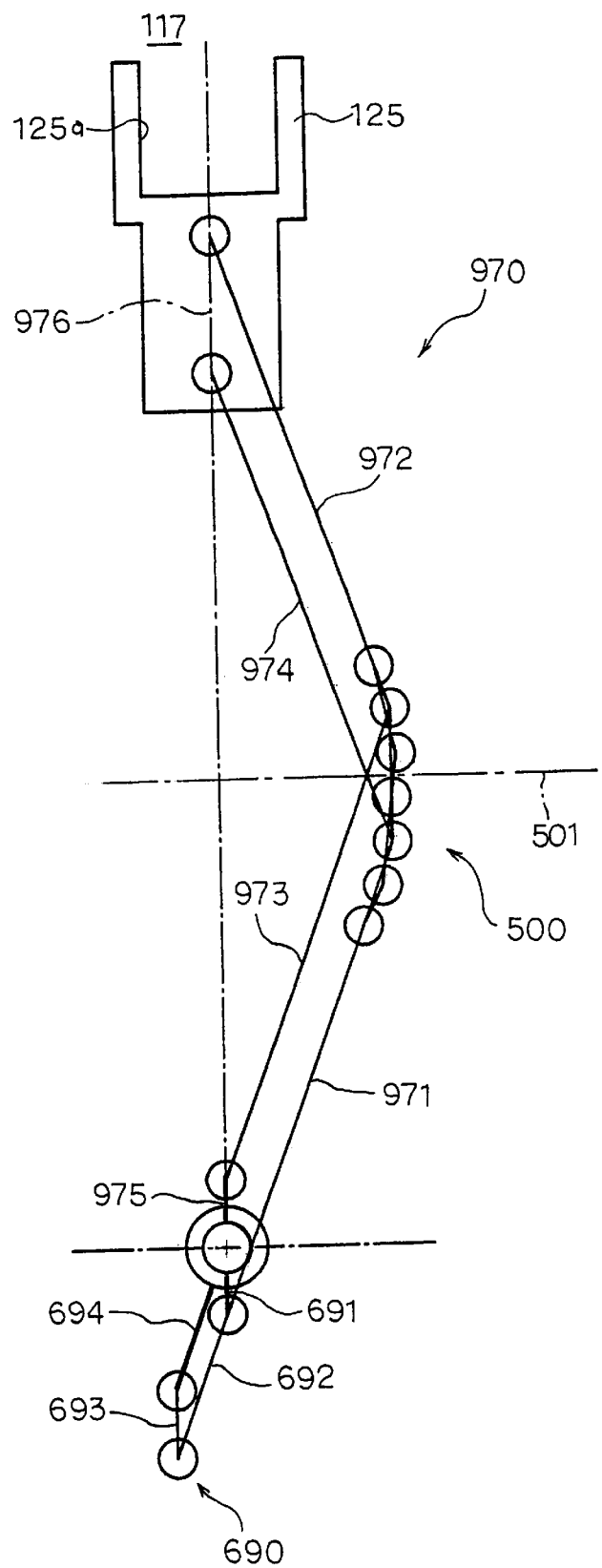
FIG. 32 is a skeleton view of another condition of the seventeenth preferred embodiment of the robot arm mechanism according to the present invention.

Referring to FIGS. 30 to 32 of the drawings, there is shown a seventeenth preferred embodiment of the robot arm mechanism according to the present invention. The robot arm mechanism 117 is shown in FIGS. 30 to 32 as comprising a handling member 125 and a robot arm 970.

The robot arm 970 comprises first and second arm links 971 and 972.

The robot arm 970 further comprises a third arm link 973 having first and second end portions and substantially equal in length to the first arm link 971. The second and third arm links 972 and 973 are pivotably connected with each other at the first end portion of the second arm link 972 and the first end portion of the third arm link 973.

The robot arm 970 further comprises a fourth arm link 974 having first and second end portions and substantially equal in length to the second arm link 972. The first and second arm links 971 and 972 are substantially equal in length to each other. The first and fourth arm links 971 and 974 are pivotably connected with each other at the first end portion of the first arm link 971 and the first end portion of the fourth arm link 974.

The robot arm 970 further comprises a fifth arm link 975 having first and second end portions and substantially equal in length to the distance between the second end portion of the first long link 512 and the first end portion of the first short link 521. The first and fifth arm links 971 and 975 are pivotably connected with each other at the second end portion of the first arm link 971 and the first end portion of the fifth arm link 975. The third and fifth arm links 973 and 975 are pivotably connected with each other at the second end portion of the third arm link 973 and the second end portion of the fifth arm link 975 under the state that the first long link 512 and the fifth arm link 975 are in parallel relationship with each other and that the first arm link 971 and the third arm link 973 are in parallel relationship with each other.

The robot arm 970 further comprises a sixth arm link 976 having first and second end portions and substantially equal in length to the distance between the second end portion of the first long link 512 and the first end portion of the first short link 521. The second and sixth arm links 972 and 976 are pivotably connected with each other at the second end portion of the second arm link 972 and the first end portion of the sixth arm link 976. The fourth and sixth arm links 974 and 976 are pivotably connected with each other at the second end portion of the fourth arm link 974 and the second end portion of the sixth arm link 976 under the state that the first long link 512 and the sixth arm link 976 are in parallel relationship with each other and that the second arm link 972 and the fourth arm link 974 are in parallel relationship with each other, the handling member 125 and the sixth arm link 976 integrally formed with each other.

The arm driving mechanism 120 comprises a first driving shaft 121 rotatable around a rotation axis 123, and a second driving shaft 122 in the form of a hollow shape to rotatably receive therein the first driving shaft 121 and rotatable around the rotation axis 123. The rotation axis 123 is positioned on the line passing through the first and second end portions of the fifth arm link 975. The robot arm 970 further comprises a driving assist parallelogram linkage 690 including a first link 691 having first and second end portions and substantially equal in length to the distance between the rotation axis 123 and the second end portion of the first arm link 971. The first link 691 is integrally formed with and in coaxial relationship with the fifth arm link 975 under the state that the second end portion of the first link 691 is connected with the first end portion of the fifth arm link 975.

The driving assist parallelogram linkage 690 further includes a second link 692 having first and second end portions. The first and second links 691 and 692 are pivotably connected with each other at the second end portion of the first link 691 and the first end portion of the second link 692. The second link 692 is integrally formed with and in parallel relationship with the first arm link 971 under the state that the first end portion of the second link 692 is connected with the second end portion of the first arm link 971.

The driving assist parallelogram linkage 690 further includes a third link 693 having first and second end portions and substantially equal in length to the first link 691. The second and third links 692 and 693 are pivotably connected with each other at the second end portion of the second link 692 and the first end portion of the third link 693.

The driving assist parallelogram linkage 690 further includes a fourth link 694 having first and second end portions and substantially equal in length to the second link 692. The third and fourth links 693 and 694 are pivotably connected with each other at the second end portion of the third link 693 and the first end portion of the fourth link 694. The fourth and first links 694 and 691 are pivotably connected with each other at the second end portion of the fourth link 694 and the first end portion of the first link 691 under the state that the first link 691 is in parallel relationship with the third link 693 and that the second link 692 is in parallel relationship with the fourth link 694.

The arm driving mechanism 120 comprises a first driving shaft 121 rotatable around a rotation axis 123, and a second driving shaft 122 in the form of a hollow shape to rotatably receive therein the first driving shaft 121 and rotatable around the rotation axis 123.

The second driving shaft 122 is integrally connected with the fourth link 694 at the second end portion of the fourth link 694 and rotating the fourth link 694 around the rotation axis 123. The first driving shaft 121 is integrally connected with the fifth arm link 975 and rotating the fifth arm link 975 around the rotation axis 123.

According to the present invention, while the second driving shaft 122 rotates the first arm link 971 through the driving assist parallelogram linkage 690, the second driving shaft 122 may be directly and integrally connected with the first or third arm links 971 or 973 at the second end portions of the first or third arm links 971 or 973 without the driving assist parallelogram linkage 690.

According to the present invention, the link retaining mechanism 500 retains the first and second arm links 971 and 972 under the state that the first and second arm links 971 and 972 are in symmetrical relationship with each other with respect to the center line 501. By the reason that the first arm link 971 is in symmetrical relationship with the second arm link 972, the fifth and sixth arm links 975 and 976 are positioned on a common line. By the reason that the fifth and sixth arm links 975 and 976 are positioned on the common line, the handling member 125 approaches and leaves from the rotation axis 123 with keeping a direction with respect to the rotation axis 123 fixed.

According to the present invention, the robot arm mechanism 117 can be rotated around the rotation axis 123 by the rotation of the first and second driving shafts 121 and 122 around the rotation axis 123.

According to the present invention, the fifth arm link 975 and the fourth link 694 may be replaced by each other about the connection with the first or second driving shafts 121 or 122.

What is claimed is:

1. A robot arm mechanism comprising:

a handling member for supporting and handling an object;

a robot arm connected to the handling member, the robot arm comprising a first arm link having first and second end portion, a second arm link having first and second end portion, and a link retaining mechanism having a center line, the link retaining mechanism pivotably retaining the first and second arm links respectively at the first end portions of the first and second arm links and keeping parallel a first line and a second line, the first line being a line passing through the first and second end portions of the first arm link and the second line being a line symmetrical with respect to the center line with the line passing through the first and second end portions of the second arm link, the link retaining mechanism comprising a first joint cross linkage including a first short link having first and second end portions, a first long link having first and second end portions and longer than the first short link of the first joint cross linkage of the link retaining mechanism, the first short and long links of the first joint cross linkage of the link retaining mechanism pivotably connected with each other at the second end portion of the first short link of the first joint cross linkage of the link retaining mechanism and the first end portion of the first long link of the first joint cross linkage of the link retaining mechanism, a second short link having first and second end portions and substantially equal in length to the first short link of the first joint cross linkage of the link retaining mechanism, the first long link of the first joint cross linkage of the link retaining mechanism and the second short link of the first joint cross linkage of the link retaining mechanism pivotably connected with each other at the second end portion of the first long link of the first joint cross linkage of the link retaining mechanism and the first end portion of the second short link of the first joint cross linkage of the link retaining mechanism, and a second long link having first and second end portions and substantially equal in length to the first long link of the first joint cross linkage of the link retaining mechanism, the second short and long links of the first joint cross linkage of the link retaining mechanism pivotably connected with each other at the second end portion of the second short link of the first joint cross linkage of the link retaining mechanism and the first end portion of the second long link of the first joint cross linkage of the link retaining mechanism, the second long link of the first joint cross linkage of the link retaining mechanism and the first short link of the first joint cross linkage of the link retaining mechanism pivotably connected with each other at the second end portion of the second long link of the first joint cross linkage of the link retaining mechanism and the first end portion of the first short link of the first joint cross linkage of the link retaining mechanism under the state that the second long link of the first joint cross linkage of the link retaining mechanism is crossed with the first long link of the first joint cross linkage of the link retaining mechanism, and a second joint cross linkage including a first short link having first and second end portions, a first long link having first and second end portions and longer than the first short link of the second joint cross linkage of the link retaining mechanism, the first short and long links of the second joint cross linkage of the link retaining mechanism pivotably connected with each other at the second end portion of the first short link of the second joint cross linkage of the link retaining mechanism and the first end portion of the first long link of the second joint cross linkage of the link retaining mechanism, a second short link having first and second end portions and substantially equal in length to the first short link of the second joint cross linkage of the link retaining mechanism, the first long link of the second joint cross linkage of the link retaining mechanism and the second short link of the second joint cross linkage of the link retaining mechanism pivotably connected with each other at the second end portion of the first long link of the second joint cross linkage of the link retaining mechanism and the first end portion of the second short link of the second joint cross linkage of the link retaining mechanism, and a second long link having first and second end portions and substantially equal in length to the first long link of the second joint cross linkage of the link retaining mechanism, the second short and long links of the second joint cross linkage of the link retaining mechanism pivotably connected with each other at the second end portion of the second short link of the second joint cross linkage of the link retaining mechanism and the first end portion of the second long link of the second joint cross linkage of the link retaining mechanism, the second long link of the second joint cross linkage of the link retaining mechanism and the first short link of the second joint cross linkage of the link retaining mechanism pivotably connected with each other at the second end portion of the second long link of the second joint cross linkage of the link retaining mechanism and the first end portion of the first short link of the second joint cross linkage of the link retaining mechanism under the state that the second long link of the second joint cross linkage of the link retaining mechanism is crossed with the first long link of the second joint cross linkage of the link retaining mechanism, the length ratio of each of the first and second short links of the first joint cross linkage of the link retaining mechanism to each of the first and second long links of the first joint cross linkage of the link retaining mechanism substantially equal to the length ratio of each of the first and second short links of the second joint cross linkage of the link retaining mechanism to each of the first and second long links of the second joint cross linkage of the link retaining mechanism, the first short link of the first joint cross linkage of the link retaining mechanism integrally formed with and in axial alignment with the first long link of the second joint cross linkage of the link retaining mechanism under the state that the second end portion of the first short link of the first joint cross linkage of the link retaining mechanism is connected with the first end portion of the first long link of the second joint cross linkage of the link retaining mechanism, the first long link of the first joint cross linkage of the link retaining mechanism integrally formed with and in axial alignment with the first short link of the second joint cross linkage of the link retaining mechanism under the state that the first end portion of the first long link of the first joint cross linkage of the link retaining mechanism is connected with the second end portion of the first short link of the second joint cross linkage of the link retaining mechanism, the first end portion of any one of the first and second arm links integrally formed with the second short link of the first joint cross linkage of the link retaining mechanism, the first end portion of the other one of the first and second arm links integrally formed with the second long link of the second joint cross linkage of the link retaining mechanism; and a robot arm driving mechanism for driving the robot arm.

2. A robot arm mechanism as set forth in claim 1 in which the center line passes through the first and second end portions of the first long link of the first joint cross linkage of the link retaining mechanism, the first end portions of the first and second arm links positioned on the center line, the first short and long links of the first joint cross linkage of the link retaining mechanism respectively in coaxial relationship with the first long and short links of the second joint cross linkage of the link retaining mechanism.

3. A robot arm mechanism as set forth in claim 2 in which the robot arm further comprises:

a third arm link having first and second end portions the handling member having first and second portions, the third arm link and the handling member pivotably connected with each other at the second end portion of the third arm link and the first portion of the handling member;

a fourth arm link having first and second end portions, the fourth arm link and the handling member pivotably connected with each other at the second end portion of the fourth arm link and the second portion of the handling member, the first and second arm links substantially equal in length to each other, the third and fourth arm links substantially equal in length to each other;

a first joint mechanism retaining the first and third arm links respectively at the second end portion of the first arm link and the first end portion of the third arm link under the state that the first arm link is pivotable around the second end portion of the first arm link with respect to the third arm link; and a second joint mechanism retaining the second and fourth arm links respectively at the second end portion of the second arm link and the first end portion of the fourth arm link under the state that the second arm link is pivotable around the second end portion of the second arm link with respect to the fourth arm link.

4. A robot arm mechanism as set forth in claim 3 in which the second end portion of the first arm link and the first end portion of the third arm link are connected with each other.

5. A robot arm mechanism as set forth in claim 3 in which the first short link of the first joint cross linkage of the link retaining mechanism and the first long link of the second joint cross linkage of the link retaining mechanism are substantially equal in length to each other.

6. A robot arm mechanism as set forth in claim 3 which further comprises an additional handling member for supporting and handling an object, the robot arm further comprising a fifth arm link having first and second end portions, the additional handling member having first and second portions, the fifth arm link and the additional handling member pivotably connected with each other at the second end portion of the fifth arm link and the first portion of the additional handling member, the fifth arm link pivotably retained by the first joint mechanism at the first end portion of the fifth arm link, and a sixth arm link having first and second end portions, the sixth arm link and the additional handling member pivotably connected with each other at the second end portion of the sixth arm link and the second portion of the additional handling member, the fifth and sixth arm links substantially equal in length to each other, the sixth arm link pivotably retained by the second joint mechanism at the first end portion of the sixth arm link.

7. A robot arm mechanism as set forth in claim 3 in which the first long link of the first joint cross linkage of the link retaining mechanism and the first short link of the second joint cross linkage of the link retaining mechanism are substantially equal in length to each other.

8. A robot arm mechanism as set forth in claim 7 in which the robot arm further comprises:

a fifth arm link having first and second end portion;

a sixth arm link having first and second end portion;

an additional link retaining mechanism having an additional center line, the additional link retaining mechanism pivotably retaining the fifth and sixth arm links respectively at the first end portions of the fifth and sixth arm links and keeping parallel a first line and a second line, the first line being a line passing through the first and second end portions of the fifth arm link and the second line being a line symmetrical with respect to the additional center line with the line passing through the first and second end portions of the sixth arm link, the additional link retaining mechanism comprising a first joint cross linkage including a first short link having first and second end portions, a first long link having first and second end portions and longer than the first short link of the first joint cross linkage of the additional link retaining mechanism, the first short and long links of the first joint cross linkage of the additional link retaining mechanism pivotably connected with each other at the second end portion of the first short link of the first joint cross linkage of the additional link retaining mechanism and the first end portion of the first long link of the first joint cross linkage of the additional link retaining mechanism, a second short link having first and second end portions and substantially equal in length to the first short link of the first joint cross linkage of the additional link retaining mechanism, the first long link of the first joint cross linkage of the additional link retaining mechanism and the second short link of the first joint cross linkage of the additional link retaining mechanism pivotably connected with each other at the second end portion of the first long link of the first joint cross linkage of the additional link retaining mechanism and the first end portion of the second short link of the first joint cross linkage of the additional link retaining mechanism, and a second long link having first and second end portions and substantially equal in length to the first long link of the first joint cross linkage of the additional link retaining mechanism, the second short and long links of the first joint cross linkage of the additional link retaining mechanism pivotably connected with each other at the second end portion of the second short link of the first joint cross linkage of the additional link retaining mechanism and the first end portion of the second long link of the first joint cross linkage of the additional link retaining mechanism, the second long link of the first joint cross linkage of the additional link retaining mechanism and the first short link of the first joint cross linkage of the additional link retaining mechanism pivotably connected with each other at the second end portion of the second long link of the first joint cross linkage of the additional link retaining mechanism and the first end portion of the first short link of the first joint cross linkage of the additional link retaining mechanism under the state that the second long link of the first joint cross linkage of the additional link retaining mechanism is crossed with the first long link of the first joint cross linkage of the additional link retaining mechanism, and a second joint cross linkage including a first short link having first and second end portions, a first long link having first and second end portions and longer than the first short link of the second joint cross linkage of the additional link retaining mechanism, the first short and long links of the second joint cross linkage of the additional link retaining mechanism pivotably connected with each other at the second end portion of the first short link of the second joint cross linkage of the additional link retaining mechanism and the first end portion of the first long link of the second joint cross linkage of the additional link retaining mechanism, a second short link having first and second end portions and substantially equal in length to the first short link of the second joint cross linkage of the additional link retaining mechanism, the first long link of the second joint cross linkage of the additional link retaining mechanism and the second short link of the second joint cross linkage of the additional link retaining mechanism pivotably connected with each other at the second end portion of the first long link of the second joint cross linkage of the additional link retaining mechanism and the first end portion of the second short link of the second joint cross linkage of the additional link retaining mechanism, and a second long link having first and second end portions and substantially equal in length to the first long link of the second joint cross linkage of the additional link retaining mechanism, the second short and long links of the second joint cross linkage of the additional link retaining mechanism pivotably connected with each other at the second end portion of the second short link of the second joint cross linkage of the additional link retaining mechanism and the first end portion of the second long link of the second joint cross linkage of the additional link retaining mechanism, the second long link of the second joint cross linkage of the additional link retaining mechanism and the first short link of the second joint cross linkage of the additional link retaining mechanism pivotably connected with each other at the second end portion of the second long link of the second joint cross linkage of the additional link retaining mechanism and the first end portion of the first short link of the second joint cross linkage of the additional link retaining mechanism under the state that the second long link of the second joint cross linkage of the additional link retaining mechanism is crossed with the first long link of the second joint cross linkage of the additional link retaining mechanism, the length ratio of each of the first and second short links of the first joint cross linkage of the additional link retaining mechanism to each of the first and second long links of the first joint cross linkage of the additional link retaining mechanism substantially equal to the length ratio of each of the first and second short links of the second joint cross linkage of the additional link retaining mechanism to each of the first and second long links of the second joint cross linkage of the additional link retaining mechanism, the first short link of the first joint cross linkage of the additional link retaining mechanism integrally formed with and in parallel relationship with the first long link of the second joint cross linkage of the additional link retaining mechanism under the state that the second end portion of the first short link of the first joint cross linkage of the additional link retaining mechanism is connected with the first end portion of the first long link of the second joint cross linkage of the additional link retaining mechanism, the first long link of the first joint cross linkage of the additional link retaining mechanism integrally formed with and in parallel relationship with the first short link of the second joint cross linkage of the additional link retaining mechanism under the state that the first end portion of the first long link of the first joint cross linkage of the additional link retaining mechanism is connected with the second end portion of the first short link of the second joint cross linkage of the additional link retaining mechanism, the first end portion of any one of the fifth and sixth arm links integrally connected with the second short link of the first joint cross linkage of the additional link retaining mechanism, the first end portion of the other one of the fifth and sixth arm links integrally connected with the second long link of the second joint cross linkage of the additional link retaining mechanism, the first short and long links of the first joint cross linkage of the additional link retaining mechanism respectively in coaxial relationship with the first long and short links of the second joint cross linkage of the additional link retaining mechanism, the additional center line passing through the first and second end portions of the first long link of the first joint cross linkage of the additional link retaining mechanism, the first end portions of the fifth and sixth arm links positioned on the additional center line, the second end portion of the first arm link and the first end portion of the third arm link connected with each other, the second end portion of the second arm link and the first end portion of the foruth arm link connected with each other, the first long link of the first joint cross linkage of the additional link retaining mechanism and the first short link of the second joint cross linkage of the additional link retaining mechanism substantially equal in length to each other, the first long link of the first joint cross linkage of the link retaining mechanism integrally formed with and in parallel relationship with the first long link of the first joint cross linkage of the additional link retaining mechanism under the state that the first end portion of the first long link of the first joint cross linkage of the link retaining mechanism is connected with the first end portion of the first long link of the first joint cross linkage of the additional link retaining mechanism;

a first stabilizing parallelogram linkage comprising a first link having first and second end portions and substantially equal in length to the first arm link, the first link of the first stabilizing parallelogram linkage integrally formed with and in coaxial relationship with the first arm link under the state that the first end portion of the first link of the first stabilizing parallelogram linkage is connected with the first end portion of the first arm link, a second link having first and second end portions and substantially equal in length to the fifth arm link, the first and second links of the first stabilizing parallelogram linkage pivotably connected with each other at the second end portion of the first link of the first stabilizing parallelogram linkage and the first end portion of the second link of the first stabilizing parallelogram linkage, the second link of the first stabilizing parallelogram linkage integrally formed with and in parallel relationship with the third arm link under the state that the first end portion of the second link of the first stabilizing parallelogram linkage is connected with the first end portion of the third arm link, a third link having first and second end portions and substantially equal in length to the first link of the first stabilizing parallelogram linkage, the second and third links of the first stabilizing parallelogram linkage pivotably connected with each other at the second end portion of the second link of the first stabilizing parallelogram linkage and the first end portion of the third link of the first stabilizing parallelogram linkage, and a fourth link having first and second end portions and substantially equal in length to the second link of the first stabilizing parallelogram linkage, the third and fourth links of the first stabilizing parallelogram linkage pivotably connected with each other at the second end portion of the third link of the first stabilizing parallelogram linkage and the first end portion of the fourth link of the first stabilizing parallelogram linkage, the fourth and first links of the first stabilizing parallelogram linkage pivotably connected with each other at the second end portion of the fourth link of the first stabilizing parallelogram linkage and the first end portion of the first link of the first stabilizing parallelogram linkage under the state that the first link of the first stabilizing parallelogram linkage is in parallel relationship with the third link of the first stabilizing parallelogram linkage and that the second link of the first stabilizing parallelogram linkage is in parallel relationship with the fourth link of the first stabilizing parallelogram linkage, the fourth link of the first stabilizing parallelogram linkage integrally formed with and in coaxial relationship with the fifth arm link under the state that the second end portion of the fourth link of the first stabilizing parallelogram linkage is connected with the first end portion of the fifth arm link; and a second stabilizing parallelogram linkage comprising a first link having first and second end portions and substantially equal in length to the second arm link, the first link of the second stabilizing parallelogram linkage integrally formed with and in coaxial relationship with the second arm link under the state that the first end portion of the first link of the second stabilizing parallelogram linkage is connected with the first end portion of the second arm link, a second link having first and second end portions and substantially equal in length to the sixth arm link, the first and second links of the second stabilizing parallelogram linkage pivotably connected with each other at the second end portion of the first link of the second stabilizing parallelogram linkage and the first end portion of the second link of the second stabilizing parallelogram linkage, the second link of the second stabilizing parallelogram linkage integrally formed with and in parallel relationship with the fourth arm link under the state that the first end portion of the second link of the second stabilizing parallelogram linkage is connected with the first end portion of the fourth arm link, a third link having first and second end portions and substantially equal in length to the first link of the second stabilizing parallelogram linkage, the second and third links of the second stabilizing parallelogram linkage pivotably connected with each other at the second end portion of the second link of the second stabilizing parallelogram linkage and the first end portion of the third link of the second stabilizing parallelogram linkage, and a fourth link having first and second end portions and substantially equal in length to the second link of the second stabilizing parallelogram linkage, the third and fourth links of the second stabilizing parallelogram linkage pivotably connected with each other at the second end portion of the third link of the second stabilizing parallelogram linkage and the first end portion of the fourth link of the second stabilizing parallelogram linkage, the fourth and first links of the second stabilizing parallelogram linkage pivotably connected with each other at the second end portion of the fourth link of the second stabilizing parallelogram linkage and the first end portion of the first link of the second stabilizing parallelogram linkage under the state that the first link of the second stabilizing parallelogram linkage is in parallel relationship with the third link of the second stabilizing parallelogram linkage and that the second link of the second stabilizing parallelogram linkage is in parallel relationship with the fourth link of the second stabilizing parallelogram linkage, the fourth link of the second stabilizing parallelogram linkage integrally formed with and in coaxial relationship with the sixth arm link under the state that the second end portion of the fourth link of the second stabilizing parallelogram linkage is connected with the first end portion of the sixth arm link.

9. A robot arm mechanism as set forth in claim 3 in which the first joint mechanism comprises:

a first link having first and second end portions and substantially equal in length to the first arm link, the first link of the first joint mechanism integrally formed with and in coaxial relationship with the first arm link under the state that the first end portion of the first link of the first joint mechanism is connected with the first end portion of the first arm link;

a second link having first and second end portions, the first and second links of the first joint mechanism pivotably connected with each other at the second end portion of the first link of the first joint mechanism and the first end portion of the second link of the first joint mechanism, the second link of the first joint mechanism pivotably connected with the first end portion of the third arm link;

a third link having first and second end portions and substantially equal in length to the first link of the first joint mechanism, the second and third links of the first joint mechanism pivotably connected with each other at the second end portion of the second link of the first joint mechanism and the first end portion of the third link of the first joint mechanism; and a fourth link having first and second end portions and substantially equal in length to the second link of the first joint mechanism, the third and fourth links of the first joint mechanism pivotably connected with each other at the second end portion of the third link of the first joint mechanism and the first end portion of the fourth link of the first joint mechanism, the fourth and first links of the first joint mechanism pivotably connected with each other at the second end portion of the fourth link of the first joint mechanism and the first end portion of the first link of the first joint mechanism under the state that the first link of the first joint mechanism is in parallel relationship with the third link of the first joint mechanism and that the second link of the first joint mechanism is in parallel relationship with the fourth link of the first joint mechanism, the second end portion of the fourth link of the first joint mechanism integrally connected with the first long link of the first joint cross linkage of the link retaining mechanism or the first short link of the second joint cross linkage of the link retaining mechanism.

10. A robot arm mechanism as set forth in claim 9 in which the robot arm further comprises a stabilizing mechanism including:

a first link having first and second end portions and substantially equal in length to the third arm link, the first link of the stabilizing mechanism integrally formed with and in coaxial relationship with the third arm link under the state that the first end portion of the first link of the stabilizing mechanism is connected with the first end portion of the third arm link;

a second link having first and second end portions, the first and second links of the stabilizing mechanism pivotably connected with each other at the second end portion of the first link of the stabilizing mechanism and the first end portion of the second link of the stabilizing mechanism, the second link of the stabilizing mechanism integrally formed with the handling member;

a third link having first and second end portions and substantially equal in length to the first link of the stabilizing mechanism, the second and third links of the stabilizing mechanism pivotably connected with each other at the second end portion of the second link of the stabilizing mechanism and the first end portion of the third link of the stabilizing mechanism; and a fourth link having first and second end portions and substantially equal in length to the second link of the stabilizing mechanism, the third and fourth links of the stabilizing mechanism pivotably connected with each other at the second end portion of the third link of the stabilizing mechanism and the first end portion of the fourth link of the stabilizing mechanism, the fourth and first links of the stabilizing mechanism pivotably connected with each other at the second end portion of the fourth link of the stabilizing mechanism and the first end portion of the first link of the stabilizing mechanism under the state that the first link of the stabilizing mechanism is in parallel relationship with the third link of the stabilizing mechanism and that the second link of the stabilizing mechanism is in parallel relationship with the fourth link of the stabilizing mechanism, the second end portion of the fourth link of the stabilizing mechanism integrally connected with the second link of the first joint mechanism.

11. A robot arm mechanism as set forth in claim 10 in which the fourth link of the stabilizing mechanism has a set angle with respect to the second link of the first joint mechanism to prevent the state that the first and third links of the stabilizing mechanism are positioned on a straight line while the robot arm driving mechanism drives the robot arm.

12. A robot arm mechanism as set forth in claim 3 in which the arm driving mechanism comprises a first driving shaft rotatable around a rotation axis, and a second driving shaft in the form of a hollow shape to rotatably receive therein the first driving shaft and rotatable around the rotation axis.

13. A robot arm mechanism as set forth in claim 12 in which any one of the first and second driving shafts is integrally connected with the first long link of the first joint cross linkage of the link retaining mechanism and rotates the first long link of the first joint cross linkage of the link retaining mechanism around the rotation axis, and in which the other one of the first and second driving shafts rotates the first arm link around the first end portion of the first arm link.

14. A robot arm mechanism as set forth in claim 12 in which any one of the first and second driving shafts rotates the first arm link around the first end portion of the first arm link, and in which the other one of the first and second driving shafts rotates the second arm link around the first end portion of the second arm link.

15. A robot arm mechanism as set forth in claim 13 in which the robot arm further comprises a driving assist parallelogram linkage including a first link having first and second end portions and substantially equal in length to the distance between the rotation axis and the second end portion of the first arm link, the first link of the driving assist parallelogram linkage integrally formed with and in parallel relationship with the first long link of the first joint cross linkage of the link retaining mechanism, a second link having first and second end portions, the first and second links of the driving assist parallelogram linkage pivotably connected with each other at the second end portion of the first link of the driving assist parallelogram linkage and the first end portion of the second link of the driving assist parallelogram linkage, the second link of the driving assist parallelogram linkage integrally formed with and in parallel relationship with the first arm link, a third link having first and second end portions and substantially equal in length to the first link of the driving assist parallelogram linkage, the second and third links of the driving assist parallelogram linkage pivotably connected with each other at the second end portion of the second link of the driving assist parallelogram linkage and the first end portion of the third link of the driving assist parallelogram linkage, and a fourth link having first and second end portions and substantially equal in length to the second link of the driving assist parallelogram linkage, the third and fourth links of the driving assist parallelogram linkage pivotably connected with each other at the second end portion of the third link of the driving assist parallelogram linkage and the first end portion of the fourth link of the driving assist parallelogram linkage, the fourth and first links of the driving assist parallelogram linkage pivotably connected with each other at the second end portion of the fourth link of the driving assist parallelogram linkage and the first end portion of the first link of the driving assist parallelogram linkage under the state that the first link of the driving assist parallelogram linkage is in parallel relationship with the third link of the driving assist parallelogram linkage and that the second link of the driving assist parallelogram linkage is in parallel relationship with the fourth link of the driving assist parallelogram linkage, any one of the first and second driving shafts integrally connected with the fourth link of the driving assist parallelogram linkage at the second end portion of the fourth link of the driving assist parallelogram linkage and rotating the fourth link of the driving assist parallelogram linkage around the rotation axis.

16. A robot arm mechanism as set forth in claim 1 in which the center line is substantially equally spaced apart from the second end portion of the first long link of the first joint cross linkage of the link retaining mechanism and the first end portion of the first short link of the second joint cross linkage of the link retaining mechanism and in perpendicular relationship with the first long link of the first joint cross linkage of the link retaining mechanism, the first end portions of the first and second arm links positioned on the line passing through the first and second end portions of the first long link of the first joint cross linkage of the link retaining mechanism.

17. A robot arm mechanism as set forth in claim 16 in which the first short and long links of the first joint cross linkage of the link retaining mechanism are respectively in coaxial relationship with the first long and short links of the second joint cross linkage of the link retaining mechanism.

18. A robot arm mechanism as set forth in claim 16 in which the first short and long links of the first joint cross linkage of the link retaining mechanism are respectively in axial alignment with the first long and short links of the second joint cross linkage of the link retaining mechanism.

19. A robot arm mechanism as set forth in claim 16 in which the robot arm further comprises:
  a third arm link having first and second end portions;
  a fourth arm link having first and second end portions, the first and second arm links substantially equal in length to each other, the third and fourth arm links substantially equal in length to each other, the arm driving mechanism comprising a first driving shaft rotatable around a rotation axis, and a second driving shaft in the form of a hollow shape to rotatably receive therein the first driving shaft and rotatable around the rotation axis, any one of the first and second driving shafts integrally connected with the second end portion of the third arm link and rotating the third arm link around the rotation axis, the other one of the first and second driving shafts integrally connected with the second end portion of the fourth arm link and rotating the fourth arm link around the rotation axis;
  a first joint mechanism retaining the first and third arm links respectively at the second end portion of the first arm link and the first end portion of the third arm link under the state that the first arm link is pivotable around the second end portion of the first arm link with respect to the third arm link; and
  a second joint mechanism retaining the second and fourth arm links respectively at the second end portion of the second arm link and the first end portion of the fourth arm link under the state that the second arm link is pivotable around the second end portion of the second arm link with respect to the fourth arm link.

20. A robot arm mechanism as set forth in claim 19 in which the handling member is integrally connected with the first long link of the first joint cross linkage of the link retaining mechanism.

21. A robot arm mechanism as set forth in claim 19 in which the first and third arm links are pivotably connected with each other at the second end portion of the first arm link and the first end portion of the third arm link, and in which the second and fourth arm links are pivotably connected with each other at the second end portion of the second arm link and the first end portion of the fourth arm link.

22. A robot arm mechanism as set forth in claim 19 which further comprising an additional handling member, the robot arm further comprising:

a fifth arm link having first and second end portion;

a sixth arm link having first and second end portion, the fifth and sixth arm links substantially equal in length to each other; and an additional link retaining mechanism having an additional center line, the additional link retaining mechanism pivotably retaining the fifth and sixth arm links respectively at the first end portions of the fifth and sixth arm links and keeping parallel a first line and a second line, the first line being a line passing through the first and second end portions of the fifth arm link and the second line being a line symmetrical with respect to the additional center line with the line passing through the first and second end portions of the sixth arm link, the additional link retaining mechanism comprising a first joint cross linkage including a first short link having first and second end portions, a first long link having first and second end portions and longer than the first short link of the first joint cross linkage of the additional link retaining mechanism, the first short and long links of the first joint cross linkage of the additional link retaining mechanism pivotably connected with each other at the second end portion of the first short link of the first joint cross linkage of the additional link retaining mechanism and the first end portion of the first long link of the first joint cross linkage of the additional link retaining mechanism, a second short link having first and second end portions and substantially equal in length to the first short link of the first joint cross linkage of the additional link retaining mechanism, the first long link of the first joint cross linkage of the additional link retaining mechanism and the second short link of the first joint cross linkage of the additional link retaining mechanism pivotably connected with each other at the second end portion of the first long link of the first joint cross linkage of the additional link retaining mechanism and the first end portion of the second short link of the first joint cross linkage of the additional link retaining mechanism, and a second long link having first and second end portions and substantially equal in length to the first long link of the first joint cross linkage of the additional link retaining mechanism, the second short and long links of the first joint cross linkage of the additional link retaining mechanism pivotably connected with each other at the second end portion of the second short link of the first joint cross linkage of the additional link retaining mechanism and the first end portion of the second long link of the first joint cross linkage of the additional link retaining mechanism, the second long link of the first joint cross linkage of the additional link retaining mechanism and the first short link of the first joint cross linkage of the additional link retaining mechanism pivotably connected with each other at the second end portion of the second long link of the first joint cross linkage of the additional link retaining mechanism and the first end portion of the first short link of the first joint cross linkage of the additional link retaining mechanism under the state that the second long link of the first joint cross linkage of the additional link retaining mechanism is crossed with the first long link of the first joint cross linkage of the additional link retaining mechanism, and a second joint cross linkage including a first short link having first and second end portions, a first long link having first and second end portions and longer than the first short link of the second joint cross linkage of the additional link retaining mechanism, the first short and long links of the second joint cross linkage of the additional link retaining mechanism pivotably connected with each other at the second end portion of the first short link of the second joint cross linkage of the additional link retaining mechanism and the first end portion of the first long link of the second joint cross linkage of the additional link retaining mechanism, a second short link having first and second end portions and substantially equal in length to the first short link of the second joint cross linkage of the additional link retaining mechanism, the first long link of the second joint cross linkage of the additional link retaining mechanism and the second short link of the second joint cross linkage of the additional link retaining mechanism pivotably connected with each other at the second end portion of the first long link of the second joint cross linkage of the additional link retaining mechanism and the first end portion of the second short link of the second joint cross linkage of the additional link retaining mechanism, and a second long link having first and second end portions and substantially equal in length to the first long link of the second joint cross linkage of the additional link retaining mechanism, the second short and long links of the second joint cross linkage of the additional link retaining mechanism pivotably connected with each other at the second end portion of the second short link of the second joint cross linkage of the additional link retaining mechanism and the first end portion of the second long link of the second joint cross linkage of the additional link retaining mechanism, the second long link of the second joint cross linkage of the additional link retaining mechanism and the first short link of the second joint cross linkage of the additional link retaining mechanism pivotably connected with each other at the second end portion of the second long link of the second joint cross linkage of the additional link retaining mechanism and the first end portion of the first short link of the second joint cross linkage of the additional link retaining mechanism under the state that the second long link of the second joint cross linkage of the additional link retaining mechanism is crossed with the first long link of the second joint cross linkage of the additional link retaining mechanism, the length ratio of each of the first and second short links of the first joint cross linkage of the additional link retaining mechanism to each of the first and second long links of the first joint cross linkage of the additional link retaining mechanism substantially equal to the length ratio of each of the first and second short links of the second joint cross linkage of the additional link retaining mechanism to each of the first and second long links of the second joint cross linkage of the additional link retaining mechanism, the first short link of the first joint cross linkage of the additional link retaining mechanism integrally formed with and in parallel relationship with the first long link of the second joint cross linkage of the additional link retaining mechanism under the state that the second end portion of the first short link of the first joint cross linkage of the additional link retaining mechanism is connected with the first end portion of the first long link of the second joint cross linkage of the additional link retaining mechanism, the first long link of the first joint cross linkage of the additional link retaining mechanism integrally formed with and in parallel relationship with the first short link of the second joint cross linkage of the additional link retaining mechanism under the state that the first end portion of the first long link of the first joint cross linkage of the additional link retaining mechanism is connected with the second end portion of the first short link of the second joint cross linkage of the additional link retaining mechanism, the first end portion of any one of the fifth and sixth arm links integrally connected with the second short link of the first joint cross linkage of the additional link retaining mechanism, the first end portion of the other one of the fifth and sixth arm links integrally connected with the second long link of the second joint cross linkage of the additional link retaining mechanism, the first short and long links of the first joint cross linkage of the additional link retaining mechanism respectively in coaxial relationship with the first long and short links of the second joint cross linkage of the additional link retaining mechanism, the additional center line substantially equally spaced apart from the second end portion of the first long link of the first joint cross linkage of the additional link retaining mechanism and the first end portion of the first short link of the second joint cross linkage of the additional link retaining mechanism and in perpendicular relationship with the first long link of the first joint cross linkage of the additional link retaining mechanism, the first end portions of the fifth and sixth arm links positioned on the line passing through the first and second end portions of the first long link of the first joint cross linkage of the additional link retaining mechanism, the distance between the second end portion of the first long link of the first joint cross linkage of the link retaining mechanism and the first end portion of the first short link of the second joint cross linkage of the link retaining mechanism is substantially equal to the distance between the second end portion of the first long link of the first joint cross linkage of the additional link retaining mechanism and the first end portion of the first short link of the second joint cross linkage of the additional link retaining mechanism, the first joint mechanism retaining the fifth arm link at the second end portion of the fifth arm link under the state that the fifth arm link is pivotable around the second end portion of the fifth arm link with respect to the third arm link, the second joint mechanism retaining the sixth arm link at the second end portion of the sixth arm link under the state that the sixth arm link is pivotable around the second end portion of the sixth arm link with respect to the fourth arm link.

23. A robot arm mechanism as set forth in claim 22 in which the handling member is integrally connected with the first long link of the first joint cross linkage of the link retaining mechanism and in which the additional handling member is integrally connected with the first long link of the first joint cross linkage of the additional link retaining mechanism.

24. A robot arm mechanism as set forth in claim 22 in which first joint mechanism is formed by a link and has first and second end portions, the third arm link integrally connected with the first joint mechanism at the portion substantially equally spaced apart from the first and second end portions of the first joint mechanism under the state that first joint mechanism and the third arm link are in perpendicular relationship with each other, the first arm link and the first joint mechanism pivotably connected with each other at the second end portion of the first arm link and the first end portion of the first joint mechanism, the fifth arm link and the first joint mechanism pivotably connected with each other at the second end portion of the fifth arm link and the second end portion of the first joint mechanism, and in which second joint mechanism is formed by a link and has first and second end portions, the fourth arm link integrally connected with the second joint mechanism at the portion substantially equally spaced apart from the first and second end portions of the second joint mechanism under the state that second joint mechanism and the fourth arm link are in perpendicular relationship with each other, the second arm link and the second joint mechanism pivotably connected with each other at the second end portion of the second arm link and the first end portion of the second joint mechanism, the sixth arm link and the second joint mechanism pivotably connected with each other at the second end portion of the sixth arm link and the second end portion of the second joint mechanism.

25. A robot arm mechanism as set forth in claim 19 which further comprising an additional handling member, the robot arm further comprising:

a fifth arm link having first and second end portion;

a sixth arm link having first and second end portion;

a seventh arm link having first and second end portion;

a eighth arm link having first and second end portion, the fifth and sixth arm links substantially equal in length to each other, the seventh and eighth arm links substantially equal in length to each other;

a third joint mechanism retaining the fifth and seventh arm links respectively at the second end portion of the fifth arm link and the first end portion of the seventh arm link under the state that the fifth arm link is pivotable around the second end portion of the fifth arm link with respect to the seventh arm link;

a fourth joint mechanism retaining the sixth and eighth arm links respectively at the second end portion of the sixth arm link and the first end portion of the eighth arm link under the state that the sixth arm link is pivotable around the second end portion of the sixth arm link with respect to the eighth arm link; and an additional link retaining mechanism having an additional center line, the additional link retaining mechanism pivotably retaining the fifth and sixth arm links respectively at the first end portions of the fifth and sixth arm links and keeping parallel a first line and a second line, the first line being a line passing through the first and second end portions of the fifth arm link and the second line being a line symmetrical line with respect to the additional center line with the line passing through the first and second end portions of the sixth arm link, the additional link retaining mechanism comprising a first joint cross linkage including a first short link having first and second end portions, a first long link having first and second end portions and longer than the first short link of the first joint cross linkage of the additional link retaining mechanism, the first short and long links of the first joint cross linkage of the additional link retaining mechanism pivotably connected with each other at the second end portion of the first short link of the first joint cross linkage of the additional link retaining mechanism and the first end portion of the first long link of the first joint cross linkage of the additional link retaining mechanism, a second short link having first and second end portions and substantially equal in length to the first short link of the first joint cross linkage of the additional link retaining mechanism, the first long link of the first joint cross linkage of the additional link retaining mechanism and the second short link of the first joint cross linkage of the additional link retaining mechanism pivotably connected with each other at the second end portion of the first long link of the first joint cross linkage of the additional link retaining mechanism and the first end portion of the second short link of the first joint cross linkage of the additional link retaining mechanism, and a second long link having first and second end portions and substantially equal in length to the first long link of the first joint cross linkage of the additional link retaining mechanism, the second short and long links of the first joint cross linkage of the additional link retaining mechanism pivotably connected with each other at the second end portion of the second short link of the first joint cross linkage of the additional link retaining mechanism and the first end portion of the second long link of the first joint cross linkage of the additional link retaining mechanism, the second long link of the first joint cross linkage of the additional link retaining mechanism and the first short link of the first joint cross linkage of the additional link retaining mechanism pivotably connected with each other at the second end portion of the second long link of the first joint cross linkage of the additional link retaining mechanism and the first end portion of the first short link of the first joint cross linkage of the additional link retaining mechanism under the state that the second long link of the first joint cross linkage of the additional link retaining mechanism is crossed with the first long link of the first joint cross linkage of the additional link retaining mechanism, and a second joint cross linkage including a first short link having first and second end portions, a first long link having first and second end portions and longer than the first short link of the second joint cross linkage of the additional link retaining mechanism, the first short and long links of the second joint cross linkage of the additional link retaining mechanism pivotably connected with each other at the second end portion of the first short link of the second joint cross linkage of the additional link retaining mechanism and the first end portion of the first long link of the second joint cross linkage of the additional link retaining mechanism, a second short link having first and second end portions and substantially equal in length to the first short link of the second joint cross linkage of the additional link retaining mechanism, the first long link of the second joint cross linkage of the additional link retaining mechanism and the second short link of the second joint cross linkage of the additional link retaining mechanism pivotably connected with each other at the second end portion of the first long link of the second joint cross linkage of the additional link retaining mechanism and the first end portion of the second short link of the second joint cross linkage of the additional link retaining mechanism, and a second long link having first and second end portions and substantially equal in length to the first long link of the second joint cross linkage of the additional link retaining mechanism, the second short and long links of the second joint cross linkage of the additional link retaining mechanism pivotably connected with each other at the second end portion of the second short link of the second joint cross linkage of the additional link retaining mechanism and the first end portion of the second long link of the second joint cross linkage of the additional link retaining mechanism, the second long link of the second joint cross linkage of the additional link retaining mechanism and the first short link of the second joint cross linkage of the additional link retaining mechanism pivotably connected with each other at the second end portion of the second long link of the second joint cross linkage of the additional link retaining mechanism and the first end portion of the first short link of the second joint cross linkage of the additional link retaining mechanism under the state that the second long link of the second joint cross linkage of the additional link retaining mechanism is crossed with the first long link of the second joint cross linkage of the additional link retaining mechanism, the length ratio of each of the first and second short links of the first joint cross linkage of the additional link retaining mechanism to each of the first and second long links of the first joint cross linkage of the additional link retaining mechanism substantially equal to the length ratio of each of the first and second short links of the second joint cross linkage of the additional link retaining mechanism to each of the first and second long links of the second joint cross linkage of the additional link retaining mechanism, the first short link of the first joint cross linkage of the additional link retaining mechanism integrally formed with and in parallel relationship with the first long link of the second joint cross linkage of the additional link retaining mechanism under the state that the second end portion of the first short link of the first joint cross linkage of the additional link retaining mechanism is connected with the first end portion of the first long link of the second joint cross linkage of the additional link retaining mechanism, the first long link of the first joint cross linkage of the additional link retaining mechanism integrally formed with and in parallel relationship with the first short link of the second joint cross linkage of the additional link retaining mechanism under the state that the first end portion of the first long link of the first joint cross linkage of the additional link retaining mechanism is connected with the second end portion of the first short link of the second joint cross linkage of the additional link retaining mechanism, the first end portion of any one of the fifth and sixth arm links integrally connected with the second short link of the first joint cross linkage of the additional link retaining mechanism, the first end portion of the other one of the fifth and sixth arm links integrally connected with the second long link of the second joint cross linkage of the additional link retaining mechanism, the first short and long links of the first joint cross linkage of the additional link retaining mechanism respectively in coaxial relationship with the first long and short links of the second joint cross linkage of the additional link retaining mechanism, the additional center line substantially equally spaced apart from the second end portion of the first long link of the first joint cross linkage of the additional link retaining mechanism and the first end portion of the first short link of the second joint cross linkage of the additional link retaining mechanism and in perpendicular relationship with the first long link of the first joint cross linkage of the additional link retaining mechanism, the first end portions of the fifth and sixth arm links positioned on the line passing through the first and second end portions of the first long link of the first joint cross linkage of the additional link retaining mechanism, the distance between the second end portion of the first long link of the first joint cross linkage of the link retaining mechanism and the first end portion of the first short link of the second joint cross linkage of the link retaining mechanism is substantially equal to the distance between the second end portion of the first long link of the first joint cross linkage of the additional link retaining mechanism and the first end portion of the first short link of the second joint cross linkage of the additional link retaining mechanism, any one of the first and second driving shafts rotating the eighth arm link around the second end portion of the eighth arm link, the other one of the first and second driving shafts rotating the seventh arm link around the second end portion of the seventh arm link, the second end portions of the eighth and seventh arm links positioned on the rotation axis.

26. A robot arm mechanism as set forth in claim 25 in which the handling member is integrally connected with the first long link of the first joint cross linkage of the link retaining mechanism and in which the additional handling member is integrally connected with the first long link of the first joint cross linkage of the additional link retaining mechanism.

27. A robot arm mechanism as set forth in claim 19 in which the robot arm further comprises:

a fifth arm link having first and second end portions;

a sixth arm link having first and second end portions, the fifth and sixth arm link substantially equal in length to each other;

a first stabilizing mechanism including a first link having first and second end portions, the first link of the first stabilizing mechanism integrally formed with and in parallel relationship with the first arm link under the state that the second end portion of the first link of the first stabilizing mechanism is connected with the second end portion of the first arm link, a second link having first and second end portions, the first and second links of the first stabilizing mechanism pivotably connected with each other at the second end portion of the first link of the first stabilizing mechanism and the first end portion of the second link of the first stabilizing mechanism, the second link of the first stabilizing mechanism integrally formed with and in axial alignment with the third arm link under the state that the first end portion of the second link of the first stabilizing mechanism is connected with the second end portion of the third arm link, a third link having first and second end portions and substantially equal in length to the first link of the first stabilizing mechanism, the second and third links of the first stabilizing mechanism pivotably connected with each other at the second end portion of the second link of the first stabilizing mechanism and the first end portion of the third link of the first stabilizing mechanism, the third link of the first stabilizing mechanism integrally formed with and in parallel relationship with the fifth arm link under the state that the first end portion of the third link of the first stabilizing mechanism is connected with the second end portion of the fifth arm link, and a fourth link having first and second end portions and substantially equal in length to the second link of the first stabilizing mechanism, the third and fourth links of the first stabilizing mechanism pivotably connected with each other at the second end portion of the third link of the first stabilizing mechanism and the first end portion of the fourth link of the first stabilizing mechanism, the fourth and first links of the first stabilizing mechanism pivotably connected with each other at the second end portion of the fourth link of the first stabilizing mechanism and the first end portion of the first link of the first stabilizing mechanism under the state that the first link of the first stabilizing mechanism is in parallel relationship with the third link of the first stabilizing mechanism and that the second link of the first stabilizing mechanism is in parallel relationship with the fourth link of the first stabilizing mechanism;

a second stabilizing mechanism including a first link having first and second end portions, the first link of the second stabilizing mechanism integrally formed with and in parallel relationship with the second arm link under the state that the second end portion of the first link of the second stabilizing mechanism is connected with the second end portion of the second arm link, a second link having first and second end portions and substantially equal in length to the second link of the first stabilizing mechanism, the first and second links of the second stabilizing mechanism pivotably connected with each other at the second end portion of the first link of the second stabilizing mechanism and the first end portion of the second link of the second stabilizing mechanism, the second link of the second stabilizing mechanism integrally formed with and in axial alignment with the fourth arm link under the state that the first end portion of the second link of the second stabilizing mechanism is connected with the second end portion of the fourth arm link, a third link having first and second end portions and substantially equal in length to the first link of the second stabilizing mechanism, the second and third links of the second stabilizing mechanism pivotably connected with each other at the second end portion of the second link of the second stabilizing mechanism and the first end portion of the third link of the second stabilizing mechanism, the third link of the second stabilizing mechanism integrally formed with and in parallel relationship with the sixth arm link under the state that the first end portion of the third link of the second stabilizing mechanism is connected with the second end portion of the sixth arm link, and a fourth link having first and second end portions and substantially equal in length to the second link of the second stabilizing mechanism, the third and fourth links of the second stabilizing mechanism pivotably connected with each other at the second end portion of the third link of the second stabilizing mechanism and the first end portion of the fourth link of the second stabilizing mechanism, the fourth and first links of the second stabilizing mechanism pivotably connected with each other at the second end portion of the fourth link of the second stabilizing mechanism and the first end portion of the first link of the second stabilizing mechanism under the state that the first link of the second stabilizing mechanism is in parallel relationship with the third link of the second stabilizing mechanism and that the second link of the second stabilizing mechanism is in parallel relationship with the fourth link of the second stabilizing mechanism, the handling member having first and second portions, the fifth arm link and the handling member pivotably connected with each other at the first end portion of the fifth arm link and the first portion of the handling member, the sixth arm link and the handling member pivotably connected with each other at the first end portion of the sixth arm link and the second portion of the handling member.

28. A robot arm mechanism as set forth in claim 16 which further comprising an additional handling member, the robot arm further comprising:

a third arm link having first and second end portion;

a fourth arm link having first and second end portion, the first, second, third, and fourth arm links substantially equal in length to each other;

a fifth arm link having first and second end portion;

a sixth arm link having first and second end portion; and an additional link retaining mechanism having an additional center line, the additional link retaining mechanism pivotably retaining the third and fourth arm links respectively at the first end portions of the third and fourth arm links and keeping parallel a first line and a second line, the first line being a line passing through the first and second end portions of the third arm link and the second line being a line symmetrical with respect to the additional center line with the line passing through the first and second end portions of the fourth arm link, the additional link retaining mechanism comprising a first joint cross linkage including a first short link having first and second end portions, a first long link having first and second end portions and longer than the first short link of the first joint cross linkage of the additional link retaining mechanism, the first short and long links of the first joint cross linkage of the additional link retaining mechanism pivotably connected with each other at the second end portion of the first short link of the first joint cross linkage of the additional link retaining mechanism and the first end portion of the first long link of the first joint cross linkage of the additional link retaining mechanism, a second short link having first and second end portions and substantially equal in length to the first short link of the first joint cross linkage of the additional link retaining mechanism, the first long link of the first joint cross linkage of the additional link retaining mechanism and the second short link of the first joint cross linkage of the additional link retaining mechanism pivotably connected with each other at the second end portion of the first long link of the first joint cross linkage of the additional link retaining mechanism and the first end portion of the second short link of the first joint cross linkage of the additional link retaining mechanism, and a second long link having first and second end portions and substantially equal in length to the first long link of the first joint cross linkage of the additional link retaining mechanism, the second short and long links of the first joint cross linkage of the additional link retaining mechanism pivotably connected with each other at the second end portion of the second short link of the first joint cross linkage of the additional link retaining mechanism and the first end portion of the second long link of the first joint cross linkage of the additional link retaining mechanism, the second long link of the first joint cross linkage of the additional link retaining mechanism and the first short link of the first joint cross linkage of the additional link retaining mechanism pivotably connected with each other at the second end portion of the second long link of the first joint cross linkage of the additional link retaining mechanism and the first end portion of the first short link of the first joint cross linkage of the additional link retaining mechanism under the state that the second long link of the first joint cross linkage of the additional link retaining mechanism is crossed with the first long link of the first joint cross linkage of the additional link retaining mechanism, and a second joint cross linkage including a first short link having first and second end portions, a first long link having first and second end portions and longer than the first short link of the second joint cross linkage of the additional link retaining mechanism, the first short and long links of the second joint cross linkage of the additional link retaining mechanism pivotably connected with each other at the second end portion of the first short link of the second joint cross linkage of the additional link retaining mechanism and the first end portion of the first long link of the second joint cross linkage of the additional link retaining mechanism, a second short link having first and second end portions and substantially equal in length to the first short link of the second joint cross linkage of the additional link retaining mechanism, the first long link of the second joint cross linkage of the additional link retaining mechanism and the second short link of the second joint cross linkage of the additional link retaining mechanism pivotably connected with each other at the second end portion of the first long link of the second joint cross linkage of the additional link retaining mechanism and the first end portion of the second short link of the second joint cross linkage of the additional link retaining mechanism, and a second long link having first and second end portions and substantially equal in length to the first long link of the second joint cross linkage of the additional link retaining mechanism, the second short and long links of the second joint cross linkage of the additional link retaining mechanism pivotably connected with each other at the second end portion of the second short link of the second joint cross linkage of the additional link retaining mechanism and the first end portion of the second long link of the second joint cross linkage of the additional link retaining mechanism, the second long link of the second joint cross linkage of the additional link retaining mechanism and the first short link of the second joint cross linkage of the additional link retaining mechanism pivotably connected with each other at the second end portion of the second long link of the second joint cross linkage of the additional link retaining mechanism and the first end portion of the first short link of the second joint cross linkage of the additional link retaining mechanism under the state that the second long link of the second joint cross linkage of the additional link retaining mechanism is crossed with the first long link of the second joint cross linkage of the additional link retaining mechanism, the length ratio of each of the first and second short links of the first joint cross linkage of the additional link retaining mechanism to each of the first and second long links of the first joint cross linkage of the additional link retaining mechanism substantially equal to the length ratio of each of the first and second short links of the second joint cross linkage of the additional link retaining mechanism to each of the first and second long links of the second joint cross linkage of the additional link retaining mechanism, the first short link of the first joint cross linkage of the additional link retaining mechanism integrally formed with and in parallel relationship with the first long link of the second joint cross linkage of the additional link retaining mechanism under the state that the second end portion of the first short link of the first joint cross linkage of the additional link retaining mechanism is connected with the first end portion of the first long link of the second joint cross linkage of the additional link retaining mechanism, the first long link of the first joint cross linkage of the additional link retaining mechanism integrally formed with and in parallel relationship with the first short link of the second joint cross linkage of the additional link retaining mechanism under the state that the first end portion of the first long link of the first joint cross linkage of the additional link retaining mechanism is connected with the second end portion of the first short link of the second joint cross linkage of the additional link retaining mechanism, the first end portion of any one of the third and fourth arm links integrally connected with the second short link of the first joint cross linkage of the additional link retaining mechanism, the first end portion of the other one of the third and fourth arm links integrally connected with the second long link of the second joint cross linkage of the additional link retaining mechanism, the distance between the second end portion of the first long link of the first joint cross linkage of the link retaining mechanism and the first end portion of the first short link of the second joint cross linkage of the link retaining mechanism is substantially equal to the distance between the second end portion of the first long link of the first joint cross linkage of the additional link retaining mechanism and the first end portion of the first short link of the second joint cross linkage of the additional link retaining mechanism, the handling member having a first and second portions, the additional handling member having a first and second portions, the first arm link and the handling member pivotably connected with each other at the second end portion of the first arm link and the first portion of the handling member, the third arm link and the handling member pivotably connected with each other at the second end portion of the third arm link and the second portion of the handling member, the fourth arm link and the additional handling member pivotably connected with each other at the second end portion of the fourth arm link and the first portion of the additional handling member, the second arm link and the additional handling member pivotably connected with each other at the second end portion of the second arm link and the second portion of the additional handling member, the arm driving mechanism comprising a first driving shaft rotatable around a rotation axis, and a second driving shaft in the form of a hollow shape to rotatably receive therein the first driving shaft and rotatable around the rotation axis, any one of the first and second driving shafts rotating the fifth arm link around the second end portion of the fifth arm link, the other one of the first and second driving shafts rotating the sixth arm link around the second end portion of the sixth arm link, the second end portions of the fifth and sixth arm links positioned on the rotation axis, the fifth arm link pivotable around the second end portion of the fifth arm link, the sixth arm link pivotable around the second end portion of the sixth arm link, the first end portion of the fifth arm link pivotally connected with the first long link of the first joint cross linkage of the link retaining mechanism or the first short link of the second joint cross linkage of the link retaining mechanism under the state that the first end portion of the fifth arm link is substantially equally spaced apart from the second end portion of the first long link of the first joint cross linkage of the link retaining mechanism and the first end portion of the first short link of the second joint cross linkage of the link retaining mechanism, the first end portion of the sixth arm link pivotally connected with the first long link of the first joint cross linkage of the additional link retaining mechanism or the first short link of the second joint cross linkage of the additional link retaining mechanism under the state that the first end portion of the sixth arm link is substantially equally spaced apart from the second end portion of the first long link of the first joint cross linkage of the additional link retaining mechanism and the first end portion of the first short link of the second joint cross linkage of the additional link retaining mechanism.

29. A robot arm mechanism as set forth in claim 28 in which the robot arm further comprises a stabilizing mechanism including:

a first link having first and second end portions and substantially equal in length to the first arm link, the first link of the stabilizing mechanism integrally formed with and in coaxial relationship with the first arm link under the state that the first end portion of the first link of the stabilizing mechanism is connected with the first end portion of the first arm link;

a second link having first and second end portions, the first and second links of the stabilizing mechanism pivotably connected with each other at the second end portion of the first link of the stabilizing mechanism and the first end portion of the second link of the stabilizing mechanism, the second link of the stabilizing mechanism integrally connected with the handling member;

a third link having first and second end portions and substantially equal in length to the first link of the stabilizing mechanism, the second and third links of the stabilizing mechanism pivotably connected with each other at the second end portion of the second link of the stabilizing mechanism and the first end portion of the third link of the stabilizing mechanism; and a fourth link having first and second end portions and substantially equal in length to the second link of the stabilizing mechanism, the third and fourth links of the stabilizing mechanism pivotably connected with each other at the second end portion of the third link of the stabilizing mechanism and the first end portion of the fourth link of the stabilizing mechanism, the fourth and first links of the stabilizing mechanism pivotably connected with each other at the second end portion of the fourth link of the stabilizing mechanism and the first end portion of the first link of the stabilizing mechanism under the state that the first link of the stabilizing mechanism is in parallel relationship with the third link of the stabilizing mechanism and that the second link of the stabilizing mechanism is in parallel relationship with the fourth link of the stabilizing mechanism, the second end portion of the fourth link of the stabilizing mechanism integrally formed with the first long link of the first joint cross linkage of the link retaining mechanism or the first short link of the second joint cross linkage of the link retaining mechanism.

30. A robot arm mechanism as set forth in claim 16 in which the robot arm further comprises:

a third arm link having first and second end portions and substantially equal in length to the first arm link, the second and third arm links pivotably connected with each other at the first end portion of the second arm link and the first end portion of the third arm link;

a fourth arm link having first and second end portions and substantially equal in length to the second arm link, the first and second arm links substantially equal in length to each other, the first and fourth arm links pivotably connected with each other at the first end portion of the first arm link and the first end portion of the fourth arm link;

a fifth arm link having first and second end portions and substantially equal in length to the distance between the second end portion of the first long link of the first joint cross linkage of the link retaining mechanism and the first end portion of the first short link of the second joint cross linkage of the link retaining mechanism, the first and fifth arm links pivotably connected with each other at the second end portion of the first arm link and the first end portion of the fifth arm link, the third and fifth arm links pivotably connected with each other at the second end portion of the third arm link and the second end portion of the fifth arm link under the state that the first long link of the first joint cross linkage of the link retaining mechanism and the fifth arm link are in parallel relationship with each other and that the first arm link and the third arm link are in parallel relationship with each other;

a sixth arm link having first and second end portions and substantially equal in length to the distance between the second end portion of the first long link of the first joint cross linkage of the link retaining mechanism and the first end portion of the first short link of the second joint cross linkage of the link retaining mechanism, the second and sixth arm links pivotably connected with each other at the second end portion of the second arm link and the first end portion of the sixth arm link, the fourth and sixth arm links pivotably connected with each other at the second end portion of the fourth arm link and the second end portion of the sixth arm link under the state that the first long link of the first joint cross linkage of the link retaining mechanism and the sixth arm link are in parallel relationship with each other and that the second arm link and the fourth arm link are in parallel relationship with each other, the handling member and the sixth arm link integrally formed with each other.

31. A robot arm mechanism as set forth in claim 30 in which the arm driving mechanism comprises a first driving shaft rotatable around a rotation axis, and a second driving shaft in the form of a hollow shape to rotatably receive therein the first driving shaft and rotatable around the rotation axis, any one of the first and second driving shafts integrally connected with the first arm link at the second end portion of the first arm link and rotating the first arm link around the rotation axis, the other one of the first and second driving shafts integrally connected with the fifth arm link at the first end portion of the fifth arm link and rotating the fifth arm link around the rotation axis.

32. A robot arm mechanism as set forth in claim 30 in which the arm driving mechanism comprises a first driving shaft rotatable around a rotation axis, and a second driving shaft in the form of a hollow shape to rotatably receive therein the first driving shaft and rotatable around the rotation axis, the rotation axis positioned on the line passing through the first and second end portions of the fifth arm link, the robot arm further comprising a driving assist parallelogram linkage including a first link having first and second end portions and substantially equal in length to the distance between the rotation axis and the second end portion of the first arm link, the first link of the driving assist parallelogram linkage integrally formed with and in coaxial relationship with the fifth arm link under the state that the second end portion of the first link of the driving assist parallelogram linkage is connected with the first end portion of the fifth arm link, a second link having first and second end portions, the first and second links of the driving assist parallelogram linkage pivotably connected with each other at the second end portion of the first link of the driving assist parallelogram linkage and the first end portion of the second link of the driving assist parallelogram linkage, the second link of the driving assist parallelogram linkage integrally formed with and in parallel relationship with the first arm link under the state that the first end portion of the second link of the driving assist parallelogram linkage is connected with the second end portion of the first arm link, a third link having first and second end portions and substantially equal in length to the first link of the driving assist parallelogram linkage, the second and third links of the driving assist parallelogram linkage pivotably connected with each other at the second end portion of the second link of the driving assist parallelogram linkage and the first end portion of the third link of the driving assist parallelogram linkage, and a fourth link having first and second end portions and substantially equal in length to the second link of the driving assist parallelogram linkage, the third and fourth links of the driving assist parallelogram linkage pivotably connected with each other at the second end portion of the third link of the driving assist parallelogram linkage and the first end portion of the fourth link of the driving assist parallelogram linkage, the fourth and first links of the driving assist parallelogram linkage pivotably connected with each other at the second end portion of the fourth link of the driving assist parallelogram linkage and the first end portion of the first link of the driving assist parallelogram linkage under the state that the first link of the driving assist parallelogram linkage is in parallel relationship with the third link of the driving assist parallelogram linkage and that the second link of the driving assist parallelogram linkage is in parallel relationship with the fourth link of the driving assist parallelogram linkage, any one of the first and second driving shafts integrally connected with the fourth link of the driving assist parallelogram linkage at the second end portion of the fourth link of the driving assist parallelogram linkage and rotating the fourth link of the driving assist parallelogram linkage around the rotation axis, the other one of the first and second driving shafts integrally connected with the fifth arm link and rotating the fifth arm link around the rotation axis.

* * * * *